United States Patent
Zhang et al.

(10) Patent No.: US 12,483,880 B2
(45) Date of Patent: Nov. 25, 2025

(54) DATA TRANSMISSION METHOD AND RELATED DEVICE

(71) Applicant: HUAWEI TECHNOLOGIES CO., LTD., Guangdong (CN)

(72) Inventors: Dagang Zhang, Dongguan (CN); Zhilong Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 351 days.

(21) Appl. No.: 18/159,188

(22) Filed: Jan. 25, 2023

(65) Prior Publication Data
US 2023/0164548 A1    May 25, 2023

Related U.S. Application Data

(63) Continuation of application No. PCT/CN2021/091332, filed on Apr. 30, 2021.

(30) Foreign Application Priority Data

Jul. 27, 2020   (CN) .......................... 202010731310.6

(51) Int. Cl.
*H04W 12/03*   (2021.01)
*H04W 12/0431*   (2021.01)
(Continued)

(52) U.S. Cl.
CPC ....... *H04W 12/03* (2021.01); *H04W 12/0431* (2021.01); *H04W 76/20* (2018.02); *H04W 76/30* (2018.02)

(58) Field of Classification Search
CPC . H04W 12/03; H04W 12/0431; H04W 76/20; H04W 76/30; H04W 12/30; H04W 76/27
See application file for complete search history.

(56) References Cited

U.S. PATENT DOCUMENTS 11,026,291 B2 *   6/2021   Sharma ................. H04W 12/04
2012/0142361 A1 *   6/2012   Zhao ..................... H04L 5/0096
                                                                        455/446
(Continued)

FOREIGN PATENT DOCUMENTS

CN   102711100 A   10/2012
CN   107360569 A   11/2017
(Continued)

OTHER PUBLICATIONS

Ericsson, "Security solution for key handling in state transition from RRC inactive state to RRC connected state," 3GPP TSG SA WG3 (Security) Meeting #86-Bis, S3-170738, Mar. 27-31, 2017, Busan, South Korea, 4 pages.
(Continued)

*Primary Examiner* — Khalid M Almaghayreh
(74) *Attorney, Agent, or Firm* — Fish & Richardson P.C.

(57) ABSTRACT

The present disclosure relates to data transmission methods and devices. One example data transmission method relates to a primary network device, a secondary network device, and a terminal device. When a carrier change occurs (for example, the secondary network device is to be added, the secondary network device is to be deleted, or the secondary network device is to be changed), the primary network device sends a first message to the terminal device. Before the carrier change, the terminal device performs data encryption and decryption by using a key of the primary network device. The first message indicates the terminal device to still perform, after the carrier change, data encryption and decryption by using the key that is of the primary network device and that is stored in the terminal device.

17 Claims, 27 Drawing Sheets

(51) Int. Cl.
*H04W 76/20* (2018.01)
*H04W 76/30* (2018.01)

(56) References Cited

U.S. PATENT DOCUMENTS

| | | | | |
|---|---|---|---|---|
| 2016/0135095 | A1* | 5/2016 | Wu | H04W 28/06 |
| | | | | 370/328 |
| 2016/0227425 | A1* | 8/2016 | Kim | H04L 5/0007 |
| 2016/0249264 | A1* | 8/2016 | Axén | H04W 36/0061 |
| 2018/0227851 | A1* | 8/2018 | Kubota | H04W 52/44 |
| 2018/0279204 | A1* | 9/2018 | Kim | H04W 76/27 |
| 2020/0021978 | A1* | 1/2020 | Chai | H04W 76/27 |
| 2020/0028564 | A1* | 1/2020 | Agiwal | H04M 3/537 |
| 2020/0029206 | A1* | 1/2020 | Zhang | H04W 12/037 |
| 2020/0128599 | A1* | 4/2020 | Tang | H04W 72/1268 |
| 2020/0245401 | A1* | 7/2020 | Ingale | H04W 28/06 |
| 2021/0021664 | A1* | 1/2021 | Oyman | G06T 9/00 |
| 2021/0112556 | A1* | 4/2021 | Wei | H04L 5/001 |
| 2022/0167359 | A1* | 5/2022 | Miao | H04L 5/0057 |
| 2022/0264306 | A1* | 8/2022 | Kim | H04W 12/106 |
| 2023/0403560 | A1* | 12/2023 | Kim | H04W 12/106 |

FOREIGN PATENT DOCUMENTS

| | | |
|---|---|---|
| CN | 108347727 A | 7/2018 |
| CN | 110710246 A | 1/2020 |
| CN | 111182539 A | 5/2020 |
| WO | 2019066628 A1 | 4/2019 |

OTHER PUBLICATIONS

Extended European Search Report in European Appln No. 21850474. 4, dated Dec. 19, 2023, 6 pages.
TCL, "Interaction between PDCP and RLC Entities for duplication in NR-NR DC," 3GPP TSG-RAN2 #101, R2-1801938, Athens, Greece, Feb. 26-Mar. 2, 2018, 4 pages.
3GPP TS 33.401 V16.3.0, "3rd Generation Partnership Project; Technical Specification Group Services and System Aspects; 3GPP System Architecture Evolution (SAE); Security architecture (Release 16)," Jul. 2020, 170 pages.
NEC, "DL PDCP SN handling for RLC UM," 3GPP TSG-RAN WG2 #108, R2-1915452, Reno, USA, Nov. 18-22, 2019, 3 pages.
International Search Report and Written Opinion in International Appln. No. PCT/CN2021/091332, mailed on Jul. 26, 2021, 15 pages (with English translation).

* cited by examiner

DATA TRANSMISSION METHOD AND RELATED DEVICE

CROSS-REFERENCE TO RELATED APPLICATIONS

This application is a continuation of International Application No. PCT/CN2021/091332, filed on Apr. 30, 2021, which claims priority to Chinese Patent Application No. 202010731310.6, filed on Jul. 27, 2020. The disclosures of the aforementioned applications are hereby incorporated by reference in their entireties.

TECHNICAL FIELD

Embodiments of this application relate to the communication field, and in particular, to a data transmission method and a related device.

BACKGROUND

Option 3X (Option 3X) is a commonly used networking mode in a non-standalone (non-standalone, NSA) mode. In this mode, an LTE core network is still used as a core network, and an LTE access network device or an NR access network device is used as an access network device.

In option 3X networking, an NR user may exchange access signaling with the LTE core network over an LTE S1-C interface through the LTE access network device. A data plane is split to an NR RLC and an LTE RLC through an NR PDCP. In this networking mode, a carrier change often occurs due to movement of a terminal device. When the carrier change occurs, the terminal device needs to change a key, and needs to reestablish a PDCP entity by using a changed key, so that the PDCP entity reestablished by the terminal device performs data encryption and decryption by using the changed key.

Because the terminal device cannot receive data from a network device in a process of reestablishing the PDCP entity, a network delay is generated. Consequently, a data service is temporarily interrupted during the secondary carrier change, and user experience is affected.

SUMMARY

Embodiments of this application provide a data transmission method and a related device, to reduce a network delay generated by a terminal device during a carrier change, and further reduce a probability of data service interruption caused by the carrier change.

According to a first aspect, an embodiment of this application provides a data transmission method. The data transmission method relates to a primary network device, a secondary network device, and a terminal device. When a carrier change occurs (for example, the secondary network device is to be added, the secondary network device is to be deleted, or the secondary network device is to be changed), the primary network device sends a first message to the terminal device. Before the carrier change, the terminal device performs data encryption and decryption by using a key of the primary network device. The first message indicates the terminal device to still perform, after the carrier change, data encryption and decryption by using the key that is of the primary network device and that is stored in the terminal device.

In this embodiment of this application, when the carrier change occurs, the terminal device has stored the key of the primary network device. In addition, after the carrier change, the terminal device still uses the key of the primary network device. In other words, during the carrier change, the terminal device does not change the key, and the terminal device does not need to reestablish a PDCP entity. Therefore, a network delay generated because the terminal device reestablishes the PDCP entity during the carrier change is reduced, and further a probability of data service interruption caused by the carrier change can be reduced.

Based on the first aspect, in an optional implementation, the first message is a radio resource control RRC reconfiguration message, the RRC reconfiguration message carries first indication information, and the first indication information indicates to perform data encryption and decryption by using the key of the primary network device.

In this implementation, it is proposed that the first message indicates, via the first indication information, the terminal device to still use the key of the primary network device, and the key of the primary network device does not need to be sent to the terminal device, to ensure communication security.

Based on the first aspect or the foregoing optional implementation, in another optional implementation, before that the primary network device sends a first message to the terminal device, the method further includes: The primary network device receives a second message sent by the secondary network device, where the second message indicates that the secondary network device acknowledges that the change is to occur, and the second message carries the first indication information configured by the secondary network device.

In this implementation, it is proposed that the secondary network device includes, in the second message, the first indication information sent by the primary network device to the terminal device; and after receiving the first indication information, the primary network device forwards the first indication information to the terminal device.

Based on the first aspect or the foregoing optional implementation, in another optional implementation, before that the primary network device receives a second message sent by the secondary network device, the method further includes: The primary network device sends a third message to the secondary network device, where the third message carries the key of the primary network device, and the third message indicates the secondary network device to perform data encryption and decryption by using the key of the primary network device.

In this implementation, it is proposed that before the secondary network device sends the first indication information to the primary network device, the secondary network device receives the key of the master node from the primary network device. Therefore, the secondary network device is to establish a PDCP entity of the secondary network device by using the key of the primary network device in a subsequent process. Because both the secondary network device and the terminal device use the key of the primary network device, in a subsequent process of a data exchange between the secondary network device and the terminal device, data transmission interruption caused by key inconsistency can be avoided.

Based on the first aspect or the foregoing optional implementation, in another optional implementation, when a process of the carrier change is that the primary network device adds the secondary network device, the third message is a secondary carrier addition request, where the secondary carrier addition request is for requesting to add the secondary network device as a secondary carrier; and the second message is a secondary carrier addition request response, where the secondary carrier addition request response indicates that the secondary network device acknowledges addition and the secondary network device is to perform encryption and decryption by using the key of the master node.

In this implementation, an optional implementation of the third message and the second message in a case in which the primary network device adds the secondary network device is proposed. In other words, the key of the primary network device may be carried in the secondary carrier addition request, and the first indication information may be carried in the secondary carrier addition request response.

Based on the first aspect or the foregoing optional implementation, in another optional implementation, the method further includes: The primary network device controls a PDCP entity of the primary network device to send a downlink data packet to an RLC entity of the primary network device, and controls the RLC entity of the primary network device to send the downlink data packet to the terminal device, where a PDCP entity of the terminal device encrypts and decrypts the downlink data packet by using the key of the primary network device.

It should be understood that, the downlink data packet is transmitted from the RLC entity of the primary network device to the PDCP entity of the terminal device through a MAC entity of the primary network device, a physical layer of the primary network device, a physical layer of the terminal device, a MAC entity of the terminal device, an RLC entity of the terminal device, and the like. In this embodiment of this application, only transmitting the downlink data packet from the RLC entity of the primary network device to the PDCP entity of the terminal device is limited, and a specific transmission process between the two entities is not limited.

In this implementation, the primary network device, the terminal device, and the secondary network device all use the key of the primary network device. Therefore, when the PDCP entity of the secondary network device is not activated, the terminal device can receive the downlink data packet from the RLC entity of the primary network device through the PDCP entity of the terminal device by using the key of the primary network device. When the PDCP entity of the secondary network device is not activated, the terminal device can still receive the downlink data packet. Therefore, the delay generated because the terminal device reestablishes the PDCP entity is avoided, and the probability of the data transmission interruption can be effectively reduced.

Based on the first aspect or the foregoing optional implementation, in another optional implementation, when a process of the carrier change is that the primary network device initiates deletion of the secondary network device, before that the primary network device sends a first message to the terminal device, the method further includes: The primary network device sends a secondary carrier release request to the secondary network device, where the secondary carrier release request notifies the secondary network device to perform a release; and the primary network device receives a secondary carrier release response sent by the secondary network device, where the secondary carrier release response indicates that the secondary network device acknowledges the release.

Based on the first aspect or the foregoing optional implementation, in another optional implementation, when a process of the carrier change is that the secondary network device initiates deletion of the secondary network device, before that the primary network device sends a first message to the terminal device, the method further includes: The primary network device receives a secondary carrier release request sent by the secondary network device, where the secondary carrier release request is for requesting to release the secondary network device; and the primary network device sends a secondary carrier release acknowledge message to the secondary network device, where the secondary carrier release acknowledge message indicates that the secondary network device is allowed to perform a release.

Based on the first aspect or the foregoing optional implementation, in another optional implementation, regardless of whether the primary network device initiates deletion of the secondary network device or the secondary network device initiates deletion of the secondary network device, the data transmission method further includes: The primary network device controls an RLC entity of the primary network device to receive a downlink data packet from a PDCP entity of the secondary network device, where the PDCP entity of the secondary network device encrypts and decrypts the downlink data packet by using the key of the primary network device; and the primary network device controls the RLC entity of the primary network device to send the downlink data packet to the terminal device, where a PDCP entity of the terminal device encrypts and decrypts the downlink data packet by using the key of the primary network device.

In this implementation, the secondary network device is to be deleted, and the terminal device needs to change from a state in which the terminal device receives both the downlink data packet from the RLC entity of the primary network device and a downlink data packet from an RLC entity of the secondary network device to a state in which the terminal device receives only the downlink data packet from the RLC entity of the primary network device. The terminal device always uses the key of the primary network device before and after the secondary network device is changed. Therefore, even if the RLC entity of the secondary network device no longer sends the downlink data packet to the PDCP entity of the terminal device, the RLC entity of the primary network device still sends the downlink data packet to the PDCP entity of the terminal device, where the PDCP entity of the terminal device can perform data encryption and decryption by using the key of the primary network device. Therefore, a period within which the terminal device cannot receive the downlink data packet can be shortened, and a delay generated because the terminal device cannot receive the downlink data packet can be reduced.

Based on the first aspect or the foregoing optional implementation, in another optional implementation, when a process of the carrier change is a process of changing from one secondary network device to another secondary network device, the secondary network device in the foregoing implementations may be understood as a target secondary network device, namely, a secondary network device that performs data exchanges with the primary network device and the terminal device after the change. Before the change, a source secondary network device performs data exchanges with the primary network device and the terminal device. This implementation and subsequent implementations are described by using an example in which the source secondary network device is changed to the target secondary network device. In this case, the second message is a secondary carrier addition request response, and the second message indicates that the target secondary network device acknowledges addition and the target secondary network device is to perform encryption and decryption by using the key of the master node.

Based on the foregoing first aspect or the foregoing optional implementation, in another optional implementation, when the source secondary network device initiates a change to the target secondary network device, before that the primary network device sends a third message to the target secondary network device, the method further includes: The primary network device receives a secondary carrier change request sent by the source secondary network device, where the carrier change request carries identification information of the target secondary network device, and the secondary carrier change request indicates to change from the source secondary network device to the target secondary network device.

Based on the foregoing first aspect or the foregoing optional implementation, in another optional implementation, when the primary network device initiates a change to the source secondary network device, after that the primary network device receives a second message sent by the target secondary network device, the method further includes: The primary network device sends a carrier release request to the source secondary network device, where the carrier release request is for requesting to release the source secondary network device; and the primary network device receives a carrier release request response sent by the source secondary network device, where the carrier release request response is for acknowledging a release.

Based on the first aspect or the foregoing optional implementation, in another optional implementation, regardless of whether the source secondary network device initiates a change to the target secondary network device or the primary network device initiates a change to the source secondary network device, the data transmission method further includes: The primary network device controls an RLC entity of the primary network device to receive a downlink data packet from a PDCP entity of the source secondary network device, where the PDCP entity of the source secondary network device encrypts and decrypts the downlink data packet by using the key of the primary network device; and the primary network device controls the RLC entity of the primary network device to send the downlink data packet to the terminal device, where a PDCP entity of the terminal device encrypts and decrypts the downlink data packet by using the key of the primary network device.

In this implementation, the source secondary network device is to be deleted and the target secondary network device is to be added. Because the newly added target secondary network device is not activated, the downlink data packet cannot be immediately sent to the terminal device. Therefore, terminal device needs to change from a state in which the terminal device receives both the downlink data packet from the RLC entity of the primary network device and a downlink data packet from an RLC entity of the source secondary network device to a state in which the terminal device receives only the downlink data packet from the RLC entity of the primary network device. The terminal device always uses the key of the primary network device before and after the source secondary network device is changed. Therefore, even if the RLC entity of the source secondary network device no longer sends the downlink data packet to the PDCP entity of the terminal device, the RLC entity of the primary network device still sends the downlink data packet to the PDCP entity of the terminal device, where the PDCP entity of the terminal device can perform data encryption and decryption by using the key of the primary network device. Therefore, a period within which the terminal device cannot receive the downlink data packet can be shortened, and a delay generated because the terminal device cannot receive the downlink data packet can be reduced.

According to a second aspect, an embodiment of this application provides a data transmission method. The data transmission method relates to a primary network device, a secondary network device, and a terminal device. When a carrier change occurs (for example, the secondary network device is to be added, the secondary network device is to be deleted, or the secondary network device is to be changed), the terminal device receives a first message sent by the primary network device. Before the carrier change, the terminal device performs data encryption and decryption by using a key of the primary network device. The first message indicates the terminal device to perform, after the carrier change, data encryption and decryption by using the key that is of the primary network device and that is stored in the terminal device.

In this embodiment of this application, when the carrier change occurs, the terminal device has stored the key of the primary network device. In addition, after the carrier change, the terminal device still uses the key of the primary network device. In other words, during the carrier change, the terminal device does not change the key, and the terminal device does not need to reestablish a PDCP entity. Therefore, a network delay generated because the terminal device reestablishes the PDCP entity during the carrier change is reduced, and further a probability of data service interruption caused by the carrier change can be reduced.

Based on the second aspect, in an optional implementation, the first message is a radio resource control RRC reconfiguration message, the RRC reconfiguration message carries first indication information, and the first indication information indicates to perform data encryption and decryption by using the key of the primary network device.

In this implementation, it is proposed that the first message indicates, via the first indication information, the terminal device to still use the key of the primary network device, and the key of the primary network device does not need to be sent to the terminal device, to ensure communication security.

Based on the second aspect or the foregoing optional implementation, in another optional implementation, when a process of the carrier change is that the primary network device adds the secondary network device, the method further includes: The terminal device controls a PDCP entity of the terminal device to receive a downlink data packet from an RLC entity of the primary network device, where the downlink data packet is from a PDCP entity of the primary network device, and the PDCP entity of the terminal device encrypts and decrypts the downlink data packet by using the key of the primary network device.

In this implementation, the primary network device, the terminal device, and the secondary network device all use the key of the primary network device. Therefore, when a PDCP entity of the secondary network device is not activated, the terminal device can receive the downlink data packet from the RLC entity of the primary network device through the PDCP entity of the terminal device by using the key of the primary network device. When the PDCP entity of the secondary network device is not activated, the terminal device can still receive the downlink data packet. Therefore, the delay generated because the terminal device reestablishes the PDCP entity is avoided, and the probability of the data transmission interruption can be effectively reduced.

Based on the second aspect or the foregoing optional implementation, in another optional implementation, when a process of the carrier change is a process of deleting the secondary network device, the method further includes: The terminal device controls a PDCP entity of the terminal device to receive a downlink data packet from an RLC entity of the primary network device, where the downlink data packet is from a PDCP entity of the secondary network device, the secondary network device is a to-be-released network device, and both the PDCP entity of the terminal device and the PDCP entity of the secondary network device encrypt and decrypt the downlink data packet by using the key of the primary network device.

In this implementation, the secondary network device is to be deleted, and the terminal device needs to change from a state in which the terminal device receives both the downlink data packet from the RLC entity of the primary network device and a downlink data packet from an RLC entity of the secondary network device to a state in which the terminal device receives only the downlink data packet from the RLC entity of the primary network device. The terminal device always uses the key of the primary network device before and after the secondary network device is changed. Therefore, even if the RLC entity of the secondary network device no longer sends the downlink data packet to the PDCP entity of the terminal device, the RLC entity of the primary network device still sends the downlink data packet to the PDCP entity of the terminal device, where the PDCP entity of the terminal device can perform data encryption and decryption by using the key of the primary network device. Therefore, a period within which the terminal device cannot receive the downlink data packet can be shortened, and a delay generated because the terminal device cannot receive the downlink data packet can be reduced.

In addition, when a process of the carrier change is a process of changing from one secondary network device to another secondary network device, the secondary network device may be understood as a source secondary network device.

It should be noted that there are a plurality of other specific implementations in this embodiment of this application. For details, refer to specific implementations of the first aspect and beneficial effects of the specific implementations of the first aspect. Details are not described herein again.

According to a third aspect, an embodiment of this application provides a data transmission method. The data transmission method relates to a primary network device, a secondary network device, and a terminal device. When the primary network device initiates addition of the secondary network device, the secondary network device receives a third message sent by the primary network device, where the third message carries a key of the primary network device, and the third message indicates the secondary network device to perform data encryption and decryption by using the key of the primary network device; and then the secondary network device, a second message to the primary network device, where the second message indicates that the secondary network device acknowledges that a change is to occur, the second message carries first indication information configured by the secondary network device, and the first indication information indicates to perform data encryption and decryption by using the key of the primary network device.

Based on the third aspect, in an optional implementation, the third message is a secondary carrier addition request, where the secondary carrier addition request is for requesting to add the secondary network device as a secondary carrier; and the second message is a secondary carrier addition request response, where the secondary carrier addition request response indicates that the secondary network device acknowledges addition and the secondary network device is to perform encryption and decryption by using the key of the master node.

Based on the third aspect or the foregoing optional implementation, in another optional implementation, the method further includes: The secondary network device establishes a PDCP entity by using the key of the primary network device.

In this implementation, because the secondary network device establishes the PDCP entity by using the key of the primary network device, a downlink data packet that is encrypted by the PDCP entity of the secondary network device may be forwarded, through a plurality of entities, to a PDCP entity that is of the terminal device and that uses the key of the primary network device. Therefore, the terminal device does not need to reestablish a PDCP entity, so that a period within which the terminal device cannot receive the downlink data packet can be shortened, and a delay generated because the terminal device cannot receive the downlink data packet can be reduced.

It should be noted that there are a plurality of other specific implementations in this embodiment of this application. For details, refer to specific implementations of the first aspect and beneficial effects of the specific implementations of the first aspect. Details are not described herein again.

According to a fourth aspect, an embodiment of this application provides a data transmission method. The data transmission method relates to a primary network device, a secondary network device, and a terminal device. When the secondary network device is to be deleted, or when a source secondary network device is to be changed to a target secondary network device, the data transmission method includes: The secondary network device controls a PDCP entity of the secondary network device to send a downlink data packet to an RLC entity of the primary network device, where the PDCP entity of the secondary network device encrypts and decrypts the downlink data packet by using a key of the primary network device.

In this implementation, when learning that the secondary network device is to be deleted, the secondary network device may buffer a part of downlink data packets in the RLC entity of the primary network device, so that the primary network device controls the RLC entity to send the part of downlink data packets to the terminal device. Because both a PDCP entity of the terminal device and the PDCP entity of the secondary network device use the key of the primary network device, the PDCP entity of the terminal device may decrypt the downlink data packet, to reduce a network delay and avoid service interruption of the terminal device.

Based on the fourth aspect, in an optional implementation, when a process of a carrier change is that the primary network device initiates deletion of the secondary network device, before that the secondary network device controls a PDCP entity of the secondary network device to send a downlink data packet to an RLC entity of the primary network device, the method further includes: The secondary network device receives a secondary carrier release request sent by the primary network device, where the secondary carrier release request notifies the secondary network device to perform a release; and the secondary network device sends a secondary carrier release response to the primary network device, where the secondary carrier release response indicates that the secondary network device acknowledges the release.

Based on the fourth aspect or the foregoing optional implementation, in another optional implementation, when a process of a carrier change is that the secondary network device initiates deletion of the secondary network device, before that the secondary network device controls a PDCP entity of the secondary network device to send a downlink data packet to an RLC entity of the primary network device, the method further includes: The secondary network device sends a secondary carrier release request to the primary network device, where the secondary carrier release request is for requesting to release the secondary network device; and the secondary network device receives a secondary carrier release acknowledge message sent by the primary network device, where the secondary carrier release acknowledge message indicates that the secondary network device is allowed to perform a release.

Based on the fourth aspect or the foregoing optional implementation, in another optional implementation, when the source secondary network device initiates a change to the target secondary network device, the secondary network device is the source secondary network device. Before that the secondary network device controls a PDCP entity of the secondary network device to send a downlink data packet to an RLC entity of the primary network device, the method further includes: The secondary network device sends a carrier change request to the primary network device, where the carrier change request carries identification information of the target secondary network device, and the secondary carrier change request indicates to change from the source secondary network device to the target secondary network device, so that the primary network device sends the key of the primary network device to the target secondary network device.

Based on the fourth aspect or the foregoing optional implementation, in another optional implementation, when the primary network device initiates a change to the source secondary network device, the secondary network device is the source secondary network device. Before that the secondary network device controls a PDCP entity of the secondary network device to send a downlink data packet to an RLC entity of the primary network device, the method further includes: The secondary network device receives a carrier release request sent by the primary network device, where the carrier release request is for requesting to release the source secondary network device.

It should be noted that there are a plurality of other specific implementations in this embodiment of this application. For details, refer to specific implementations of the first aspect and beneficial effects of the specific implementations of the first aspect. Details are not described herein again.

According to a fifth aspect, an embodiment of this application provides a primary network device, including: a sending module, configured to send a first message to a terminal device, where the terminal device performs, before a carrier change, data encryption and decryption by using a key of the primary network device, and the first message indicates the terminal device to perform, after the carrier change, data encryption and decryption by using the key that is of the primary network device and that is stored in the terminal device.

Based on the fifth aspect, in an optional implementation, the first message is a radio resource control RRC reconfiguration message, the RRC reconfiguration message carries first indication information, and the first indication information indicates to perform data encryption and decryption by using the key of the primary network device.

Based on the fifth aspect or the foregoing optional implementation, in another optional implementation, the primary network device further includes a receiving module, configured to receive a second message sent by a secondary network device, where the second message indicates that the secondary network device acknowledges that the change is to occur, and the second message carries the first indication information configured by the secondary network device.

Based on the fifth aspect or the foregoing optional implementation, in another optional implementation, the sending module is further configured to send a third message to the secondary network device, where the third message carries the key of the primary network device, and the third message indicates the secondary network device to perform data encryption and decryption by using the key of the primary network device.

For example, when the primary network device initiates addition of the secondary network device, the third message is a secondary carrier addition request, where the secondary carrier addition request is for requesting to add the secondary network device as a secondary carrier; and the second message is a secondary carrier addition request response, where the secondary carrier addition request response indicates that the secondary network device acknowledges addition and the secondary network device is to perform encryption and decryption by using the key of the master node.

Based on the fifth aspect or the foregoing optional implementation, in another optional implementation, the primary network device further includes a processing module. The processing module is configured to: control a PDCP entity of the primary network device to send a downlink data packet to an RLC entity of the primary network device, and control the RLC entity of the primary network device to send the downlink data packet to the terminal device, where a PDCP entity of the terminal device encrypts and decrypts the downlink data packet by using the key of the primary network device.

Based on the fifth aspect or the foregoing optional implementation, in another optional implementation, when the primary network device initiates deletion of the secondary network device, the sending module is further configured to send a secondary carrier release request to the secondary network device, where the secondary carrier release request notifies the secondary network device to perform a release; and the receiving module is further configured to receive a secondary carrier release response sent by the secondary network device, where the secondary carrier release response indicates that the secondary network device acknowledges the release.

Based on the fifth aspect or the foregoing optional implementation, in another optional implementation, when the secondary network device initiates deletion of the secondary network device, the receiving module is further configured to receive a secondary carrier release request sent by the secondary network device, where the secondary carrier release request is for requesting to release the secondary network device; and the sending module is further configured to send a secondary carrier release acknowledge message to the secondary network device, where the secondary carrier release acknowledge message indicates that the secondary network device is allowed to perform a release.

Based on the fifth aspect or the foregoing optional implementation, in another optional implementation, a processing module is further configured to: control an RLC entity of the primary network device to receive a downlink data packet from a PDCP entity of the secondary network device, where the PDCP entity of the secondary network device encrypts and decrypts the downlink data packet by using the key of the primary network device; and the primary network device controls the RLC entity of the primary network device to send the downlink data packet to the terminal device, where a PDCP entity of the terminal device encrypts and decrypts the downlink data packet by using the key of the primary network device.

Based on the fifth aspect or the foregoing optional implementation, in another optional implementation, when a process of the carrier change is a process of changing from one secondary network device to another secondary network device, the secondary network device in the foregoing implementations is a target secondary network device, and the second message is a secondary carrier addition request response, where the second message indicates that the target secondary network device acknowledges addition and the target secondary network device is to perform encryption and decryption by using the key of the master node. If the secondary network device initiates a change from a source secondary network device to the target secondary network device, the receiving module is further configured to receive a secondary carrier change request sent by the source secondary network device, where the carrier change request carries identification information of the target secondary network device, and the secondary carrier change request indicates to change from the source secondary network device to the target secondary network device.

Based on the fifth aspect or the foregoing optional implementation, in another optional implementation, when a process of the carrier change is a process of changing from one secondary network device to another secondary network device, the secondary network device in the foregoing implementations may be understood as a target secondary network device, and the second message is a secondary carrier addition request response, where the second message indicates that the target secondary network device acknowledges addition and the target secondary network device is to perform encryption and decryption by using the key of the master node. If the primary network device initiates a change from a source secondary network device to the target secondary network device, the sending module is further configured to send a carrier release request to the source secondary network device, where the carrier release request is for requesting to release the source secondary network device; and the receiving module is further configured to receive a carrier release request response sent by the source secondary network device, where the carrier release request response is for acknowledging a release.

Based on the fifth aspect or the foregoing optional implementation, in another optional implementation, a processing module is further configured to: control an RLC entity of the primary network device to receive a downlink data packet from a PDCP entity of the source secondary network device, where the PDCP entity of the source secondary network device encrypts and decrypts the downlink data packet by using the key of the primary network device; and the primary network device controls the RLC entity of the primary network device to send the downlink data packet to the terminal device, where a PDCP entity of the terminal device encrypts and decrypts the downlink data packet by using the key of the primary network device.

It should be noted that there are a plurality of other specific implementations in this embodiment of this application. For details, refer to specific implementations of the first aspect and beneficial effects of the specific implementations of the first aspect. Details are not described herein again.

According to a sixth aspect, an embodiment of this application provides a terminal device, including: a receiving module, configured to receive a first message sent by a primary network device, where the terminal device performs, before a carrier change, data encryption and decryption by using a key of the primary network device, and the first message indicates the terminal device to perform, after the carrier change, data encryption and decryption by using the key that is of the primary network device and that is stored in the terminal device.

Based on the sixth aspect, in an optional implementation, the first message is a radio resource control RRC reconfiguration message, the RRC reconfiguration message carries first indication information, and the first indication information indicates to perform data encryption and decryption by using the key of the primary network device.

Based on the sixth aspect or the foregoing optional implementation, in another optional implementation, when the primary network device initiates addition of a secondary network device, a processing module in the terminal device is configured to control a PDCP entity of the terminal device to receive a downlink data packet from an RLC entity of the primary network device, where the downlink data packet is from a PDCP entity of the primary network device, and the PDCP entity of the terminal device encrypts and decrypts the downlink data packet by using the key of the primary network device.

Based on the sixth aspect or the foregoing optional implementation, in another optional implementation, when a secondary network device is to be deleted (for example, the primary network device initiates deletion of the secondary network device, the secondary network device initiates deletion of the secondary network device, a source secondary network device is changed to a target secondary network device), a processing module is configured to control a PDCP entity of the terminal device to receive a downlink data packet from an RLC entity of the primary network device, where the downlink data packet is from a PDCP entity of the secondary network device, the secondary network device is a to-be-released network device, and both the PDCP entity of the terminal device and the PDCP entity of the secondary network device encrypt and decrypt the downlink data packet by using the key of the primary network device.

It should be noted that there are a plurality of other specific implementations in this embodiment of this application. For details, refer to specific implementations of the second aspect and beneficial effects of the specific implementations of the second aspect. Details are not described herein again.

According to a seventh aspect, an embodiment of this application provides a secondary network device, including: a receiving module, configured to receive a third message sent by a primary network device, where the third message carries a key of the primary network device, and the third message indicates the secondary network device to perform data encryption and decryption by using the key of the primary network device; and a sending module, configured to send a second message to the primary network device, where the second message indicates that the secondary network device acknowledges that a change is to occur, the second message carries first indication information configured by the secondary network device, and the first indication information indicates to perform data encryption and decryption by using the key of the primary network device.

For example, when the primary network device initiates addition of the secondary network device, the third message is a secondary carrier addition request, where the secondary carrier addition request is for requesting to add the secondary network device as a secondary carrier; and the second message is a secondary carrier addition request response, where the secondary carrier addition request response indicates that the secondary network device acknowledges addition and the secondary network device is to perform encryption and decryption by using the key of the master node.

Based on the seventh aspect, in an optional implementation, the secondary network device further includes a processing module, configured to establish a PDCP entity by using the key of the primary network device.

It should be noted that there are a plurality of other specific implementations in this embodiment of this application. For details, refer to specific implementations of the third aspect and beneficial effects of the specific implementations of the third aspect. Details are not described herein again.

According to an eighth aspect, an embodiment of this application provides a secondary network device, including a processing module, configured to control a PDCP entity of the secondary network device to send a downlink data packet to an RLC entity of a primary network device, where the PDCP entity of the secondary network device encrypts and decrypts the downlink data packet by using a key of the primary network device.

Based on the eighth aspect or the foregoing optional implementation, in another optional implementation, when a process of a carrier change is that the secondary network device initiates deletion of the secondary network device, a sending module is further configured to send a secondary carrier release request to the primary network device, where the secondary carrier release request is for requesting to release the secondary network device. The secondary network device further includes a receiving module, configured to receive a secondary carrier release acknowledge message sent by the primary network device, where the secondary carrier release acknowledge message indicates that the secondary network device is allowed to perform a release.

Based on the eighth aspect or the foregoing optional implementation, in another optional implementation, when a source secondary network device initiates a change to a target secondary network device, the secondary network device is the source secondary network device. A sending module is further configured to send a carrier change request to the primary network device, where the carrier change request carries identification information of the target secondary network device, and the secondary carrier change request indicates to change from the source secondary network device to the target secondary network device, so that the primary network device sends the key of the primary network device to the target secondary network device.

Based on the eighth aspect or the foregoing optional implementation, in another optional implementation, when the primary network device initiates a change to a source secondary network device, the secondary network device is the source secondary network device. A receiving module is further configured to receive a carrier release request sent by the primary network device, where the carrier release request is for requesting to release the source secondary network device.

It should be noted that there are a plurality of other specific implementations in this embodiment of this application. For details, refer to specific implementations of the eighth aspect and beneficial effects of the specific implementations of the eighth aspect. Details are not described herein again.

According to a ninth aspect, an embodiment of this application provides a communication device. The communication device may be the primary network device in the foregoing implementations or a chip in the primary network device. The communication device may include a processing module and a transceiver module. When the communication device is the primary network device, the processing module may be a processor, and the transceiver module may be a transceiver. The primary network device may further include a storage module, and the storage module may be a memory. The storage module is configured to store instructions, and the processing module executes the instructions stored in the storage module, to enable the primary network device to perform the method according to any one of the first aspect or the implementations of the first aspect. When the communication device is the chip in the primary network device, the processing module may be a processor, and the transceiver module may be an input/output interface, a pin, a circuit, or the like. The processing module executes instructions stored in a storage module, to enable the primary network device to perform the method according to any one of the first aspect or the implementations of the first aspect. The storage module may be a storage module (for example, a register or a cache) in the chip, or may be a storage module (for example, a read-only memory or a random access memory) that is in the primary network device and that is located outside the chip.

According to a tenth aspect, an embodiment of this application provides a communication device. The communication device may be the terminal device in the foregoing implementations or a chip in the terminal device. The communication device may include a processing module and a transceiver module. When the communication device is the terminal device, the processing module may be a processor, and the transceiver module may be a transceiver. The terminal device may further include a storage module, and the storage module may be a memory. The storage module is configured to store instructions, and the processing module executes the instructions stored in the storage module, to enable the terminal device to perform the method according to any one of the second aspect or the implementations of the second aspect. When the communication device is the chip in the terminal device, the processing module may be a processor, and the transceiver module may be an input/output interface, a pin, a circuit, or the like. The processing module executes instructions stored in a storage module, to enable the terminal device to perform the method according to any one of the second aspect or the implementations of the second aspect. The storage module may be a storage module (for example, a register or a cache) in the chip, or may be a storage module (for example, a read-only memory or a random access memory) that is in the terminal device and that is located outside the chip.

According to an eleventh aspect, an embodiment of this application provides a communication device. The communication device may be the secondary network device in the foregoing implementations or a chip in the secondary network device. The communication device may include a processing module and a transceiver module. When the communication device is the secondary network device, the processing module may be a processor, and the transceiver module may be a transceiver. The secondary network device may further include a storage module, and the storage module may be a memory. The storage module is configured to store instructions, and the processing module executes the instructions stored in the storage module, to enable the secondary network device to perform the method according to any one of the third aspect or the implementations of the third aspect, or perform the method according to any one of the fourth aspect or the implementations of the fourth aspect. When the communication device is the chip in the secondary network device, the processing module may be a processor, and the transceiver module may be an input/output interface, a pin, a circuit, or the like. The processing module executes instructions stored in a storage module, to enable the secondary network device to perform the method according to any one of the third aspect or the implementations of the third aspect, or perform the method according to any one of the fourth aspect or the implementations of the fourth aspect. The storage module may be a storage module (for example, a register or a cache) in the chip, or may be a storage module (for example, a read-only memory or a random access memory) that is in the secondary network device and that is located outside the chip.

For example, the secondary network device may be the source secondary network device or the target secondary network device in the foregoing implementations.

According to a twelfth aspect, this application provides a communication apparatus, and the apparatus may be an integrated circuit chip. The integrated circuit chip includes a processor. The processor is coupled to a memory, and the memory is configured to store a program or instructions. When the program or the instructions are executed by the processor, the communication apparatus is enabled to perform the method according to any one of the first aspect or the implementations of the first aspect.

According to a thirteenth aspect, this application provides a communication apparatus, and the apparatus may be an integrated circuit chip. The integrated circuit chip includes a processor. The processor is coupled to a memory, and the memory is configured to store a program or instructions. When the program or the instructions are executed by the processor, the communication device is enabled to perform the method according to any one of the second aspect or the implementations of the second aspect.

According to a fourteenth aspect, this application provides a communication apparatus, and the apparatus may be an integrated circuit chip. The integrated circuit chip includes a processor. The processor is coupled to a memory, and the memory is configured to store a program or instructions. When the program or the instructions are executed by the processor, the communication device is enabled to perform the method according to any one of the third aspect or the implementations of the third aspect.

According to a fifteenth aspect, this application provides a communication apparatus, and the apparatus may be an integrated circuit chip. The integrated circuit chip includes a processor. The processor is coupled to a memory, and the memory is configured to store a program or instructions. When the program or the instructions are executed by the processor, the communication device is enabled to perform the method according to any one of the fourth aspect or the implementations of the fourth aspect.

According to a sixteenth aspect, an embodiment of this application provides a computer program product including instructions. When the computer program product runs on a computer, the computer is enabled to perform the method described in any one of the first aspect to the fourth aspect and the implementations of the first aspect to the fourth aspect.

According to a seventeenth aspect, an embodiment of this application provides a computer-readable storage medium, including instructions. When the instructions are run on a computer, the computer is enabled to perform the method described in any one of the first aspect to the fourth aspect and the implementations of the first aspect to the fourth aspect.

According to an eighteenth aspect, an embodiment of this application provides a communication system. The communication system includes the communication device according to any one of the first aspect and the implementations of the first aspect, the communication device according to any one of the second aspect and the implementations of the second aspect, and the communication device according to any one of the third aspect and the implementations of the third aspect. Alternatively, the communication system includes the communication device according to any one of the first aspect and the implementations of the first aspect, the communication device according to any one of the second aspect and the implementations of the second aspect, and the communication device according to any one of the fourth aspect and the implementations of the fourth aspect.

It can be learned from the foregoing technical solutions that embodiments of this application have the following advantages:

In embodiments of this application, when the carrier change occurs, the primary network device sends the first message to the terminal device, where the first message indicates the terminal device to perform data encryption and decryption by using the key that is of the primary network device and that is used by the terminal device before the carrier change. The terminal device has stored the key of the primary network device. In addition, after the carrier change, the terminal device still uses the key of the primary network device. In other words, during the carrier change, the terminal device does not change the key, and the terminal device does not need to reestablish the PDCP entity. Therefore, the network delay generated because the terminal device reestablishes the PDCP entity during the carrier change is reduced, and further the probability of the data service interruption caused by the carrier change can be reduced.

BRIEF DESCRIPTION OF DRAWINGS

To describe technical solutions in embodiments of this application more clearly, the following briefly describes the accompanying drawings for describing embodiments. It is clear that the accompanying drawings in the following descriptions show merely some embodiments of this application.

DESCRIPTION OF EMBODIMENTS

Figure 1:
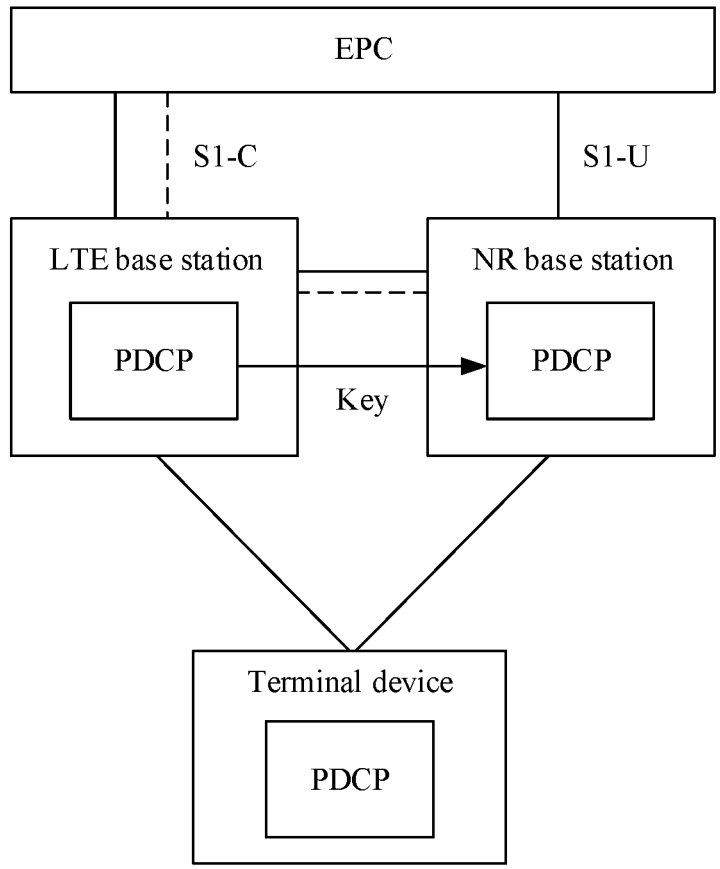
FIG. 1 is a diagram of a system architecture of option 3X according to an embodiment of this application.

The following clearly and completely describes technical solutions in embodiments of this application with reference to the accompanying drawings in embodiments of this application. It is clear that the described embodiments are merely some but not all of embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that data termed in such a way is interchangeable in proper circumstances, so that embodiments described herein can be implemented in other orders than the order illustrated or described herein. In addition, the terms "include", "have", and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Embodiments of this application provide a data transmission method and a related device, to reduce a network delay generated by a terminal device during a carrier change, and further reduce a probability of data service interruption caused by the carrier change.

For ease of understanding, the following first explains technical terms in embodiments of this application.

A packet data convergence protocol (packet data convergence protocol, PDCP) is a radio transmission protocol stack that is responsible for performing header compression and decompression, transmitting user data, and maintaining a sequence number of a radio bearer. An entity using the protocol is referred to as a PDCP entity. The PDCP entity includes the following functions: header compression and decompression using a robust header compression (robust header compression, ROHC) protocol, encryption and decryption, and integrity protection and integrity verification. In embodiments of this application, the function of encryption and decryption of the PDCP entity is mainly described. The terminal device, a primary network device, and a secondary network device described in embodiments of this application each include at least one PDCP entity.

A radio link control (radio link control, RLC) protocol is a radio link control layer protocol in a wireless communication system. An entity using the RLC protocol is referred to as an RLC entity. The RLC entity is located above a medium access control (medium access control, MAC) entity, and mainly provides a segmentation and concatenation service and a retransmission service for user data. In embodiments of this application, a function of forwarding a downlink data packet by the RLC entity is mainly described. The terminal device, the primary network device, and the secondary network device described in embodiments of this application each include at least one RLC entity.

The following first describes a system architecture and an application scenario to which the data transmission method provided in embodiments of this application is applicable.

The data transmission method provided in embodiments of this application is applied to an option 3X (option 3X) architecture in a non-standalone mode. As shown in FIG. 1, in the option 3X architecture, a 4G core network (evolved packet core, EPC) is used as a core network, and a 4G base station or an NR base station is used as an access network.

In this architecture, if a terminal device is connected only to an LTE base station, a downlink data packet (namely, user data) is directly sent from the EPC to a PDCP entity of the LTE base station, then is transmitted to an RLC entity (not shown in the figure) of the LTE base station through the PDCP entity of the LTE base station, and then is transmitted from the RLC entity of the LTE base station to a PDCP entity of the terminal device through MAC layers, physical layers, and the like. In this case, both the PDCP entity of the LTE base station and the PDCP entity of the terminal device use a key of the LTE base station. However, if the NR base station is added as a secondary carrier, downlink data packets (namely, user data) are directly sent from the EPC to a PDCP entity of the NR base station, then are split by the PDCP entity of the NR base station to an RLC entity of an LTE base station and an RLC entity of the NR base station, and finally are transmitted by the RLC entity of the LTE base station and the RLC entity of the NR base station to a PDCP entity of a terminal device.

To enable the PDCP entity of the terminal device to decrypt the downlink data packets from the PDCP entity of the NR base station, the terminal device needs to use a key the same as a key used by the PDCP entity of the NR base station. Because the newly added NR base station usually establishes the PDCP entity by using a new key, the terminal device needs to change the key and reestablish a PDCP entity. As a result, a network delay is generated, and user data transmission is interrupted.

Alternatively, when a secondary carrier needs to be deleted (for example, the NR base station is to be deleted) or a secondary carrier needs to be changed (for example, an NR base station A is to be changed to an NR base station B), there is a case in which the terminal device reestablishes a PDCP entity due of a key change. As a result, a network delay is generated, and user data transmission is interrupted.

In view of this, embodiments of this application provide the data transmission method for the system architecture and application scenario, to reduce the network delay generated by the terminal device during a carrier change, and further reduce a probability of data service interruption caused by the carrier change.

Figure 2:
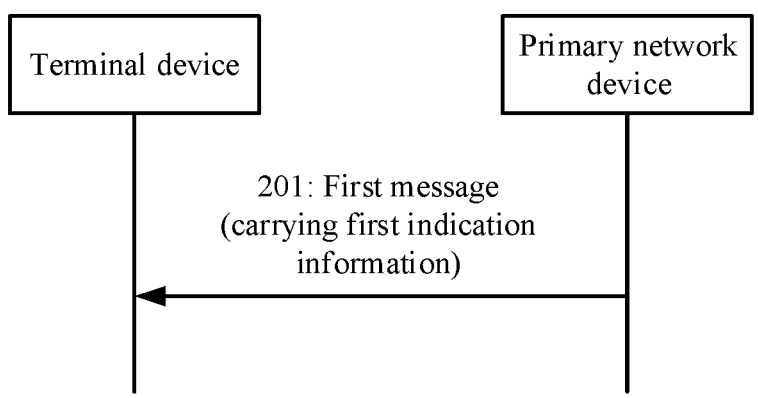
FIG. 2 is a flowchart of a data transmission method according to an embodiment of this application.

The following describes the data transmission method provided in embodiments of this application from the perspective of a data exchange between a primary network device, a secondary network device, and a terminal device with reference to FIG. 2.

It should be noted that, in this embodiment, the primary network device is an access network (radio access network, RAN) device that currently provides a service for the terminal device, and may be a 4G radio access network device or a device that communicates with a wireless terminal device over an air interface in a 4G access network through one or more cells. For example, the primary network device may be the LTE base station shown in FIG. 1, or may be referred to as an evolved NodeB (evolved NodeB, NodeB, eNB, or e-NodeB) in a long term evolution LTE system or a long term evolution advanced (LTE-advanced, LTE-A) system. In a carrier aggregation or carrier change scenario, the primary network device can affect whether another network device can access the system, so that the primary network device is also referred to as a primary base station (primary evolved NodeB, P-eNB) or a master node (master evolved NodeB, MeNB). The primary network device may be configured to: mutually convert a received over-the-air frame and an internet protocol (internet protocol, IP) packet, and serve as a router between the terminal device and a remaining portion of the access network. The remaining portion of the access network may include an IP network. The primary network device may further coordinate attribute management of the air interface. This is not specifically limited herein.

It should be understood that the primary network device in embodiments of this application may be any one of the foregoing devices or a chip in the device. This is not specifically limited herein. Either being a device or a chip, the primary network device may be manufactured, sold, or used as an independent product. In this embodiment and subsequent embodiments, only the primary network device is used as an example for description.

The secondary network device may be a new radio (new radio, NR) access network RAN device, for example, the NR base station shown in FIG. 1; may be a device that communicates with a wireless terminal device over an air interface in an NR access network through one or more cells; or may include a central unit (central unit, CU) and a distributed unit (distributed unit, DU) in a cloud access network (Cloud RAN) system. For example, the secondary network device may be a next generation NodeB (next generation NodeB, gNB) in an NR system. When there are a plurality of secondary network devices, the plurality of secondary network devices may be respectively represented as a source next generation node (source next generation NodeB, S-gNB) (namely, a source secondary network device or a source base station) and a target next generation node (target next generation NodeB, T-gNB) (namely, a target secondary network device or a target base station). The source secondary network device is a secondary network device that communicates with the terminal device and the primary network device before a change, and the target secondary network device is a secondary network device that communicates with the terminal device and the primary network device after the change. In other words, the source secondary network device is changed to the target secondary network device. The secondary network device may be configured to: mutually convert a received over-the-air frame and an internet protocol IP packet, and serve as a router between the terminal device and a remaining part of the access network, where the remaining part of the access network may include an IP network. The secondary network device may further coordinate attribute management of the air interface. This is not specifically limited herein. In addition, the secondary network device communicates with the primary network device through an X2 interface.

It should be understood that the secondary network device in embodiments of this application may be any one of the foregoing devices or a chip in the device. This is not specifically limited herein. Either being a device or a chip, the secondary network device may be manufactured, sold, or used as an independent product. In this embodiment and subsequent embodiments, only the secondary network device is used as an example for description.

In addition, the terminal device includes a device that provides voice and/or data connectivity for a user. For example, the terminal device may include a handheld device having a wireless connection function, or a processing device connected to a wireless modem. The terminal device may communicate with a core network (for example, the 4G core network EPC) through a radio access network RAN (for example, the primary network device or the secondary network device), and may exchange a voice and/or data with the RAN. The terminal device may include user equipment (user equipment, UE), a wireless terminal device, a mobile terminal device, a subscriber unit (subscriber unit), a subscriber station (subscriber station), a mobile station (mobile station), a remote station (remote station), an access point (access point, AP), a remote terminal device (remote terminal), an access terminal device (access terminal), a user terminal device (user terminal), a user agent (user agent), a user device (user device), or the like. In addition, the terminal device may alternatively be a vehicle-mounted terminal, for example, a telematics box (telematics box, T-Box), a domain controller (domain controller, DC), a multi domain controller (multi domain controller, MDC), or an on board unit (on board unit, OBU) that are integrated in a vehicle. The terminal device may alternatively be a wearable device, such as glasses, gloves, watches, clothing, and shoes, or another portable device that may be directly worn on a body or integrated into clothes or accessories of a user. This is not specifically limited in this application.

It should be understood that the terminal device in embodiments of this application may be any one of the foregoing devices or a chip. This is not specifically limited herein. Either being a device or a chip, the terminal device may be manufactured, sold, or used as an independent product. In this embodiment and subsequent embodiments, only the terminal device is used as an example for description.

As shown in FIG. 2, when the carrier change occurs, the devices in the data transmission method perform the following steps.

201: The primary network device sends a first message to the terminal device.

The primary network device is an access network device that provides a service for the terminal device, and is also an access network device that determines whether to perform the carrier change.

Before the carrier change, the terminal device receives, from the primary network device, a downlink data packet from the core network, or receives, from both the primary network device and another secondary network device, downlink data packets from the core network. In this case, the terminal device uses a key of the primary network device (hereinafter briefly referred to as a key of a master node). To be specific, a PDCP entity of the terminal device is established by using the key of the master node. The PDCP entity of the terminal device can pack and encrypt data by using the key of the master node, and the PDCP entity of the terminal device can also decrypt a data packet that is encrypted by using the key of the master node.

When the primary network device initiates a process of the carrier change, the primary network device sends the first message to the terminal device, where the first message indicates the terminal device to perform, after the carrier change, data encryption and decryption by using the key that is of the master node and that is stored in the terminal device. In addition, if the process of the carrier change is adding a secondary carrier, the primary network device is to notify a to-be-added secondary network device to use the key of the master node. If the process of the carrier change is changing an added secondary carrier to another secondary carrier, the primary network device is to notify a changed secondary network device to use the key of the master node. It should be understood that, if the primary network device is to delete the added secondary carrier, and only the primary network device performs data transmission with the terminal device, the terminal device still uses the key of the master node.

Optionally, the first message carries first indication information, and the first indication information indicates to perform data encryption and decryption by using the key of the primary network device. For example, the first message is a radio resource control RRC reconfiguration (RRC connection reconfiguration) message, and the RRC reconfiguration message carries the first indication information. The first indication information may be an identifier, and the identifier indicates the key of the primary network device. For example, the first indication information may be indicated by a key to use (key to use) information element. Generally, when the key to use information element is configured as master, it indicates that the key of the master node is used. When the key to use information element is configured as slave, it indicates that a key of a secondary node is used. It should be understood that in actual application, the first indication information may alternatively be indicated in another form. A specific form of the first indication information is not limited in this embodiment of this application.

In this embodiment, when the carrier change occurs, the primary network device sends the first message to the terminal device, where the first message indicates the terminal device to perform data encryption and decryption by using the key that is of the primary network device and that is used by the terminal device before the carrier change. The terminal device has stored the key of the primary network device. In addition, after the carrier change, the terminal device still uses the key of the primary network device. In other words, during the carrier change, the terminal device does not change the key, and the terminal device does not need to reestablish a PDCP entity. Therefore, a network delay generated because the terminal device reestablishes the PDCP entity during the carrier change is reduced, and further a probability of data service interruption caused by the carrier change can be reduced.

Based on the embodiment corresponding to FIG. 2, the process of the carrier change mainly includes the following three scenarios:

(1) adding the secondary carrier, which means that the primary network device adds the secondary network device, so that the secondary network device participates in data split; (2) deleting the secondary carrier, which means that the added secondary network device is deleted, where a process of deleting the secondary carrier may be initiated by the primary network device, or may be initiated by the secondary network device; and (3) changing from one carrier to another carrier, which means that one secondary network device is changed to another secondary network device, where this process may be initiated by the primary network device, or may be initiated by the secondary network device. The following separately describes the foregoing scenarios.

Figure 3A:
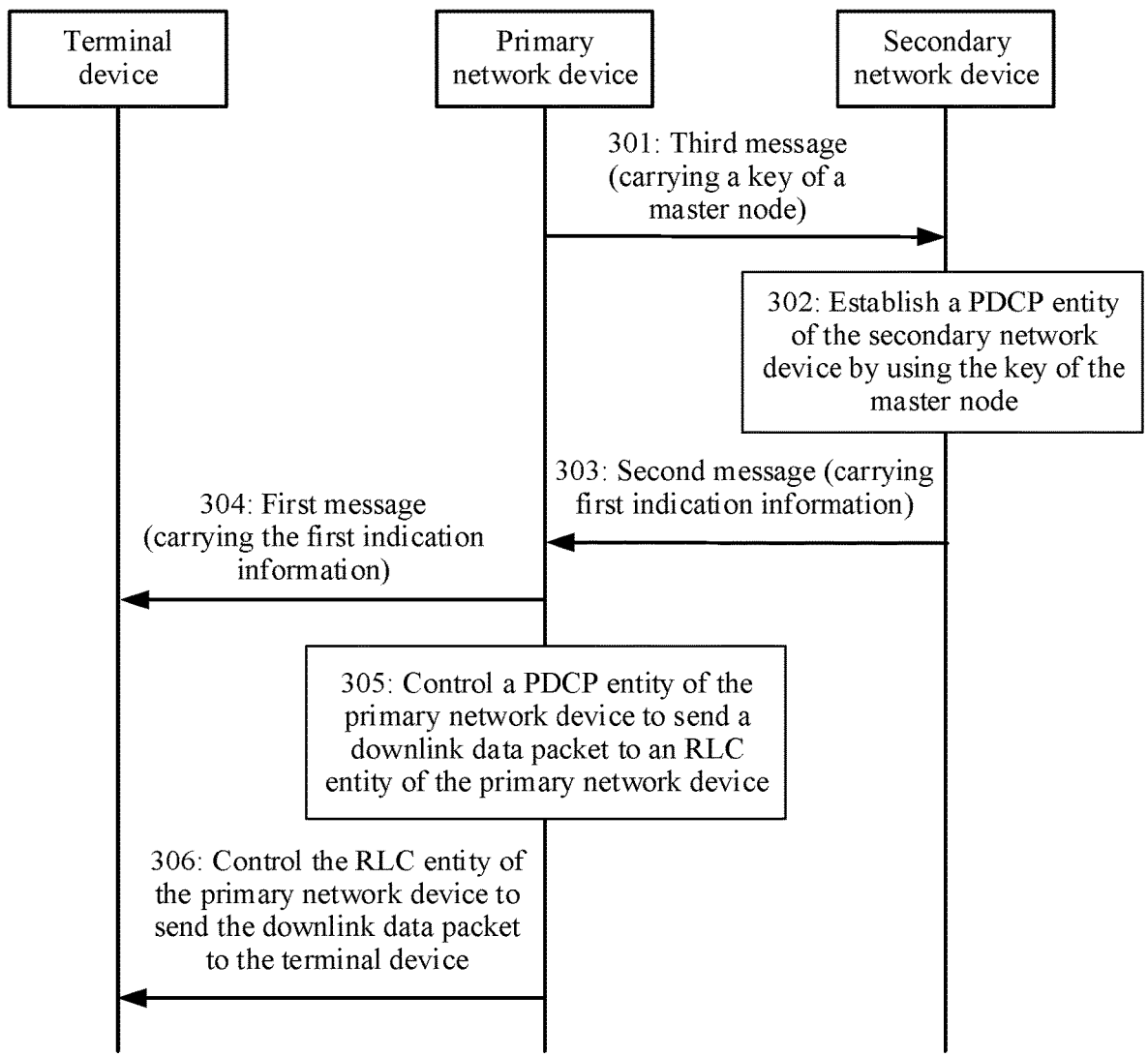
FIG. 3A is another flowchart of a data transmission method according to an embodiment of this application.

FIG. 3A shows a process of a signaling exchange between a primary network device, a secondary network device, and a terminal device when the primary network device initiates addition of the secondary network device.

Figure 3B:
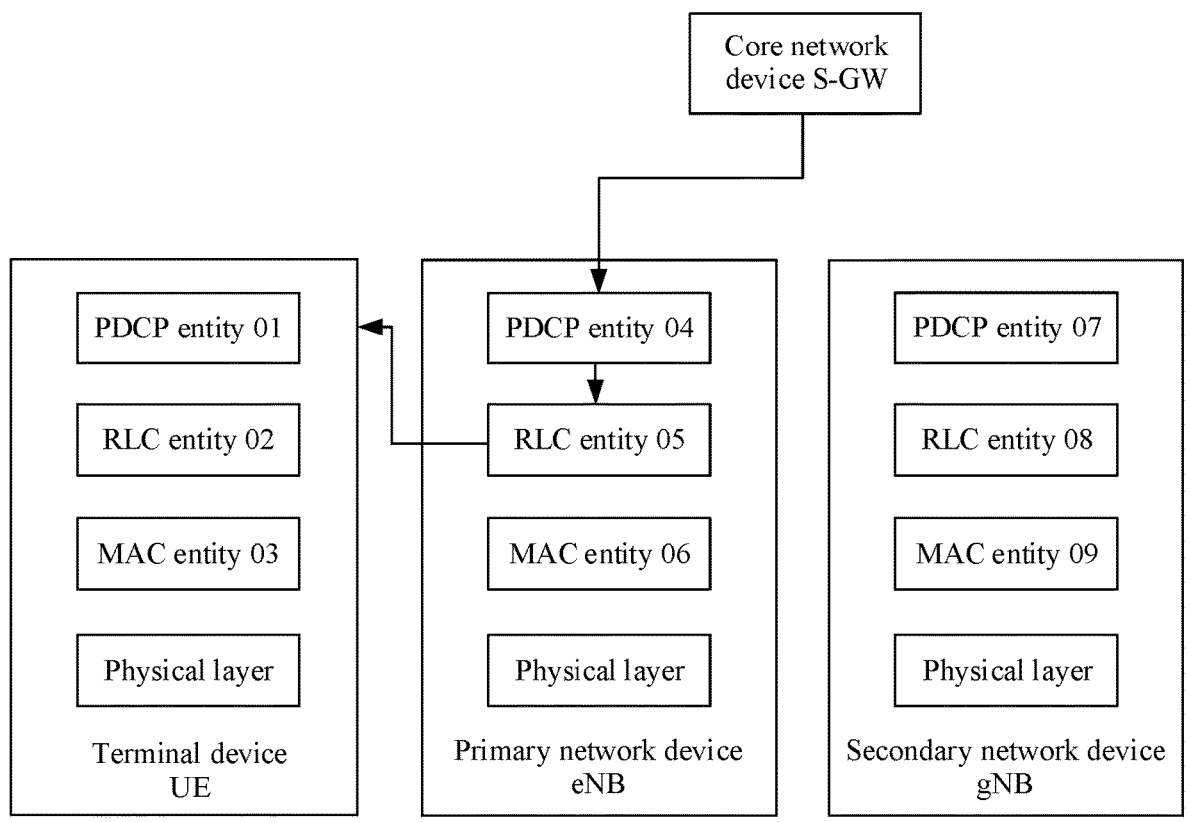
FIG. 3B is a schematic diagram of an embodiment of a transmission path of a downlink data packet according to an embodiment of this application.

Before the primary network device adds the secondary network device, the terminal device receives a downlink data packet from a core network through the primary network device, and performs data encryption and decryption by using a key of the primary network device (namely, a key of a master node). Specifically, as shown in FIG. 3B, a core network device sends a downlink data packet to a PDCP entity 04 of the primary network device, where the PDCP entity 04 of the primary network device encrypts and decrypts the downlink data packet by using a key of a master node. The primary network device controls the PDCP entity 04 to transmit, to an RLC entity 05 of the primary network device, the downlink data packet that is encrypted by using the key of the master node. Then, the RLC entity 05 transmits the downlink data packet to a PDCP entity 01 of the terminal device through MAC layers and physical layers. After the terminal device receives the downlink data packet, the terminal device may control the PDCP entity 01 to decrypt the downlink data packet by using the key of the master node, to obtain service data of the downlink data packet.

It should be understood that, the downlink data packet is transmitted from the RLC entity 05 of the primary network device to the PDCP entity 01 of the terminal device through a MAC entity 06 of the primary network device, a physical layer of the primary network device, a physical layer of the terminal device, a MAC entity 03 of the terminal device, an RLC entity 02 of the terminal device, and the like. In this embodiment of this application, only transmitting the downlink data packet from the RLC entity 05 of the primary network device to the PDCP entity 01 of the terminal device is limited, and a specific transmission process between the two entities is not limited.

When the primary network device prepares to add the secondary network device, the primary network device and the secondary network device (namely, a to-be-added secondary network device) perform the following steps.

301: The primary network device sends a third message to the secondary network device.

The third message carries the key of the master node, and indicates the secondary network device to perform data encryption and decryption by using the key of the master node. In other words, the key of the master node indicates the secondary network device to establish a PDCP entity by using the key of the master node.

For example, the third message is a secondary carrier addition request (S-gNB addition request), and the secondary carrier addition request is for requesting to add the secondary network device as a secondary carrier.

302: The secondary network device establishes the PDCP entity of the secondary network device by using the key of the master node.

After the secondary network device receives the third message and obtains the key that is of the master node and that is carried in the third message, the secondary network device establishes the PDCP entity of the secondary network device by using the key of the master node. It should be understood that the PDCP entity established by the secondary network device by using the key of the master node cannot immediately participate in data packet transmission. The PDCP entity of the secondary network device can be activated for use only after the terminal device accesses the secondary network device and the primary network device notifies the core network device that a carrier change has occurred. A process of a signaling exchange between the primary network device and the core network device is described in detail in a subsequent embodiment corresponding to FIG. 4A and FIG. 4B, and details are not described herein again.

In a conventional technology, a primary network device sends only a key of a secondary network device (namely, a key of a secondary node) to the to-be-added secondary network device, where the key of the secondary node is generally a key derived from a key of a master node, and the key of the secondary node is different from the key of the master node. However, in the present invention, the primary network device sends the key of the master node to the secondary network device, and notifies the terminal device to also use the key of the master node in a subsequent step, so that both the secondary network device and the terminal device use the key of the master node. In this way, after the secondary network device participates in the data packet transmission, a PDCP entity of the terminal device can receive downlink data packets from the PDCP entity of the secondary network device.

303: The secondary network device sends a second message to the primary network device.

In this embodiment, the second message indicates that the secondary network device acknowledges that the secondary network device is to be added as the secondary carrier.

The second message carries first indication information, and the first indication information indicates to perform data encryption and decryption by using the key of the master node. In addition, the first indication information is configured by the secondary network device. It may be understood as that the secondary network device includes the first indication information in the second message. In one aspect, it indicates that the secondary network device has acknowledged that the secondary network device is to establish the PDCP entity by using the key of the master node in a subsequent process. In another aspect, it indicates that the first indication information notifies the primary network device, so that the primary network device indicates, based on the first indication information in the second message, the terminal device to also use the key of the master node. Based on the latter aspect, the first indication information in the second message may be used as a trigger source to trigger the primary network device to perform subsequent step 304.

For example, the second message is a secondary carrier addition request response (S-gNB addition request acknowledge), the secondary carrier addition request response carries a plurality of information elements, and one information element indicating a key is a key to use information element. The secondary network device sets the key to use information element to "master", to indicate that the secondary network device uses the key of the master node. It should be understood that in actual application, another information element may be used as the first indication information. This is not specifically limited herein.

It should be understood that there is no definite limitation on a time sequence between step 302 and step 303. In other words, the secondary network device may first perform step 302 and then perform step 303, or may first perform step 303 and then perform step 302. This is not specifically limited herein.

304: The primary network device sends the first message to the terminal device.

When the primary network device receives the second message from the secondary network device, and obtains the first indication information from the second message, the primary network device may determine that the secondary network device is to perform encryption and decryption by using the key of the master node in a subsequent process. Therefore, the primary network device includes the first indication information in the first message, and sends the first message to the terminal device.

For example, the first message is an RRC reconfiguration (RRC connection reconfiguration) message, and the RRC reconfiguration message carries the first indication information. If the first indication information in step 303 is indicated by the key to use information element set to "master", the first indication information in the RRC reconfiguration message is also the key to use information element set to "master".

It should be understood that neither the second message nor the first message directly carries the key of the master node, but carries the first indication information indicating the key of the master node. Because the terminal device uses the key of the master node before the addition of the secondary network device, the terminal device stores the key of the master node, and the PDCP entity of the terminal device is also established by using the key of the master node. Therefore, after the terminal device receives the first indication information, the terminal device can directly use the PDCP entity of the terminal device to decrypt a downlink data packet that is encrypted by using the key of the master node, without recalculating a key or reestablishing a PDCP entity.

305: The primary network device controls a PDCP entity of the primary network device to send a downlink data packet to an RLC entity of the primary network device.

306: The primary network device controls the RLC entity of the primary network device to send the downlink data packet to the terminal device.

In this embodiment, after receiving the first indication information, the terminal device still uses the key of the master node. Therefore, the PDCP entity of the terminal device can decrypt the downlink data packet that is encrypted by the PDCP entity of the primary network device by using the key of the master node. Therefore, the primary network device controls the PDCP entity of the primary network device to send the downlink data packet to the PDCP entity of the primary network device, and then the primary network device controls the RLC entity of the primary network device to send the downlink data packet to the terminal device, that is, transmit the downlink data packet to the PDCP entity of the terminal device through MAC layers and physical layers. It should be understood that a flow direction of the downlink data packet is the same as a flow direction of the downlink data packet in a case in which the primary network device has not added the secondary network device. As shown in FIG. 3B, because a PDCP entity 07 of the secondary network device is not activated, the core network device temporarily cannot allocate downlink data packets to the PDCP entity of the secondary network device. In this case, the core network device still sends the downlink data packet to the PDCP entity 04 of the primary network device, where the PDCP entity 04 of the primary network device encrypts and decrypts the downlink data packet by using the key of the master node. The primary network device controls the PDCP entity 04 to transmit, to the RLC entity 05 of the primary network device, the downlink data packet that is encrypted by using the key of the master node. Then, the RLC entity 05 transmits the downlink data packet to the PDCP entity 01 of the terminal device through the MAC layers and the physical layers. After the terminal device receives the downlink data packet, the terminal device may control the PDCP entity 01 to decrypt the downlink data packet by using the key of the master node, to obtain the service data of the downlink data packet.

It should be understood that, in the conventional technology, when adding the secondary network device, the primary network device sends, to the secondary network device, the key of the secondary node that is different from the key of the master node. However, a PDCP entity of a terminal device currently uses the key of the master node, and the terminal device may not be able to decrypt a data packet that is encrypted by using the key of the secondary node. As a result, the terminal device needs to reestablish a PDCP entity. Before the terminal device reestablishes the PDCP entity, a PDCP entity of the primary network device is frozen, and does not transmits a downlink data packet to the terminal device. When a PDCP entity that is of the secondary network device and that uses the key of the secondary node is activated, the PDCP entity that is reestablished by the terminal device and that uses the key of the secondary node is activated, and a core network device has acknowledged addition of a secondary carrier, the PDCP entity of the terminal device can receive the downlink data packet. However, in the present invention, the terminal device does not need to reestablish the PDCP entity, and does not need to wait for an exchange between a network device side and the core network device before starting to receive the downlink data packet again. Therefore, a network delay can be shortened, and a probability of data service interruption caused by the addition of the secondary carrier is further reduced.

Figure 4A:
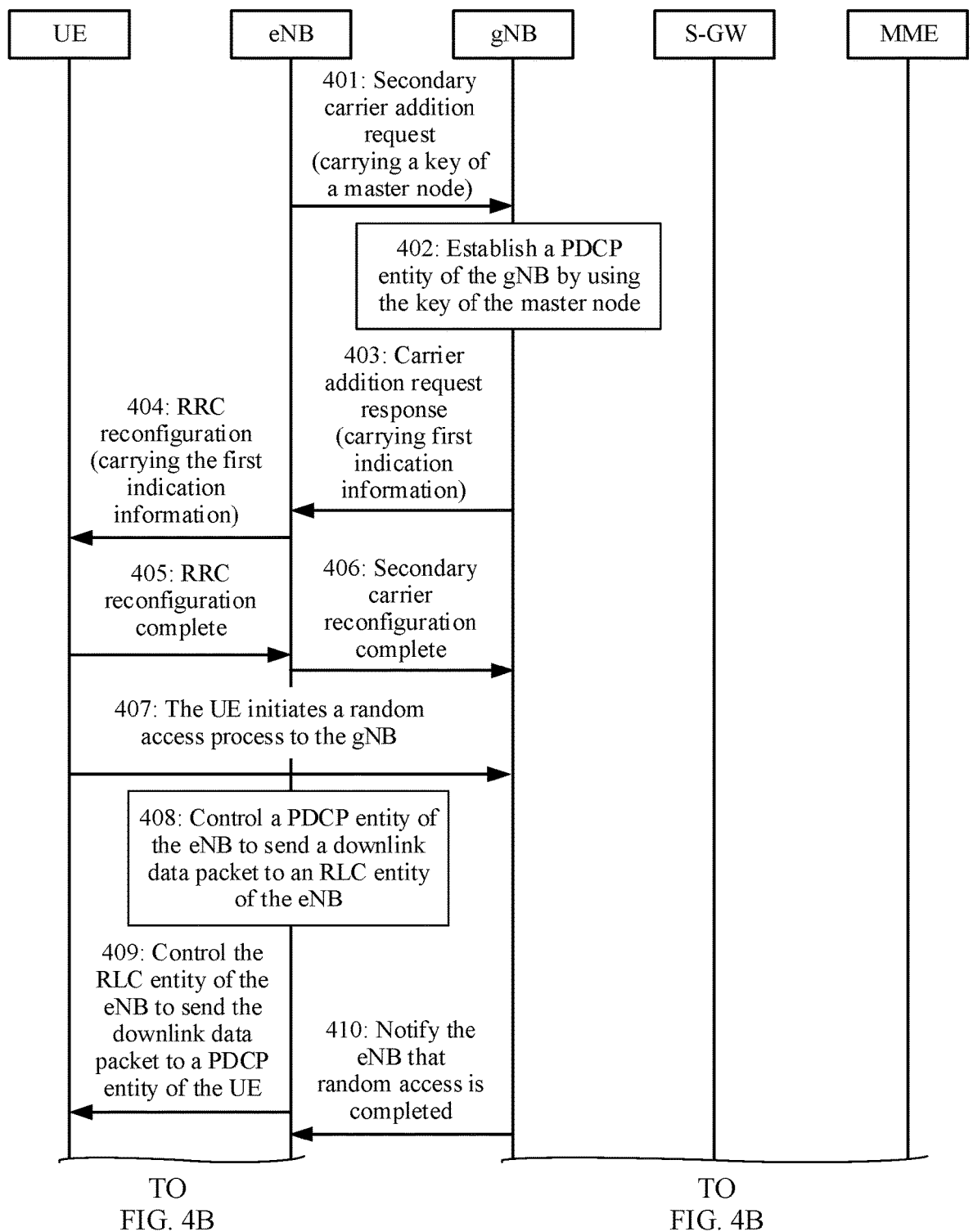
FIG. 4A and FIG. 4B are another flowchart of a data transmission method according to an embodiment of this application.
Figure 4B:
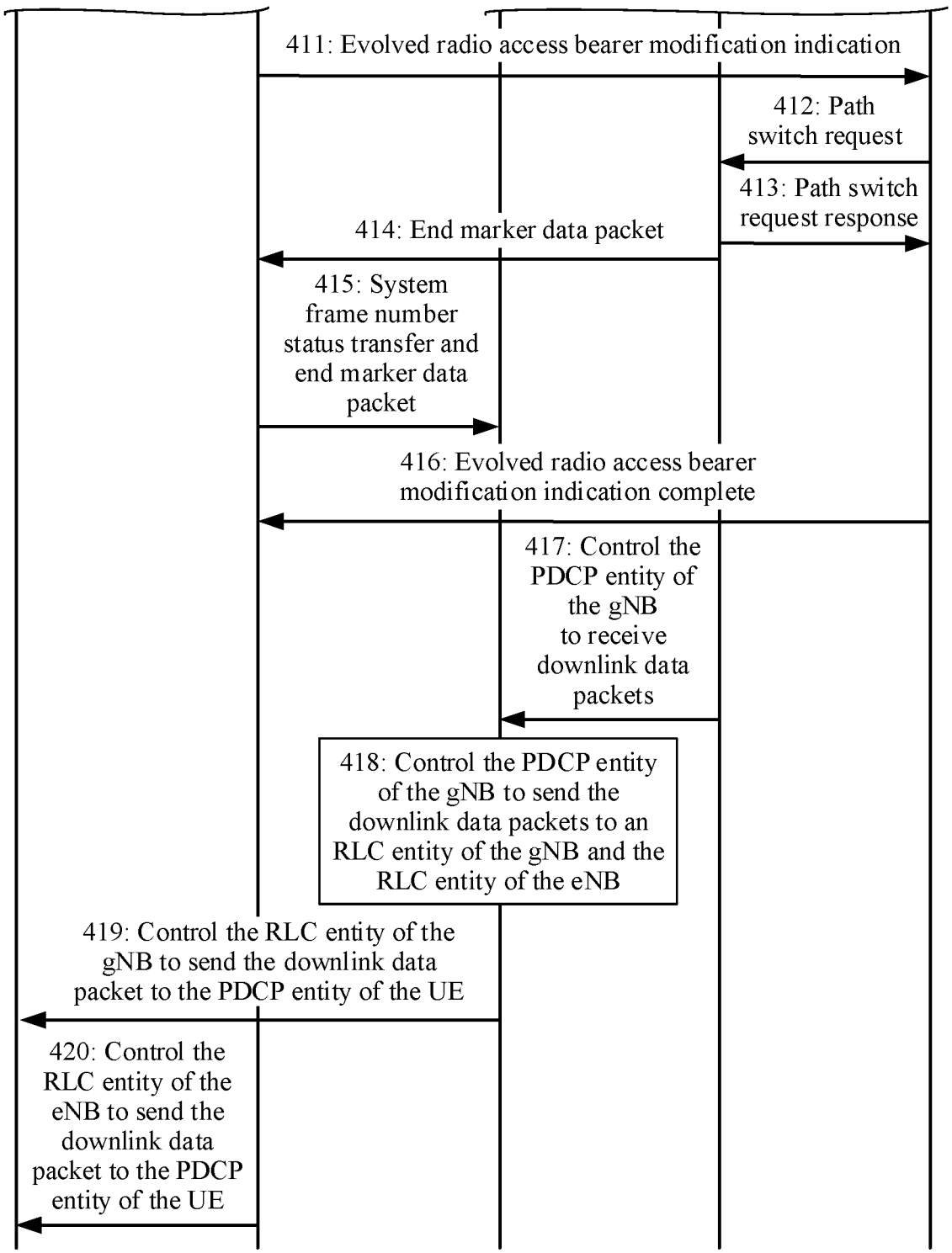

For ease of further understanding of the embodiment corresponding to FIG. 3A, as shown in FIG. 4A and FIG. 4B, the following further provides descriptions by using an example in which a primary network device is an eNB, a secondary network device is a gNB, and a terminal device is UE.

401: The eNB sends a secondary carrier addition request (SgNB addition request) to the gNB.

The secondary carrier addition request carries a key of a master node (namely, a key of the eNB), and the secondary carrier addition request notifies the gNB to establish a PDCP entity by using the key of the master node.

402: The gNB establishes the PDCP entity of the gNB by using the key of the master node.

It should be understood that, in step 402, although the gNB establishes the PDCP entity by using the key of the master node, the PDCP entity is not activated and cannot immediately participate in data transmission.

403: The gNB sends a secondary carrier addition request response (SgNB addition request acknowledge) to the eNB.

The secondary carrier addition request response carries first indication information, and the first indication information indicates that the gNB acknowledges that the gNB is to establish the PDCP entity by using the key of the master node. The first indication information is indicated by an information element filled by the gNB in an SgNB to MeNB container. There is a key to use information element indicating a key in the SgNB to MeNB container. The gNB sets the key to use information element to master, to indicate that the gNB is to use the key of the master node.

It should be noted that there is no definite limitation on a time sequence between step 402 and step 403. In other words, the gNB may first perform step 402 and then perform step 403, may first perform step 403 and then perform step 402, or may simultaneously perform step 402 and step 403. This is not specifically limited herein.

404: The eNB sends RRC reconfiguration (RRC connection reconfiguration) signaling to the UE.

After the eNB receives the carrier addition request response from the gNB, the eNB may determine that the gNB is to establish the PDCP entity by using the key of the master node. Therefore, the eNB sends the RRC reconfiguration signaling to the UE, where the RRC reconfiguration signaling carries the first indication information that is carried in the carrier addition request response.

When the UE identifies the first indication information in the RRC reconfiguration signaling, the UE may learn that the key of the master node is to be used. Because a PDCP entity of the UE previously uses the key of the master node, the UE may continue to use the PDCP entity that uses the key of the master node, and does not need to reestablish a PDCP entity that uses a new key. Therefore, in a subsequent step, when a downlink data packet that is encrypted by using the key of the master node is transmitted to the UE, the UE can use the PDCP entity to decrypt the downlink data packet, to obtain service data of the downlink data packet.

It should be understood that the RRC reconfiguration signaling may further carry another parameter used for reconfiguration. This is not specifically limited herein.

405: The UE sends RRC reconfiguration complete (RRC connection reconfiguration complete) signaling to the eNB.

The RRC reconfiguration complete signaling notifies the eNB that the UE has received the first indication information and completed related reconfiguration.

406: The eNB sends secondary carrier reconfiguration complete (SgNB reconfiguration complete) signaling to the gNB.

The secondary carrier reconfiguration complete signaling notifies the gNB that the UE has completed the reconfiguration and the gNB may start to prepare for random access of the UE.

407: The UE initiates a random access process to the gNB.

Specifically, the random access process between the UE and the gNB includes the following steps:

S1: The UE sends a random access request (random access request) (namely, a msg1) to the gNB, where the random access request carries a random access preamble (random access preamble).

S2: The gNB sends a random access response (random access response, RAR) (namely, a msg2) to the UE.

S3: The UE sends an RRC connection establishment request (RRC connection request) (namely, a msg3) to the gNB, where the RRC connection establishment request carries identification information of the UE.

S4: The gNB sends RRC connection establishment (RRC contention resolution) signaling (namely, a msg4) to the UE.

It should be understood that in actual application, the random access process may further relate to other signaling or parameters, and details are not described herein.

When the UE successfully accesses the gNB, it indicates that the UE may subsequently receive downlink data packets from the gNB. It may also be understood that the gNB may provide a service for the UE.

408: The eNB controls a PDCP entity of the eNB to send a downlink data packet to an RLC entity of the eNB.

In this embodiment, step 408 and step 407 are independent of each other. In other words, the eNB may perform step 408 after performing step 406.

The downlink data packet is from a serving gateway (serving gateway, S-GW), and the S-GW is a gateway that terminates on a UMTS terrestrial radio access network (UMTS terrestrial radio access network, E-UTRAN) interface. In this embodiment, the serving gateway is mainly configured to: send the downlink data packet to the eNB or the gNB, and negotiate transmission path switching with a mobility management entity (mobility management entity, MME).

The PDCP entity of the eNB encrypts the downlink data packet from the S-GW by using the key of the master node. Then, the eNB controls the PDCP entity of the eNB to transmit the downlink data packet to the RLC entity of the eNB.

409: The eNB controls the RLC entity of the eNB to send the downlink data packet to the PDCP entity of the UE.

In this embodiment, step 409 and step 407 are independent of each other. However, the eNB immediately performs step 409 after performing step 408.

In this step, the eNB controls the RLC entity of the eNB to transmit, to the PDCP entity of the UE through MAC layers and physical layers, the downlink data packet that is encrypted by using the key of the master node. Because the PDCP entity of the UE also uses the key of the master node, the PDCP entity of the UE can decrypt the downlink data packet and obtain the service data of the downlink data packet.

410: The gNB notifies the eNB that the random access is completed.

In this embodiment, step 410 and the foregoing step 408 and step 409 are independent of each other, and step 410 is performed after step 407.

411: The eNB sends an evolved radio access bearer modification indication (E-RAB modification indication) to the MME.

The evolved radio access bearer modification indication is for requesting the MME to switch a transmission path to the gNB.

412: The MME sends a path switch request (path switch request) to the S-GW.

The path switch request is for requesting the S-GW to transmit subsequent downlink data packets to the gNB. In this case, the PDCP entity of the gNB receives the downlink data packets from the S-GW.

413: The S-GW sends a path switch request response (path switch request acknowledge) to the MME.

The path switch request response indicates that the switching is completed.

414: The S-GW sends an end marker (end marker) data packet to the eNB.

The end marker data packet is a last data packet sent by the S-GW to the eNB, to indicate that the S-GW no longer sends the downlink data packet to the eNB after sending the end marker data packet.

415: The eNB sends a system frame number status transfer (SN status transfer) message and the end marker (end marker) data packet to the gNB.

In this embodiment, the system frame number status transfer message indicates a sequence number of a downlink data packet that has been currently transmitted by the S-GW to the eNB, so that the gNB receives, from the S-GW in a subsequent process, a data packet after the sequence number. In this way, the gNB can be prevented from repeatedly receiving a downlink data packet or missing a downlink data packet.

In addition, the eNB further forwards the end marker data packet in step 414 to the gNB, to indicate that the eNB has forwarded the last data packet to the gNB. After receiving the end marker data packet, the gNB performs step 417.

416: The MME sends an evolved radio access bearer modification indication complete (E-RAB modification indication complete) message to the eNB.

417: The gNB controls the PDCP entity of the gNB to receive the downlink data packets from the S-GW.

After the gNB receives the end marker data packet, the PDCP entity of the gNB is activated. In this way, the gNB can control the PDCP entity of the gNB to receive the downlink data packets from the S-GW. Because the gNB establishes the PDCP entity of the gNB by using the key of the master node, the PDCP entity of the gNB encrypts the received downlink data packets by using the key of the master node, and then performs subsequent transmission.

418: The gNB controls the PDCP entity of the gNB to send the downlink data packets to an RLC entity of the gNB and the RLC entity of the eNB.

419: The gNB controls the RLC entity of the gNB to send the downlink data packet to the PDCP entity of the UE.

420: The eNB controls the RLC entity of the eNB to send the downlink data packet to the PDCP entity of the UE.

In this embodiment, step 419 and step 420 are simultaneously performed.

Figure 3C:
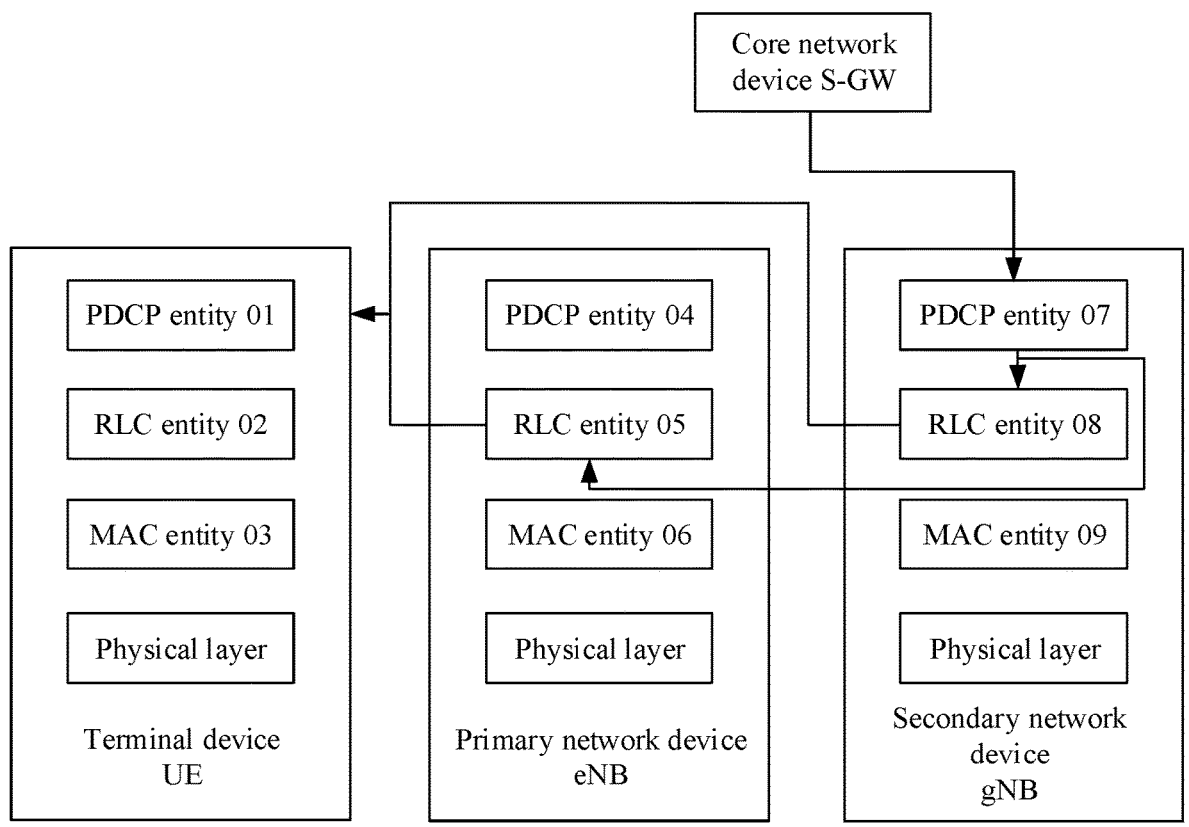
FIG. 3C is a schematic diagram of another embodiment of a transmission path of a downlink data packet according to an embodiment of this application.

For ease of understanding, FIG. 3B and FIG. 3C are used as an example for description. In this case, the core network device in FIG. 3B and FIG. 3C is the S-GW, the primary network device is the eNB, the secondary network device is the gNB, and the terminal device is the UE.

When the eNB performs step 408 and step 409, a flow direction of the downlink data packet is shown in FIG. 3B. The S-GW sends the downlink data packet to the PDCP entity 04 of the eNB, where the PDCP entity 04 of the eNB encrypts and decrypts the downlink data packet by using the key of the master node. The eNB controls the PDCP entity 04 of the eNB to transmit, to the RLC entity 05 of the eNB, the downlink data packet that is encrypted by using the key of the master node. Then, the RLC entity 05 of the eNB transmits the downlink data packet to the PDCP entity 01 of the UE through the MAC layers and the physical layers.

After the UE receives the downlink data packet, the UE may control the PDCP entity 01 of the UE to decrypt the downlink data packet by using the key of the master node, to obtain the service data of the downlink data packet.

When the gNB performs step 417 to step 419, and the eNB performs step 420, a flow direction of the downlink data packets is shown in FIG. 3C. The S-GW sends downlink data packets to a PDCP entity 07 of the gNB, where the PDCP entity 07 of the gNB encrypts and decrypts the downlink data packets by using the key of the master node. The gNB controls the PDCP entity 07 of the gNB to transmit, to an RLC entity 05 of the eNB and an RLC entity 08 of the gNB, the downlink data packets that are encrypted by using the key of the master node. Then, the RLC entity 05 of the eNB and the RLC entity 08 of the gNB separately transmit the downlink data packets to a PDCP entity 01 of the UE, so that the UE can control the PDCP entity 01 of the UE to decrypt the downlink data packets by using the key of the master node, to obtain service data of the downlink data packets.

Figure 5A:
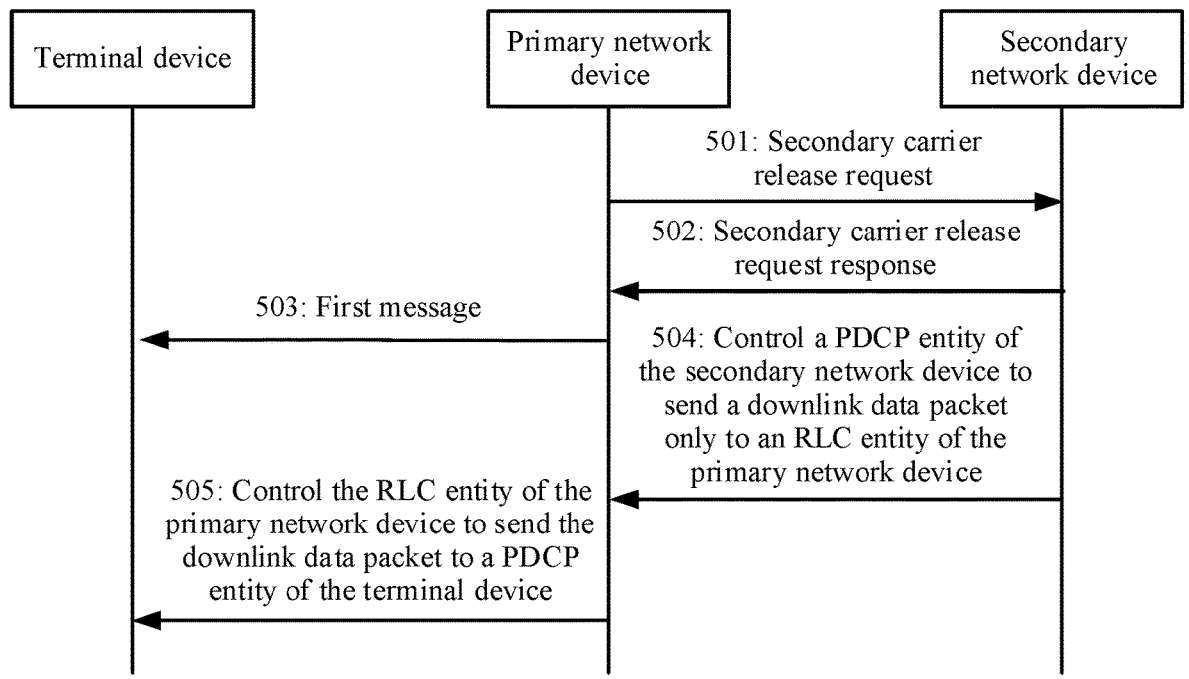
FIG. 5A is another flowchart of a data transmission method according to an embodiment of this application.

The following describes a case of deleting a secondary carrier. A process of deleting the secondary carrier may be initiated by a primary network device, or may be initiated by a secondary network device. FIG. 5A shows a process of a signaling exchange between a primary network device, a secondary network device, and a terminal device when the primary network device initiates deletion of the secondary network device.

Before the primary network device deletes the secondary network device, the terminal device receives downlink data packets from a core network through the primary network device and the secondary network device, and performs data encryption and decryption by using a key of the primary network device (namely, a key of a master node). Specifically, as shown in FIG. 3C, the core network device sends the downlink data packets to the PDCP entity 07 of the secondary network device, where the PDCP entity 07 of the secondary network device encrypts and decrypts the downlink data packets by using the key of the master node. The secondary network device controls the PDCP entity 07 of the secondary network device to transmit, to the RLC entity 05 of the primary network device and the RLC entity 08 of the secondary network device, the downlink data packets that are encrypted by using the key of the master node. Then, the RLC entity 05 of the primary network device and the RLC entity 08 of the secondary network device separately transmit the downlink data packets to the PDCP entity 01 of the terminal device through MAC layers and physical layers.

When the primary network device prepares to delete the secondary network device, the primary network device and the secondary network device (namely, a to-be-deleted secondary network device) perform the following steps.

501: The primary network device sends a secondary carrier release request to the secondary network device.

The secondary carrier release request indicates the secondary network device to prepare for a release.

502: The secondary network device sends a secondary carrier release request response to the primary network device.

The secondary carrier release request response indicates that the secondary network device has received the secondary carrier release request and acknowledges preparation for the release. The secondary carrier release request may be used as a trigger source to trigger the primary network device to perform subsequent step 503.

503: The primary network device sends a first message to the terminal device.

In this embodiment, after the primary network device receives the carrier release response from the secondary network device, the primary network device sends the first message to the terminal device, where the first message indicates the terminal device to perform data encryption and decryption by using the key of the master node.

In an optional implementation, the first message does not carry a specific piece of indication information indicating a key. When the terminal device receives the first message and detects that the first message does not carry the indication information about the key, the terminal device is not to change the key, in other words, the terminal device still uses the key of the master node.

504: The secondary network device controls a PDCP entity of the secondary network device to send a downlink data packet only to an RLC entity of the primary network device.

505: The primary network device controls the RLC entity of the primary network device to send the downlink data packet to the terminal device.

It should be understood that there is no definite limitation on a time sequence between step 503 and step 504. In other words, the secondary network device may first perform step 503 and then perform step 504, or may first perform step 504 and then perform step 503. This is not specifically limited herein.

Figure 5B:
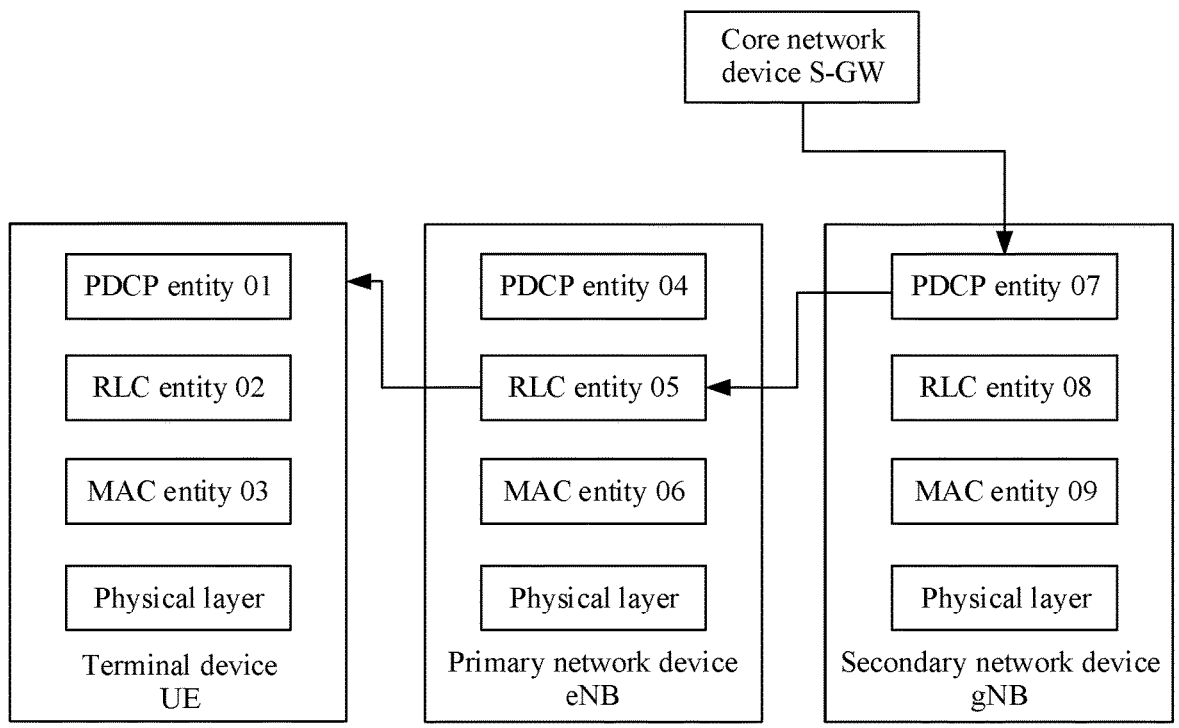
FIG. 5B is a schematic diagram of another embodiment of a transmission path of a downlink data packet according to an embodiment of this application.

In this embodiment, after the secondary network device receives the carrier release request and before the PDCP entity of the secondary network device is deleted, because the terminal device still uses the key of the master node, the secondary network device may forward, to the primary network device, the downlink data packet that is received from the core network device, and the primary network device sends the downlink data packet to the terminal device. As shown in FIG. 5B, the core network device sends a downlink data packet to a PDCP entity 07 of the secondary network device, where the PDCP entity 07 of the secondary network device encrypts and decrypts the downlink data packet by using a key of a master node. The secondary network device controls the PDCP entity 07 to transmit, to an RLC entity 05 of the primary network device, the downlink data packet that is encrypted by using the key of the master node. Then, the RLC entity 05 transmits the downlink data packet to the terminal device, that is, transmits the downlink data packet to a PDCP entity 01 of the terminal device through MAC layers and physical layers.

It should be understood that, in a conventional technology, after a secondary network device receives a secondary carrier release request from a primary network device, a PDCP entity of the secondary network device stops forwarding a downlink data packet. When a PDCP entity that is of the primary network device and that uses a key of a master node is activated, and a core network device has acknowledged deletion of a secondary carrier, the PDCP entity of the primary network device can receive the downlink data packet from the core network device, the primary network device controls the PDCP entity of the primary network device to transmit the downlink data packet to an RLC entity of the primary network device, and then the RLC entity of the primary network device transmits the downlink data packet to a PDCP entity of a terminal device through MAC layers and physical layers. However, in the present invention, because both the terminal device and the secondary network device use the key of the master node, the terminal device does not need to reestablish a PDCP entity, the secondary network device may continue to transmit the buffered downlink data packet to the primary network device and the terminal device, and the terminal device does not need to wait for an exchange between a network device side and the core network device before starting to receive the downlink data packet again. Therefore, a network delay can be shortened, and a probability of data service interruption caused by addition of a secondary carrier is further reduced.

Figure 6A:
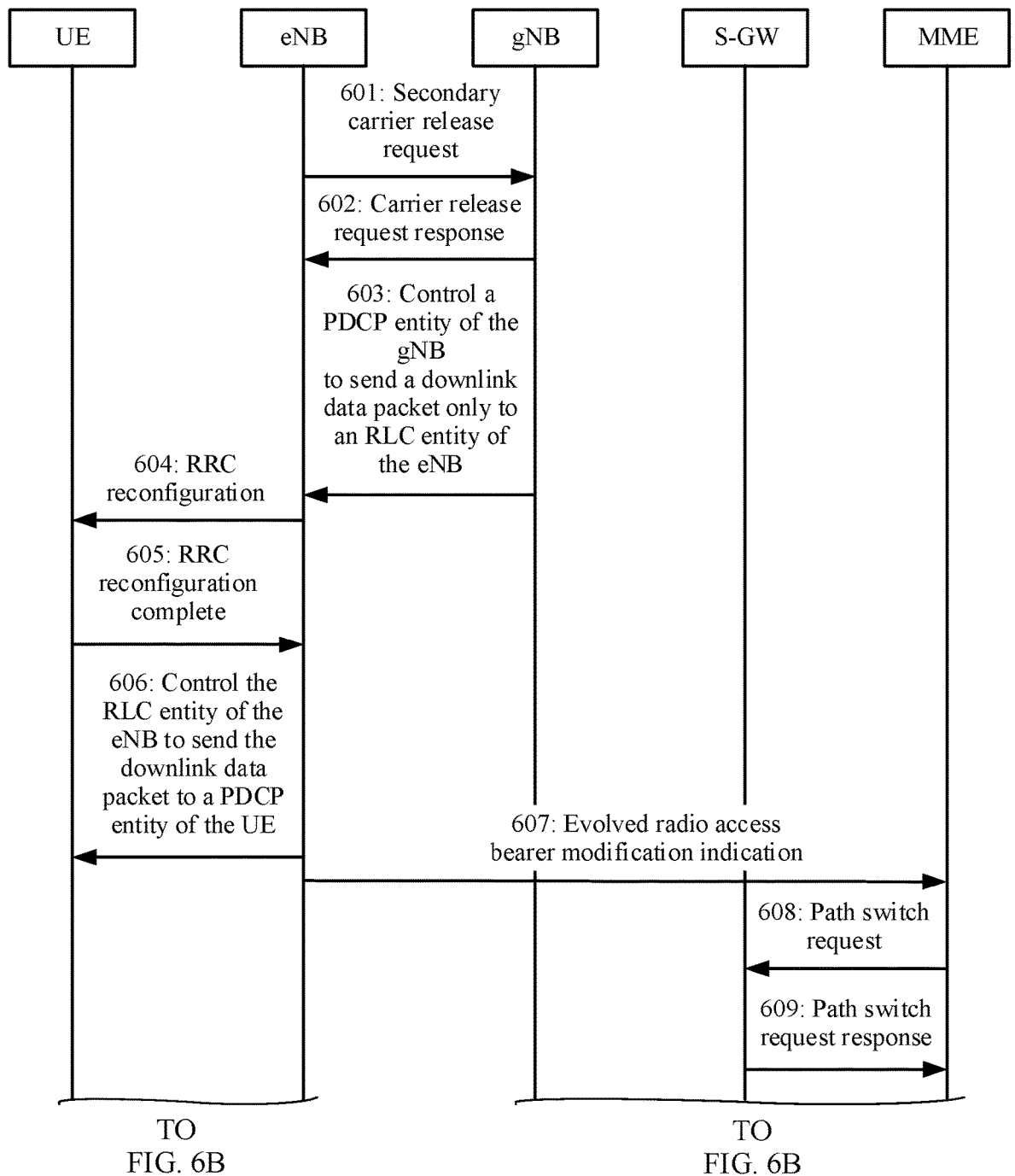
FIG. 6A and FIG. 6B are another flowchart of a data transmission method according to an embodiment of this application.
Figure 6B:
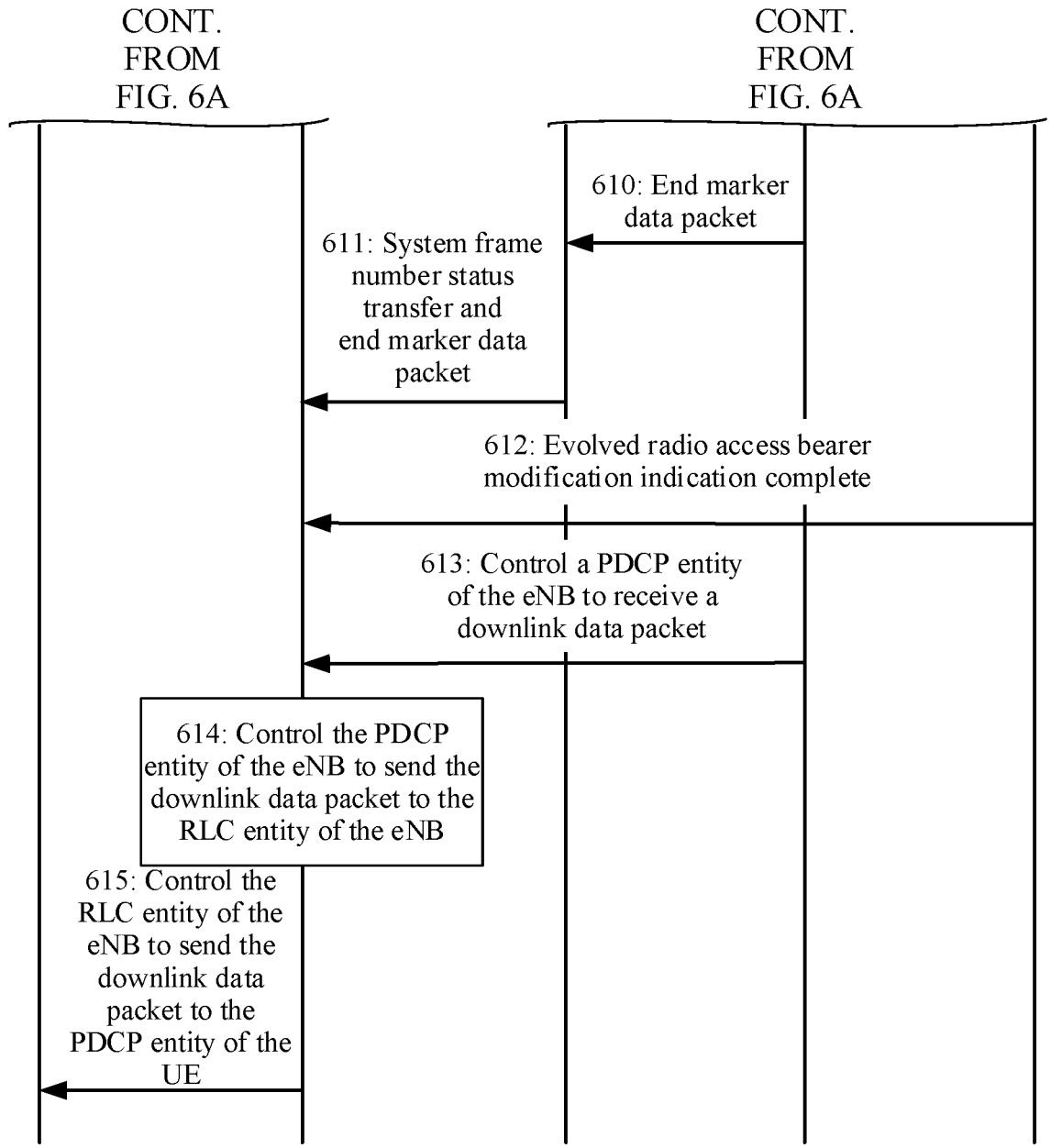

For ease of further understanding of the embodiment corresponding to FIG. 5A, as shown in FIG. 6A and FIG. 6B, the following further provides descriptions by using an example in which a primary network device is an eNB, a secondary network device is a gNB, and a terminal device is UE.

601: The eNB sends a secondary carrier release request (SgNB release request) to the gNB.

The secondary carrier release request notifies the gNB to prepare for a release.

602: The gNB sends a secondary carrier release request response (SgNB release request acknowledge) to the eNB.

The secondary carrier release request response indicates that the gNB has received the secondary carrier release request and acknowledges preparation for the release. The secondary carrier release request may be used as a trigger source to trigger the eNB to perform subsequent step 604.

603: The gNB controls a PDCP entity of the gNB to send a downlink data packet only to an RLC entity of the eNB.

The downlink data packet is from a serving gateway S-GW, and the downlink data packet is a downlink data packet that has been received by the gNB from the S-GW after the gNB receives the carrier release request and before the PDCP entity of the gNB is deleted. The PDCP entity of the gNB encrypts the downlink data packet by using a key of a master node. Then, the gNB controls the PDCP entity of the gNB to transmit the downlink data packet to the RLC entity of the eNB.

604: The eNB sends RRC reconfiguration (RRC connection reconfiguration) signaling to the UE.

After the eNB receives the carrier release request response from the gNB, the eNB sends the RRC reconfiguration signaling to the UE, where the RRC reconfiguration signaling indicates the terminal device to still use the key of the master node.

In an optional implementation, the RRC reconfiguration signaling does not carry a specific piece of indication information indicating a key. When the UE receives the RRC reconfiguration signaling and detects that the RRC reconfiguration signaling does not carry the indication information about the key, the UE does not change the key, in other words, the UE still uses the key of the master node.

It should be understood that the RRC reconfiguration signaling may further carry another parameter used for reconfiguration. This is not specifically limited herein.

In this embodiment, step 604 and step 603 are independent of each other. In other words, in actual application, the gNB may first perform step 603, and then the eNB may perform step 604; the eNB may first perform step 604, and then the gNB may perform step 603; or the gNB may perform step 603 and the eNB may step 604 simultaneously. This is not specifically limited herein.

605: The UE sends RRC reconfiguration complete (RRC connection reconfiguration complete) signaling to the eNB.

The RRC reconfiguration complete signaling notifies the eNB that the UE has completed related reconfiguration.

606: The eNB controls the RLC entity of the eNB to send the downlink data packet to a PDCP entity of the UE.

In this step, the eNB controls the RLC entity of the eNB to transmit, to the PDCP entity of the UE through MAC layers and physical layers, the downlink data packet that is encrypted by using the key of the master node. Because the PDCP entity of the UE also uses the key of the master node, the PDCP entity of the UE can decrypt the downlink data packet and obtain service data of the downlink data packet.

607: The eNB sends an evolved radio access bearer modification indication (E-RAB modification indication) to an MME.

The evolved radio access bearer modification indication is for requesting the MME to switch a transmission path to the eNB.

608: The MME sends a path switch request (path switch request) to the S-GW.

The path switch request is for requesting the S-GW to transmit a subsequent downlink data packet to the eNB. Therefore, the eNB controls a PDCP entity of the eNB to receive the downlink data packet from the S-GW.

609: The S-GW sends a path switch request response (path switch request acknowledge) to the MME.

The path switch request response indicates that switching is completed.

610: The S-GW sends an end marker (end marker) data packet to the gNB.

The end marker data packet is a last data packet sent by the S-GW to the gNB, to indicate that the S-GW no longer sends the downlink data packet to the gNB after sending the end marker data packet.

611: The gNB sends a system frame number status transfer (SN status transfer) message and the end marker (end marker) data packet to the eNB.

In this embodiment, the system frame number status transfer message indicates a sequence number of a downlink data packet that has been currently transmitted by the S-GW to the gNB, so that the eNB receives, from the S-GW in a subsequent process, a data packet after the sequence number. In this way, the eNB can be prevented from repeatedly receiving a downlink data packet or missing a downlink data packet.

In addition, the gNB further forwards the end marker data packet in step 610 to the eNB, to indicate that the gNB has forwarded the last data packet to the eNB. After receiving the end marker data packet, the eNB performs step 613.

612: The MME sends an evolved radio access bearer modification indication complete (E-RAB modification indication complete) message to the eNB.

613: The eNB controls the PDCP entity of the eNB to receive the downlink data packet from the S-GW.

After the gNB receives the end marker data packet, the PDCP entity of the gNB is activated. In this way, the gNB can control the PDCP entity of the gNB to receive the downlink data packet from the S-GW. Because the gNB establishes the PDCP entity of the gNB by using the key of the master node, the PDCP entity of the gNB encrypts the received downlink data packet by using the key of the master node, and then performs subsequent transmission.

614: The eNB controls the PDCP entity of the eNB to send the downlink data packet to the RLC entity of the eNB.

615: The eNB controls the RLC entity of the eNB to send the downlink data packet to the PDCP entity of the UE.

Figure 5C:
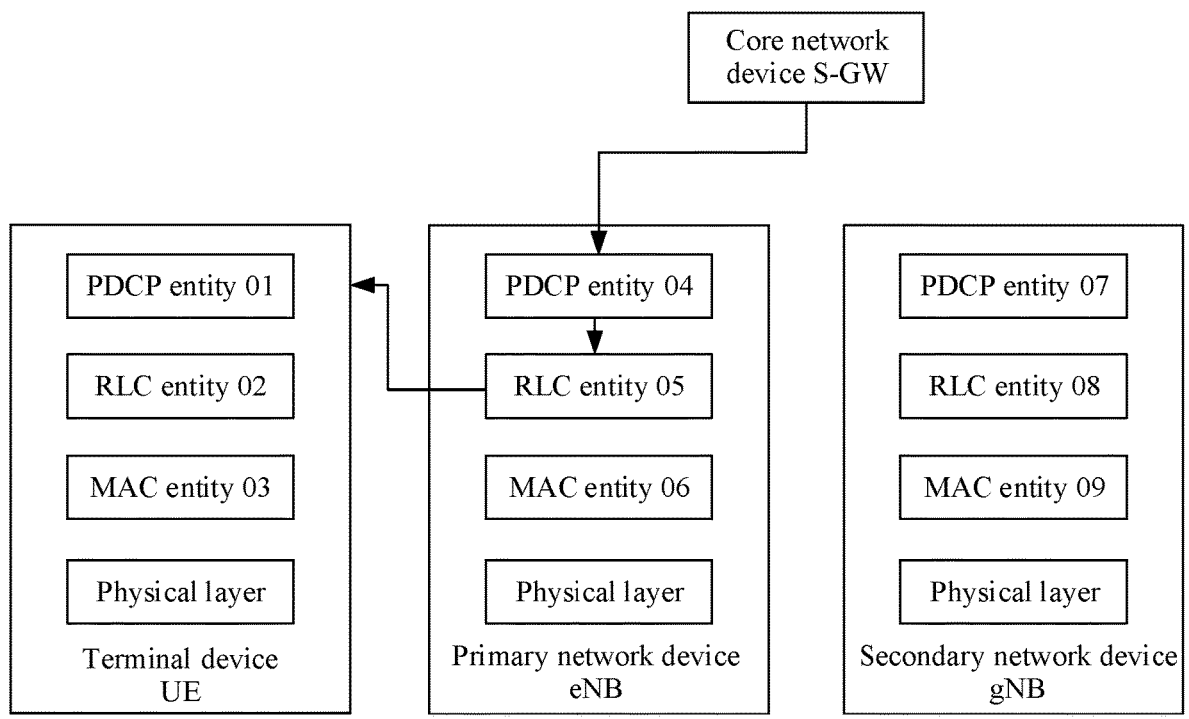
FIG. 5C is a schematic diagram of another embodiment of a transmission path of a downlink data packet according to an embodiment of this application.

For ease of understanding, FIG. 5B and FIG. 5C are used as an example for description. In this case, the core network device in FIG. 5B and FIG. 5C is the S-GW, the primary network device is the eNB, the secondary network device is the gNB, and the terminal device is the UE.

When the gNB performs step 603, and the eNB performs step 606, a flow direction of the downlink data packet is shown in FIG. 5B. The S-GW sends the downlink data packet to the PDCP entity 07 of the gNB, where the PDCP entity 07 of the gNB encrypts and decrypts the downlink data packet by using the key of the master node. The gNB controls the PDCP entity 07 of the gNB to transmit, to the RLC entity 05 of the eNB, the downlink data packet that is encrypted by using the key of the master node. Then, the RLC entity 05 of the eNB transmits the downlink data packet to the PDCP entity 01 of the UE through the MAC layers and the physical layers. After the UE receives the downlink data packet, the UE may control the PDCP entity 01 of the UE to decrypt the downlink data packet by using the key of the master node, to obtain service data of the downlink data packet.

When the eNB performs step 613 to step 615, a flow direction of the downlink data packet is shown in FIG. 5C. The S-GW sends a downlink data packet to a PDCP entity 04 of the eNB, where the PDCP entity 04 of the eNB encrypts and decrypts the downlink data packet by using a key of a master node. The eNB controls the PDCP entity 04 of the eNB to transmit, to an RLC entity 05 of the eNB, the downlink data packet that is encrypted by using the key of the master node. Then, the RLC entity 05 of the eNB transmits the downlink data packet to a PDCP entity 01 of the UE through MAC layers and physical layers, so that the UE can control the PDCP entity 01 of the UE to decrypt the downlink data packet by using the key of the master node, to obtain service data of the downlink data packet.

Figure 7:
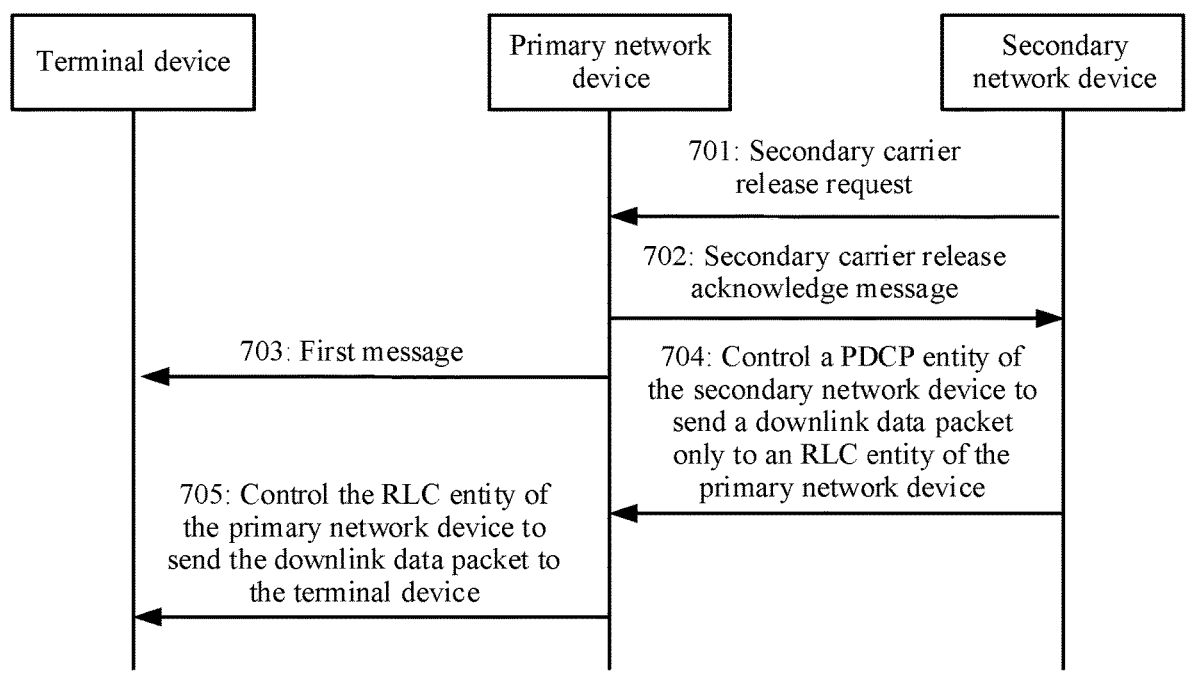
FIG. 7 is another flowchart of a data transmission method according to an embodiment of this application.

FIG. 7 shows a process of a signaling exchange between a primary network device, a secondary network device, and a terminal device when the secondary network device initiates deletion of the secondary network device.

Before the primary network device deletes the secondary network device, the terminal device receives downlink data packets from a core network through the primary network device and the secondary network device, and performs data encryption and decryption by using a key of the primary network device (namely, a key of a master node). For details, refer to related descriptions corresponding to FIG. 3C. Details are not described herein again.

When the secondary network device initiates the deletion, the primary network device and the secondary network device (namely, a to-be-deleted secondary network device) perform the following steps.

701: The secondary network device sends a secondary carrier release request to the primary network device.

The secondary carrier release request is for requesting the primary network device to allow the secondary network device to perform a release.

702: The primary network device sends a secondary carrier release acknowledge message to the secondary network device.

The secondary carrier release acknowledge message indicates that the secondary network device is allowed to perform the release in a subsequent process.

In addition, both the secondary carrier release request in step 701 and the carrier release acknowledge message in step 702 may be used as trigger sources to trigger the primary network device to perform subsequent step 703.

703: The primary network device sends a first message to the terminal device.

704: The secondary network device controls a PDCP entity of the secondary network device to send a downlink data packet only to an RLC entity of the primary network device.

705: The primary network device controls the RLC entity of the primary network device to send the downlink data packet to the terminal device.

It should be understood that there is no definite limitation on a time sequence between step 703 and step 704. In other words, the secondary network device may first perform step 703 and then perform step 704, or may first perform step 704 and then perform step 703. This is not specifically limited herein.

In addition, in this embodiment, step 703 to step 705 are the same as step 503 to step 505. For details, refer to related descriptions of step 503 to step 505. Details are not described herein again.

In this embodiment, because both the terminal device and the secondary network device use the key of the master node, the terminal device does not need to reestablish a PDCP entity, the secondary network device may continue to transmit the buffered downlink data packet to the primary network device and the terminal device, and the terminal device does not need to wait for an exchange between a network device side and a core network device before starting to receive the downlink data packet again. Therefore, a network delay can be shortened, and a probability of data service interruption caused by addition of a secondary carrier is further reduced.

It should be understood that a process of deleting the secondary carrier in this embodiment is initiated by the secondary network device. For other steps, refer to the embodiment corresponding to FIG. 5A. Details are not described herein again.

Figure 8A:
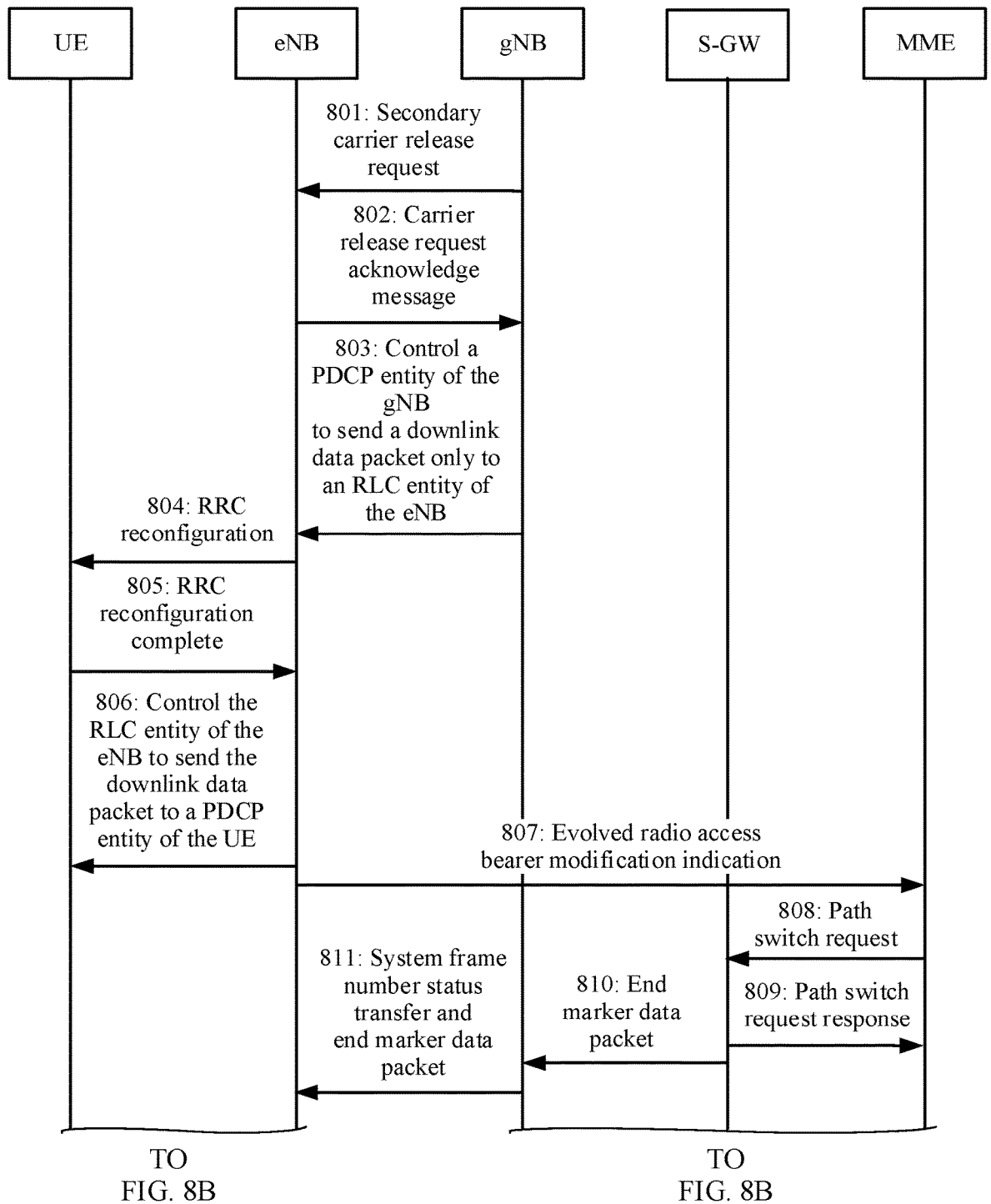
FIG. 8A and FIG. 8B are another flowchart of a data transmission method according to an embodiment of this application.
Figure 8B:
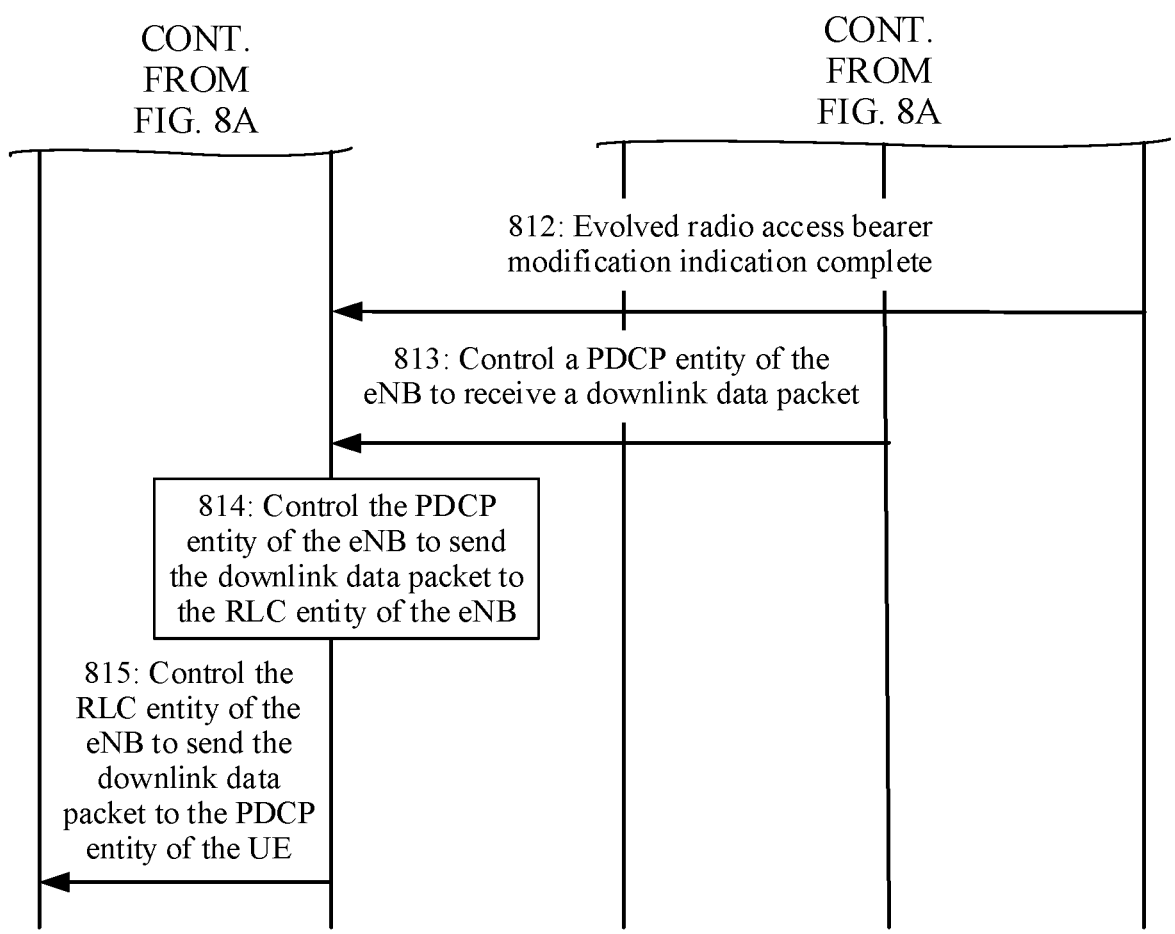

For ease of further understanding of the embodiment corresponding to FIG. 7, as shown in FIG. 8A and FIG. 8B, the following further provides descriptions by using an example in which a primary network device is an eNB, a secondary network device is a gNB, and a terminal device is UE.

801: The gNB sends a secondary carrier release request (SgNB release request) to the eNB.

The secondary carrier release request is for requesting the eNB to allow the gNB to perform a release in a subsequent process.

802: The eNB sends a secondary carrier release acknowledge (SgNB release request acknowledge) message to the gNB.

The secondary carrier release request acknowledge message indicates that the eNB allows the gNB to perform the release in the subsequent process.

It should be understood that, both step 801 and step 802 may be used as trigger sources to trigger the eNB to perform subsequent step 804.

803: The gNB controls a PDCP entity of the gNB to send a downlink data packet only to an RLC entity of the eNB.

804: The eNB sends RRC reconfiguration (RRC connection reconfiguration) signaling to the UE.

805: The UE sends RRC reconfiguration complete (RRC connection reconfiguration complete) signaling to the eNB.

806: The eNB controls the RLC entity of the eNB to send the downlink data packet to a PDCP entity of the UE.

807: The eNB sends an evolved radio access bearer modification indication (E-RAB modification indication) to an MME.

808: The MME sends a path switch request (path switch request) to an S-GW.

809: The S-GW sends a path switch request response (path switch request acknowledge) to the MME.

810: The S-GW sends an end marker (end marker) data packet to the gNB.

811: The gNB sends a system frame number status transfer (SN status transfer) message and the end marker (end marker) data packet to the eNB.

812: The MME sends an evolved radio access bearer modification indication complete (E-RAB modification indication complete) message to the eNB.

813: The eNB controls a PDCP entity of the eNB to receive a downlink data packet from the S-GW.

814: The eNB controls the PDCP entity of the eNB to send the downlink data packet to the RLC entity of the eNB.

815: The eNB controls the RLC entity of the eNB to send the downlink data packet to the PDCP entity of the UE.

In this embodiment, step 803 to step 815 are the same as step 603 to step 615. For details, refer to related descriptions of step 603 to step 615. Details are not described herein again.

Figure 9A:
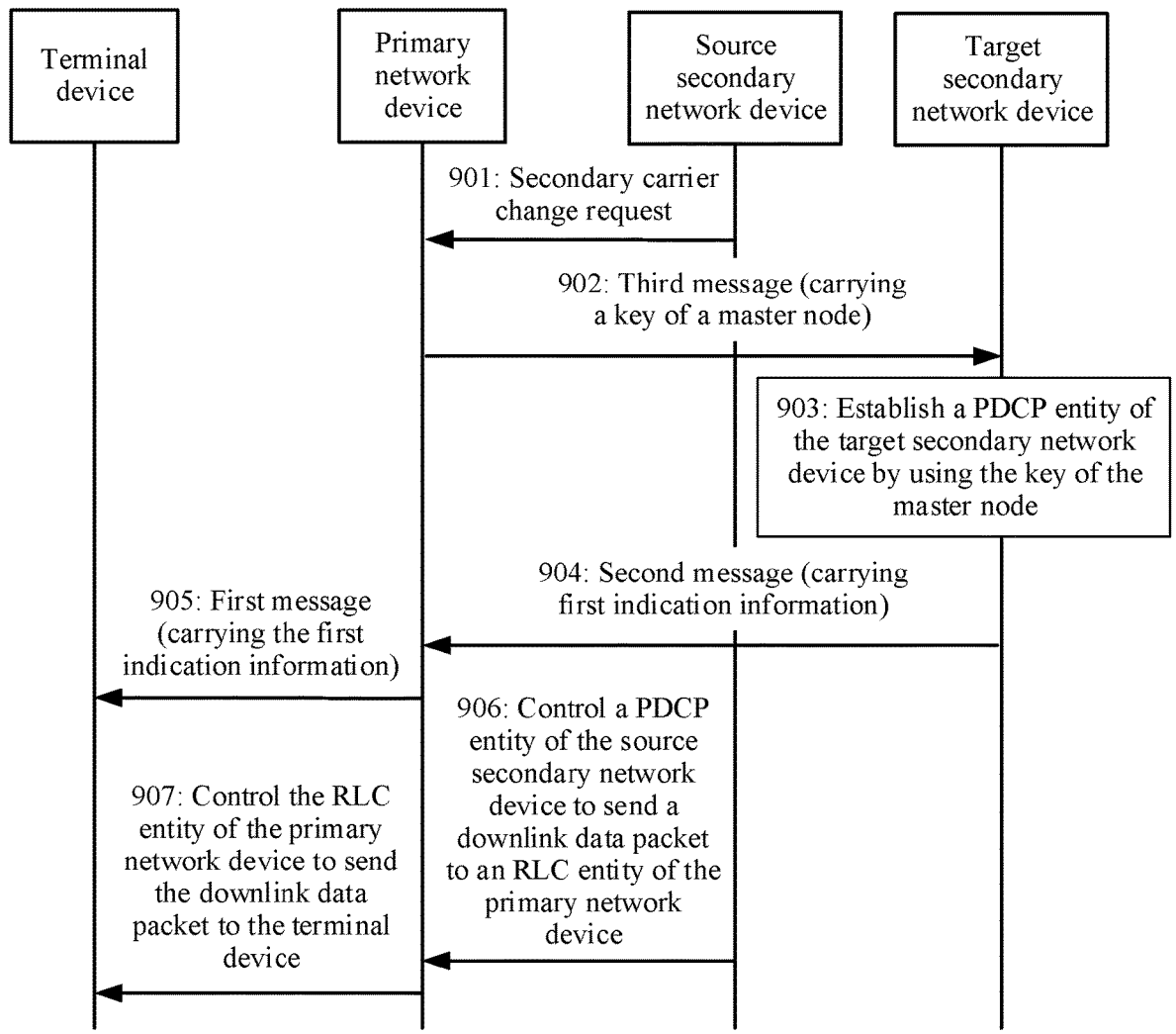
FIG. 9A is another flowchart of a data transmission method according to an embodiment of this application.

The following describes a case in which one secondary carrier is changed to another secondary carrier. The process may be initiated by a primary network device, or may be initiated by a secondary network device. FIG. 9A shows a process of a signaling exchange between a primary network device, a source secondary network device, a target secondary network device, and a terminal device when the source secondary network device initiates a change of a secondary network device.

Figure 9B:
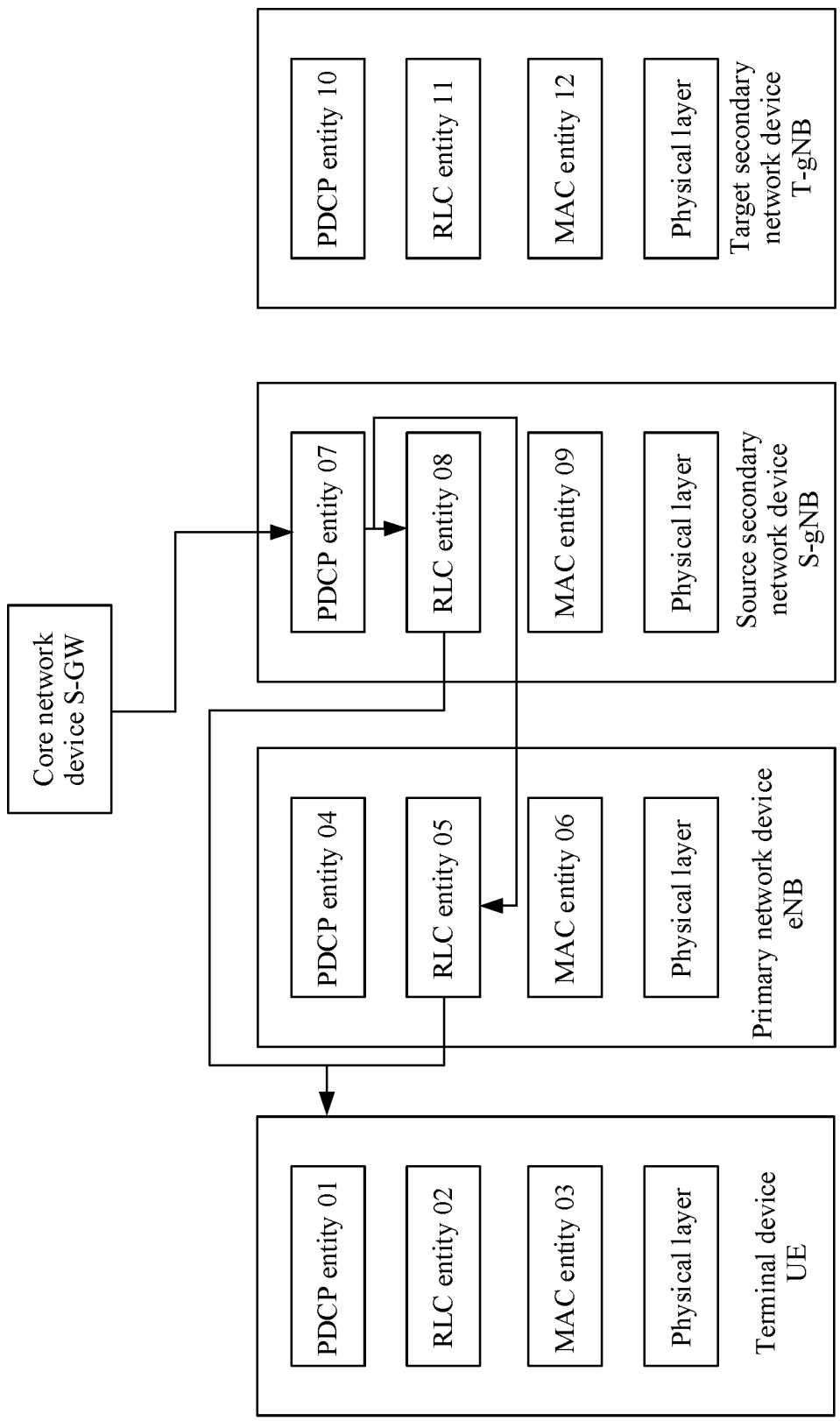
FIG. 9B is a schematic diagram of another embodiment of a transmission path of a downlink data packet according to an embodiment of this application.

Before the change, the terminal device receives downlink data packets from a core network through the primary network device and the source secondary network device, and performs data encryption and decryption by using a key of the primary network device (namely, a key of a master node). Specifically, as shown in FIG. 9B, a core network device sends downlink data packets to a PDCP entity 07 of the source secondary network device, where the PDCP entity 07 of the source secondary network device encrypts and decrypts the downlink data packets by using a key of a master node. The source secondary network device controls the PDCP entity 07 of the source secondary network device to transmit, to an RLC entity 05 of the primary network device and an RLC entity 08 of the source secondary network device, the downlink data packets that are encrypted by using the key of the master node. Then, the RLC entity 05 of the primary network device and the RLC entity 08 of the source secondary network device separately transmit the downlink data packets to the terminal device, that is, transmit the downlink data packets to a PDCP entity 01 of the terminal device through MAC layers and physical layers.

When the source secondary network device requests the change to the target secondary network device, the primary network device, the source secondary network device (namely, a to-be-deleted secondary network device), and the target secondary network device (namely, a to-be-added secondary network device) perform the following steps.

901: The source secondary network device sends a secondary carrier change request to the primary network device.

In this embodiment, the secondary carrier change request is for requesting the primary network device to change a secondary carrier. The secondary carrier change request carries identification information of the target secondary network device. Therefore, after the primary network device obtains the identification information of the target secondary network device from the secondary carrier change request, the primary network device initiates a secondary carrier addition process to the target secondary network device. Specifically, the primary network device performs step 902.

902: The primary network device sends a third message to the target secondary network device.

The third message carries the key of the master node, and indicates the target secondary network device to perform data encryption and decryption by using the key of the master node. In other words, the key of the master node indicates the target secondary network device to establish a PDCP entity by using the key of the master node.

For example, the third message is a secondary carrier addition request (S-gNB addition request), and the secondary carrier addition request is for requesting to add the target secondary network device as the secondary carrier.

903: The target secondary network device establishes the PDCP entity of the target secondary network device by using the key of the master node.

After the target secondary network device receives the third message and obtains the key that is of the master node and that is carried in the third message, the target secondary network device establishes the PDCP entity of the target secondary network device by using the key of the master node. It should be understood that the PDCP entity established by the target secondary network device by using the key of the master node cannot immediately participate in data packet transmission. The PDCP entity of the target secondary network device can be activated for use only after the terminal device accesses the target secondary network device and the primary network device notifies the core network device that the carrier change has occurred. A process of a signaling exchange between the primary network device and the core network device is described in detail in a subsequent embodiment corresponding to FIG. 10A to FIG. 10C, and details are not described herein again.

In a conventional technology, a primary network device sends, to a to-be-added target secondary network device, only a new key different from a key of a master node. However, in the present invention, the primary network device sends the key of the master node to the target secondary network device, and notifies the terminal device to also use the key of the master node in a subsequent step, so that both the target secondary network device and the terminal device use the key of the master node. In this way, after the target secondary network device participates in the data packet transmission, a PDCP entity of the terminal device can receive downlink data packets from the PDCP entity of the target secondary network device.

904: The target secondary network device sends a second message to the primary network device.

In this embodiment, the second message indicates that the target secondary network device acknowledges that the target secondary network device is to be added as the secondary carrier.

The second message carries first indication information, and the first indication information indicates to perform data encryption and decryption by using the key of the master node. In addition, the first indication information is configured by the target secondary network device. It may be understood as that the target secondary network device includes the first indication information in the second message. In one aspect, it indicates that the target secondary network device has acknowledged that the target secondary network device is to establish the PDCP entity by using the key of the master node in a subsequent process. In another aspect, it indicates that the first indication information notifies the primary network device, so that the primary network device indicates, based on the first indication information in the second message, the terminal device to also use the key of the master node. Based on the latter aspect, the first indication information in the second message may be used as a trigger source to trigger the primary network device to perform subsequent step 905.

For example, the second message is a secondary carrier addition request response (S-gNB addition request acknowledge). The target secondary network device sets, to "master", a key to use information element indicating a key, and includes the key to use information element in the second message, to indicate that the target secondary network device is to use the key of the master node. It should be understood that in actual application, another information element may be used as the first indication information. This is not specifically limited herein.

It should be understood that there is no definite limitation on a time sequence between step 903 and step 904. In other words, the target secondary network device may first perform step 903 and then perform step 904, or may first perform step 904 and then perform step 903. This is not specifically limited herein.

905: The primary network device sends a first message to the terminal device.

When the primary network device receives the second message from the target secondary network device, and obtains the first indication information from the second message, the primary network device may determine that the target secondary network device is to perform encryption and decryption by using the key of the master node in a subsequent process. Therefore, the primary network device includes the first indication information in the first message, and sends the first message to the terminal device.

For example, the first message is an RRC reconfiguration (RRC connection reconfiguration) message, and the RRC reconfiguration message carries the first indication information. If the first indication information in step 904 is indicated by the key to use information element set to "master", the first indication information in the RRC reconfiguration message is also the key to use information element set to "master".

It should be understood that neither the second message nor the first message directly carries the key of the master node, but carries the first indication information indicating the key of the master node. Because the terminal device uses the key of the master node before the addition of the secondary network device, the terminal device stores the key of the master node, and the PDCP entity of the terminal device is also established by using the key of the master node. Therefore, after the terminal device receives the first indication information, the terminal device can directly use the PDCP entity of the terminal device to decrypt a downlink data packet that is encrypted by using the key of the master node, without recalculating a key or reestablishing a PDCP entity.

906: The source secondary network device controls a PDCP entity of the source secondary network device to send a downlink data packet to an RLC entity of the primary network device.

It should be noted that step 906 and the foregoing step 902 to step 905 are independent of each other. The source network device may perform step 906 after performing step 901.

907: The primary network device controls the RLC entity of the primary network device to send the downlink data packet to the terminal device.

In this embodiment, before the carrier change, both the terminal device and the source secondary network device use the key of the master node. In addition, after receiving the first indication information, the terminal device still uses the key of the master node. Therefore, the PDCP entity of the terminal device can decrypt the downlink data packet that is encrypted by the PDCP entity of the source secondary network device by using the key of the master node. In this case, the source secondary network device controls the PDCP entity of the source secondary network device to send the downlink data packet to a PDCP entity of the primary network device, and then the primary network device controls the RLC entity of the primary network device to send the downlink data packet to the PDCP entity of the terminal device through MAC layers and physical layers. In this implementation, after the source secondary network device sends the secondary carrier change request and before the target secondary network device starts to transmit the downlink data packets, the terminal device may receive a part of downlink data packets buffered in the source secondary network device. Therefore, a period within which transmission of the downlink data packet is interrupted can be shortened, a network delay can be shortened, and a probability of service interruption of the terminal device can be reduced.

Figure 9C:
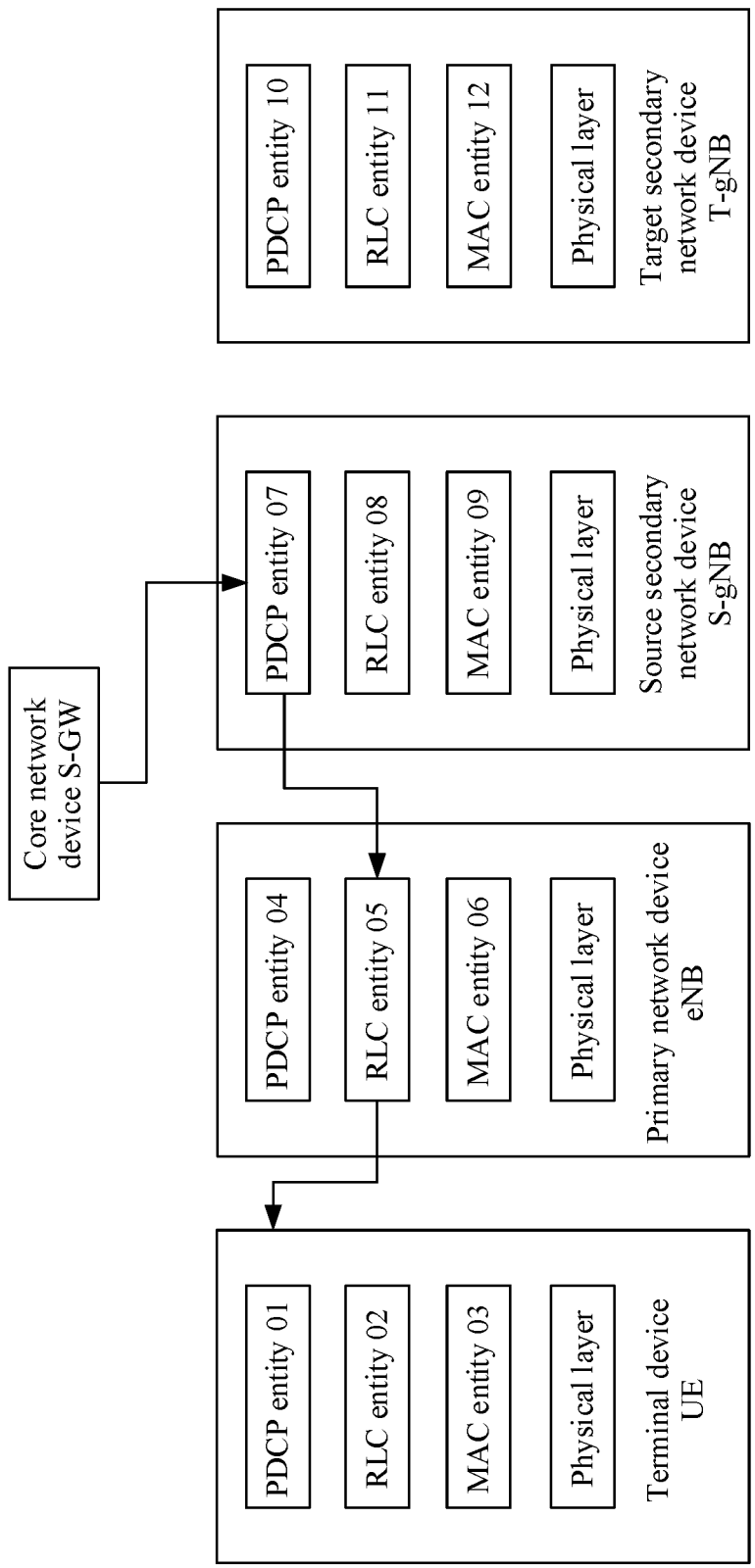
FIG. 9C is a schematic diagram of another embodiment of a transmission path of a downlink data packet according to an embodiment of this application.

In this case, a flow direction of the downlink data packet is shown in FIG. 9C. Because a PDCP entity 10 of the target secondary network device is not activated, the core network device temporarily cannot allocate downlink data packets to the PDCP entity of the target secondary network device. In this case, the core network device sends the downlink data packet to a PDCP entity 07 of the source secondary network device, where the PDCP entity 07 of the source secondary network device encrypts and decrypts the downlink data packet by using a key of a master node. The source secondary network device controls the PDCP entity 07 to transmit, to an RLC entity 05 of the primary network device, the downlink data packet that is encrypted by using the key of the master node. Then, the RLC entity 05 transmits the downlink data packet to the terminal device, that is, transmits the downlink data packet to a PDCP entity 01 of the terminal device through MAC layers and physical layers. After the terminal device receives the downlink data packet, the terminal device may control the PDCP entity 01 to decrypt the downlink data packet by using the key of the master node, to obtain service data of the downlink data packet.

Figure 10A:
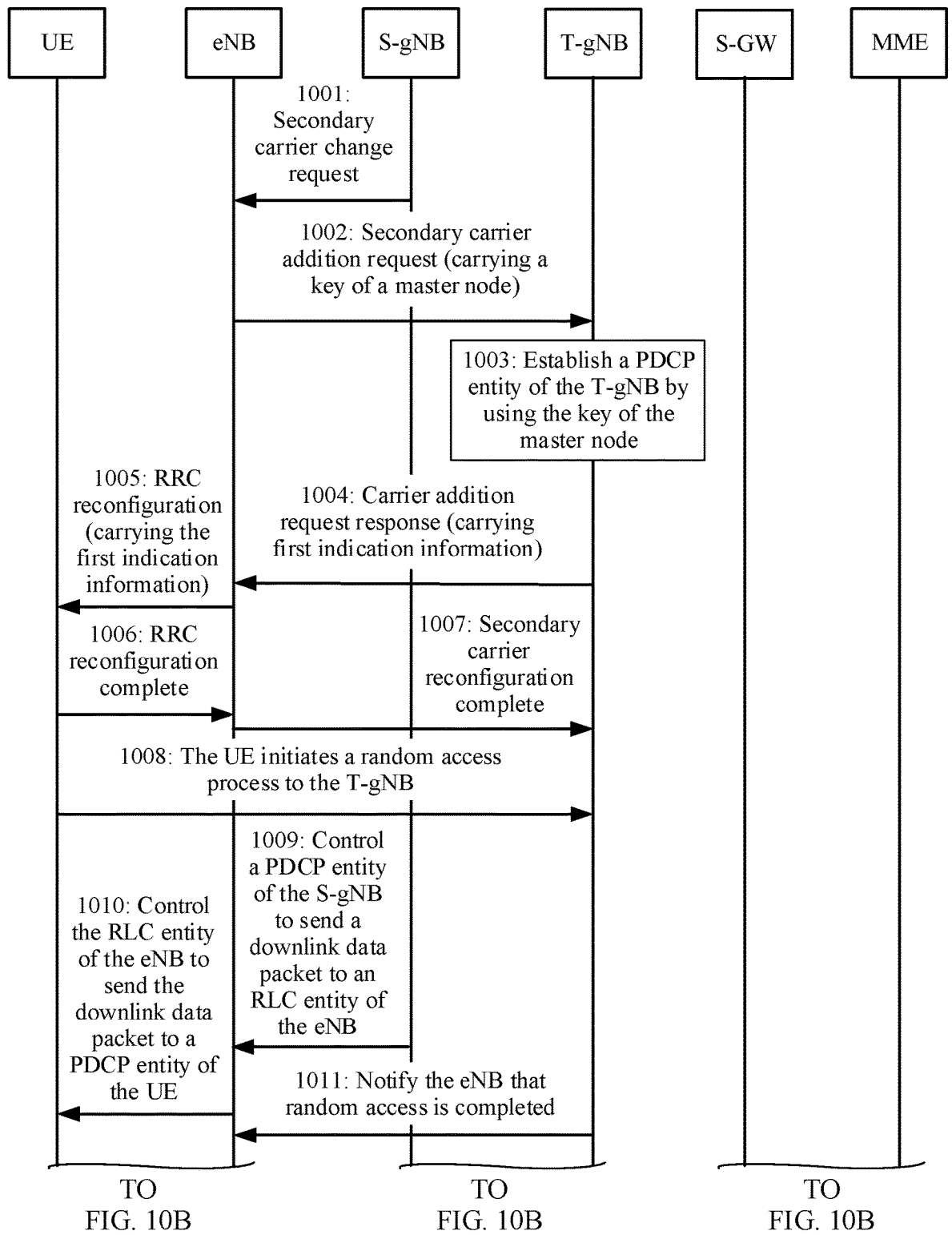
FIG. 10A to FIG. 10C are another flowchart of a data transmission method according to an embodiment of this application.
Figure 10B:
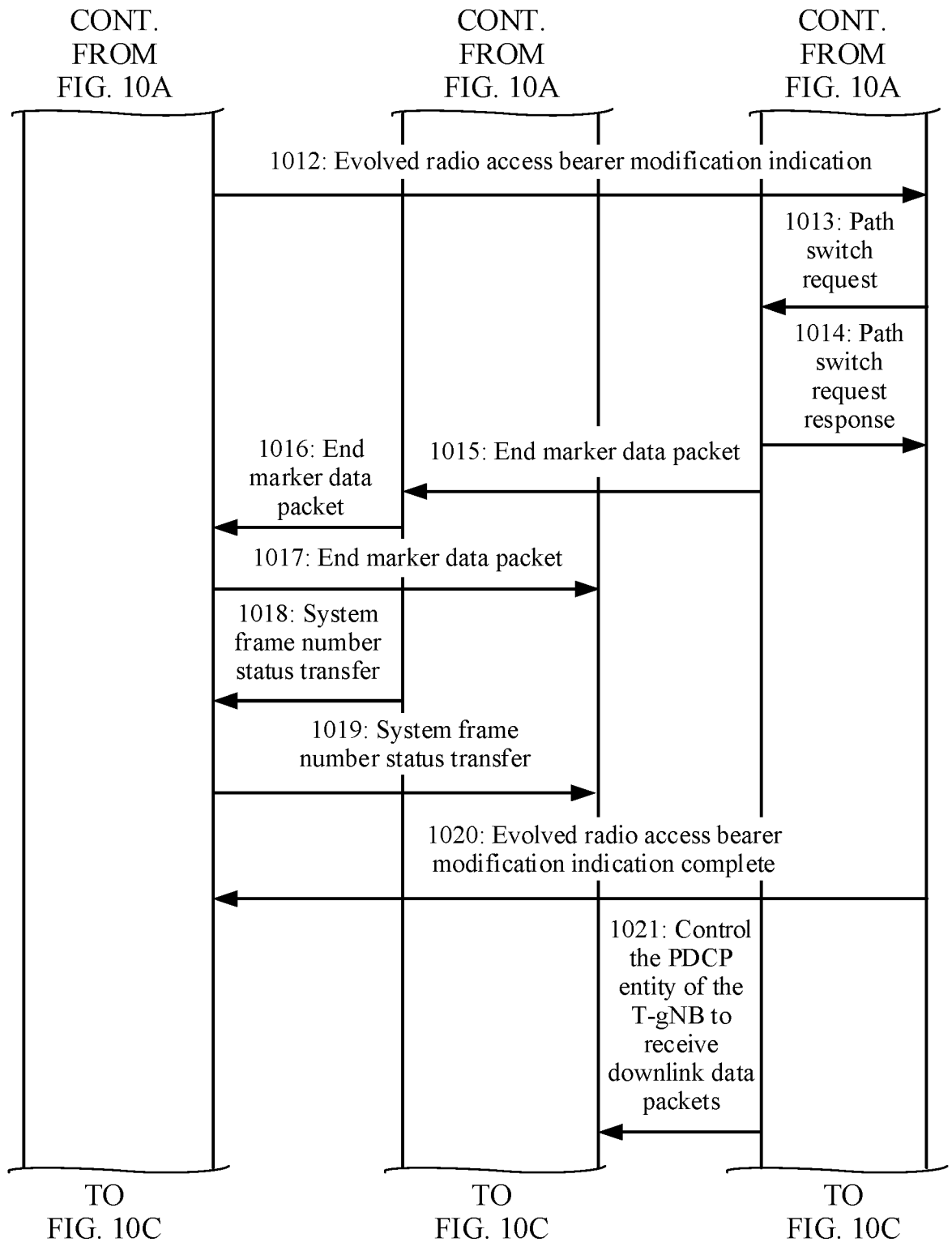
Figure 10C:
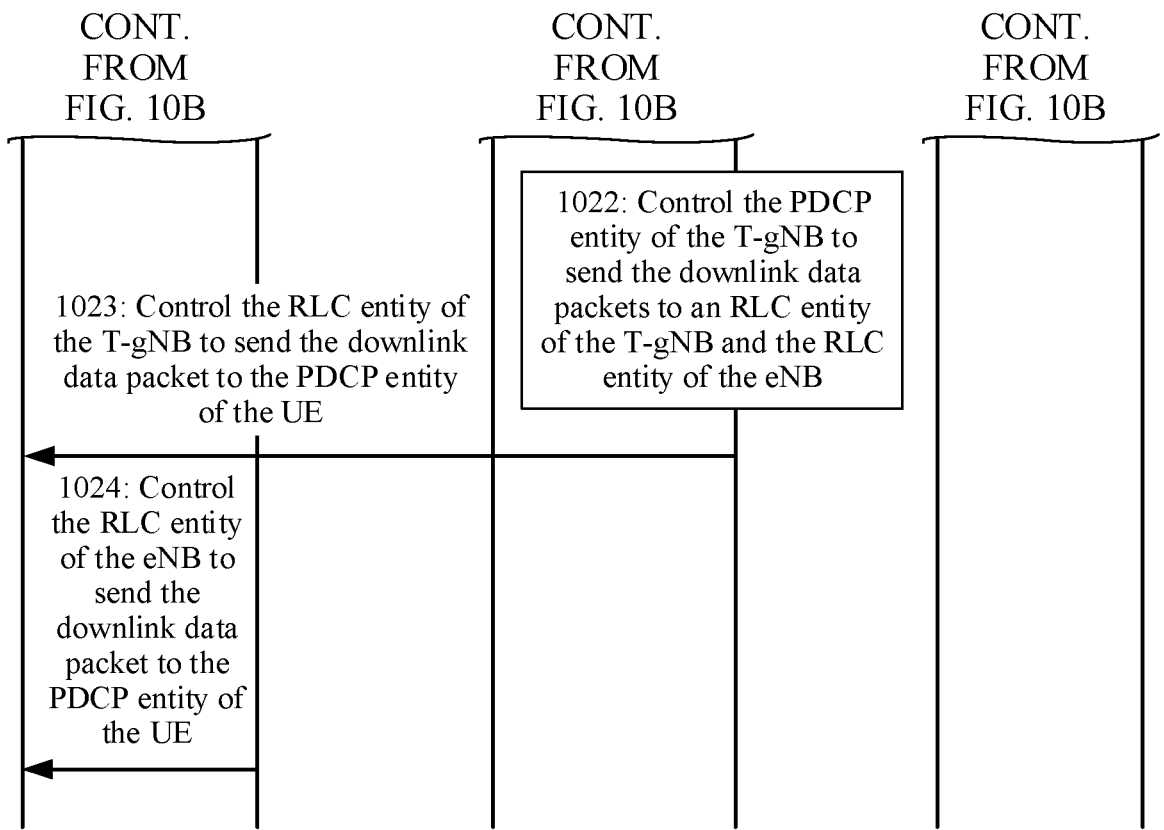

For ease of further understanding of the embodiment corresponding to FIG. 9A, as shown in FIG. 10A to FIG. 10C, the following further provides descriptions by using an example in which a primary network device is an eNB, a source secondary network device is an S-gNB, a target secondary network device is a T-gNB, and a terminal device is UE.

1001: The S-gNB sends a secondary carrier change request (SgNB change request) to the eNB.

The secondary carrier change request carries identification information of the to-be-added T-gNB. After the eNB obtains the identification information of the T-gNB from the secondary carrier change request, the eNB performs step 1002. At a same moment, the S-gNB performs step 1009.

1002: The eNB sends a secondary carrier addition request (SgNB addition request) to the T-gNB.

The secondary carrier addition request carries a key of a master node (namely, a key of the eNB), and the secondary carrier addition request notifies the T-gNB to establish a PDCP entity by using the key of the master node.

1003: The T-gNB establishes the PDCP entity of the T-gNB by using the key of the master node.

It should be understood that, in step 1003, although the T-gNB establishes the PDCP entity by using the key of the master node, the PDCP entity is not activated and cannot immediately participate in data transmission.

1004: The T-gNB sends a secondary carrier addition request response (SgNB addition request acknowledge) to the eNB.

The secondary carrier addition request response carries first indication information, and the first indication information indicates that the T-gNB acknowledges that the T-gNB is to establish the PDCP entity by using the key of the master node. The first indication information is indicated by an information element filled by the T-gNB in an SgNB to MeNB container. There is a key to use information element indicating a key in the SgNB to MeNB container. The T-gNB sets the key to use information element to master, to indicate that the T-gNB is to use the key of the master node.

It should be noted that there is no definite limitation on a time sequence between step 1003 and step 1004. In other words, the T-gNB may first perform step 1003 and then perform step 1004, may first perform step 1004 and then perform step 1003, or may simultaneously perform step 1003 and step 1004. This is not specifically limited herein.

1005: The eNB sends RRC reconfiguration (RRC connection reconfiguration) signaling to the UE.

After the eNB receives the carrier addition request response from the T-gNB, the eNB may determine that the T-gNB is to establish the PDCP entity by using the key of the master node. Therefore, the eNB sends the RRC reconfiguration signaling to the UE, where the RRC reconfiguration signaling carries the first indication information carried in the carrier addition request response.

When the UE identifies the first indication information in the RRC reconfiguration signaling, the UE may learn that the key of the master node is to be used. Because a PDCP entity of the UE previously uses the key of the master node, the UE may continue to use the PDCP entity that uses the key of the master node, and does not need to reestablish a PDCP entity that uses a new key. Therefore, in a subsequent step, when a downlink data packet that is encrypted by using the key of the master node is transmitted to the UE, the UE can use the PDCP entity to decrypt the downlink data packet, to obtain service data of the downlink data packet.

It should be understood that the RRC reconfiguration signaling may further carry another parameter used for reconfiguration. This is not specifically limited herein.

1006: The UE sends RRC reconfiguration complete (RRC connection reconfiguration complete) signaling to the eNB.

The RRC reconfiguration complete signaling notifies the eNB that the UE has received the first indication information and completed related reconfiguration.

1007: The eNB sends secondary carrier reconfiguration complete (SgNB reconfiguration complete) signaling to the T-gNB.

The secondary carrier reconfiguration complete signaling notifies the T-gNB that the UE has completed the reconfiguration, and the T-gNB may start to prepare for random access of the UE.

1008: The UE initiates a random access process to the T-gNB.

Specifically, a random access process between the UE and the T-gNB is similar to the random access process between the UE and the gNB in step 407. For details, refer to related descriptions of step 407. Details are not described herein again.

When the UE successfully accesses the T-gNB, it indicates that the UE may subsequently receive downlink data packets from the T-gNB. It may also be understood that the T-gNB may provide a service for the UE.

1009: The S-gNB controls a PDCP entity of the S-gNB to send a downlink data packet to an RLC entity of the eNB.

The downlink data packet in step 1009 is from a serving gateway S-GW. The PDCP entity of the S-gNB encrypts the downlink data packet from the S-GW by using the key of the master node. Then, the S-gNB controls the PDCP entity of the S-gNB to transmit the downlink data packet to the RLC entity of the eNB.

It should be noted that step 1009 and the foregoing step 1002 to step 1008 are independent of each other. The S-gNB performs step 1009 after performing step 1001.

1010: The eNB controls the RLC entity of the eNB to send the downlink data packet to the PDCP entity of the UE.

In this embodiment, step 1010 and the foregoing step 1008 and step 1009 are independent of each other. However, the eNB immediately performs step 1010 after performing step 1007.

In this step, the eNB controls the RLC entity of the eNB to transmit, to the PDCP entity of the UE through MAC layers and physical layers, the downlink data packet that is encrypted by using the key of the master node. Because the PDCP entity of the UE also uses the key of the master node, the PDCP entity of the UE can decrypt the downlink data packet and obtain service data of the downlink data packet.

In this embodiment, before a carrier change, both the UE and the S-gNB use the key of the master node. In addition, after receiving the first indication information, the UE still uses the key of the master node. Therefore, the PDCP entity of the UE can decrypt the downlink data packet that is encrypted by the PDCP entity of the S-gNB by using the key of the master node. Therefore, the S-gNB controls the PDCP entity of the S-gNB to send the downlink data packet to a PDCP entity of the eNB, and then the eNB controls the RLC entity of the eNB to send the downlink data packet to the PDCP entity of the UE. In this implementation, after the S-gNB sends the secondary carrier change request and before the T-gNB starts to transmit the downlink data packets, the UE may receive a part of downlink data packets buffered in the S-gNB. Therefore, a period within which transmission of the downlink data packet is interrupted can be shortened, a network delay can be shortened, and a probability of service interruption of the UE can be reduced.

1011: The T-gNB notifies the eNB that the random access is completed.

In this embodiment, step 1011 and the foregoing step 1009 and step 1010 are independent of each other, and step 1011 is performed after step 1008.

1012: The eNB sends an evolved radio access bearer modification indication (E-RAB modification indication) to an MME.

The evolved radio access bearer modification indication is for requesting the MME to switch a transmission path to the T-gNB.

1013: The MME sends a path switch request (path switch request) to an S-GW.

The path switch request is for requesting the S-GW to transmit the subsequent downlink data packets to the T-gNB. In this case, the PDCP entity of the T-gNB receives the downlink data packets from the S-GW.

1014: The S-GW sends a path switch request response (path switch request acknowledge) to the MME.

The path switch request response indicates that switching is completed.

1015: The S-GW sends an end marker (end marker) data packet to the S-gNB.

The end marker data packet is a last data packet sent by the S-GW to the S-gNB, to indicate that the S-GW no longer sends the downlink data packet to the S-gNB after sending the end marker data packet.

1016: The S-gNB forwards the end marker data packet to the eNB.

1017: The eNB forwards the end marker data packet to the T-gNB.

In this embodiment, after step 1016 and step 1017, the S-gNB forwards the end marker data packet to the T-gNB through the eNB, to indicate that the last data packet has been forwarded to the T-gNB. After receiving the end marker data packet, the T-gNB performs step 1021.

1018: The S-gNB sends a system frame number status transfer (SN status transfer) message to the eNB.

1019: The eNB sends the system frame number status transfer message to the T-gNB.

In this embodiment, the system frame number status transfer message indicates a sequence number of a downlink data packet that has been currently transmitted by the S-GW to the S-gNB. The sequence number is sent to the T-gNB, so that the T-gNB can receive, from the S-GW in a subsequent process, a data packet after the sequence number. In this way, the T-gNB can be prevented from repeatedly receiving a downlink data packet or missing a downlink data packet.

It should be noted that step 1016 and step 1017 and step 1018 and step 1019 are independent of each other.

1020: The MME sends an evolved radio access bearer modification indication complete (E-RAB modification indication complete) message to the eNB.

1021: The T-gNB controls the PDCP entity of the T-gNB to receive the downlink data packets from the S-GW.

After the T-gNB receives the end marker data packet, the PDCP entity of the T-gNB is activated. In this way, the T-gNB can control the PDCP entity of the T-gNB to receive the downlink data packets from the S-GW. Because the T-gNB establishes the PDCP entity of the T-gNB by using the key of the master node, the PDCP entity of the T-gNB encrypts the received downlink data packets by using the key of the master node, and then performs subsequent transmission.

1022: The T-gNB controls the PDCP entity of the T-gNB to send the downlink data packets to an RLC entity of the T-gNB and the RLC entity of the eNB.

1023: The T-gNB controls the RLC entity of the T-gNB to send the downlink data packet to the PDCP entity of the UE.

1024: The eNB controls the RLC entity of the eNB to send the downlink data packet to the PDCP entity of the UE.

In this embodiment, step 1023 and step 1024 are simultaneously performed.

Figure 9D:
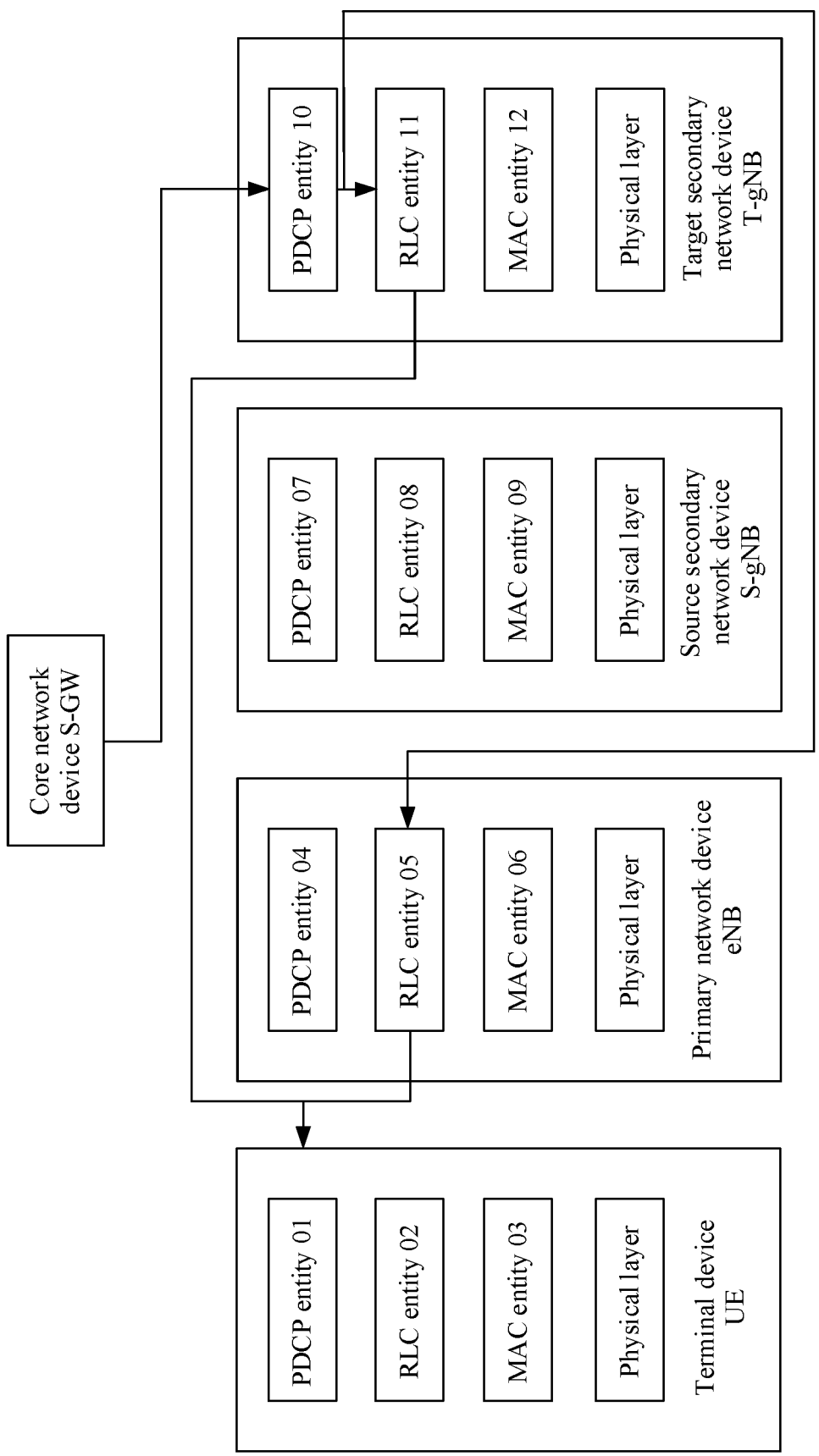
FIG. 9D is a schematic diagram of another embodiment of a transmission path of a downlink data packet according to an embodiment of this application.

For ease of understanding, FIG. 9C and FIG. 9D are used as an example for description. In this case, the core network device in FIG. 9C and FIG. 9D is an S-GW, the primary network device is an eNB, the source secondary network device is an S-gNB, the target secondary network device is a T-gNB, and the terminal device is UE.

When the S-gNB performs step 1009 and the eNB performs step 1010, a flow direction of the downlink data packet is shown in FIG. 9C. The S-GW sends the downlink data packet to the PDCP entity 07 of the S-gNB, where the PDCP entity 07 of the S-gNB encrypts and decrypts the downlink data packet by using the key of the master node. The S-gNB controls the PDCP entity 07 of the S-gNB to transmit, to the RLC entity 05 of the eNB, the downlink data packet that is encrypted by using the key of the master node. Then, the RLC entity 05 of the eNB transmits the downlink data packet to the PDCP entity 01 of the UE through the MAC layers and the physical layers. After the UE receives the downlink data packet, the UE may control the PDCP entity 01 of the UE to decrypt the downlink data packet by using the key of the master node, to obtain the service data of the downlink data packet.

When the T-gNB performs step 1021 to step 1023 and the eNB performs step 1024, a flow direction of the downlink data packets is shown in FIG. 9D. The S-GW sends downlink data packets to a PDCP entity 10 of the T-gNB, where the PDCP entity 10 of the T-gNB encrypts and decrypts the downlink data packets by using a key of a master node. The T-gNB controls the PDCP entity 10 of the T-gNB to transmit, to an RLC entity 05 of the eNB and an RLC entity 11 of the T-gNB, the downlink data packets that are encrypted by using the key of the master node. Then, the RLC entity 05 of the eNB and the RLC entity 11 of the T-gNB separately transmit the downlink data packets to a PDCP entity 01 of the UE, so that the UE can control the PDCP entity 01 of the UE to decrypt the downlink data packets by using the key of the master node, to obtain service data of the downlink data packets.

Figure 11:
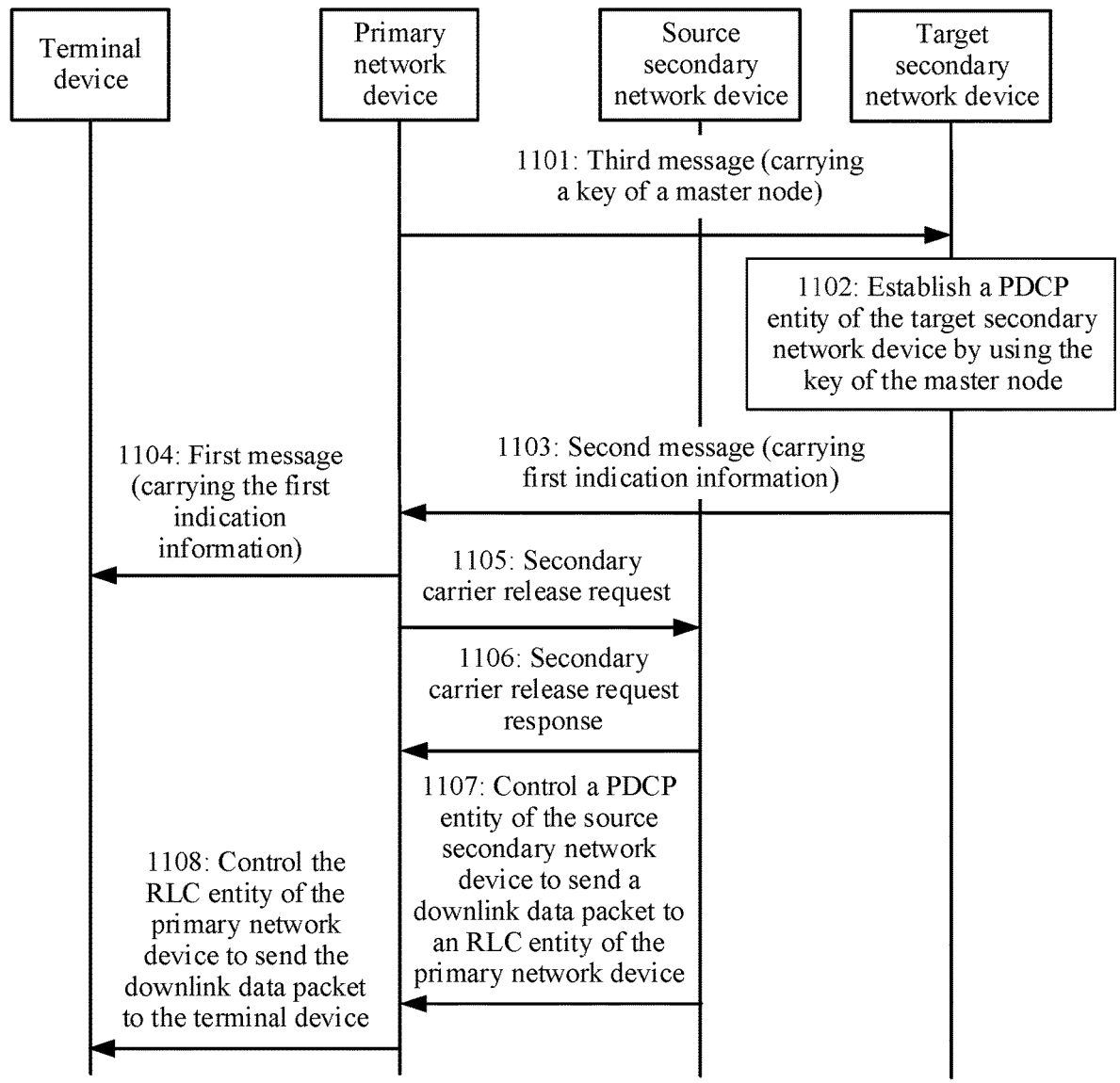
FIG. 11 is another flowchart of a data transmission method according to an embodiment of this application.

FIG. 11 shows a process of a signaling exchange between a primary network device, a source secondary network device, a target secondary network device, and a terminal device when the primary network device initiates a change of the secondary network device.

Before the change, the terminal device receives downlink data packets from a core network through the primary network device and the source secondary network device, and performs data encryption and decryption by using a key of the primary network device (namely, a key of a master node). For details, refer to related descriptions of FIG. 9B in the embodiment corresponding to FIG. 9A. Details are not described herein again.

When the primary network device prepares to change from the source secondary network device to the target secondary network device, the primary network device, the source secondary network device (namely, a to-be-deleted secondary network device), and the target secondary network device (namely, a to-be-added secondary network device) perform the following steps.

1101: The primary network device sends a third message to the target secondary network device.

1102: The target secondary network device establishes a PDCP entity of the target secondary network device by using the key of the master node.

1103: The target secondary network device sends a second message to the primary network device.

1104: The primary network device sends a first message to the terminal device.

In this embodiment, step 1101 to step 1104 are the same as step 902 to step 905. For details, refer to related descriptions of step 902 to step 905. Details are not described herein again.

In this embodiment, because the secondary carrier change is initiated by the primary network device, the primary network device needs to first add the target secondary network device, and then delete the source secondary network device. Therefore, the primary network device performs step 1105 after performing step 1101 to step 1104.

1105: The primary network device sends a secondary carrier release request to the source secondary network device.

The secondary carrier release request notifies the source secondary network device to prepare for a release.

1106: The source secondary network device sends a secondary carrier release request response to the primary network device.

The secondary carrier release request response indicates that the source secondary network device has acknowledged the release and is to perform a release in a subsequent process.

In this embodiment, because the carrier change is initiated by the primary network device, the source secondary network device performs a release process only when the source secondary network device receives the secondary carrier release request. Therefore, step 1105 and step 1106 are used as trigger sources to trigger the source secondary network device to perform step 1107.

1107: The source secondary network device controls a PDCP entity of the source secondary network device to send a downlink data packet to an RLC entity of the primary network device.

1108: The primary network device controls the RLC entity of the primary network device to send the downlink data packet to the terminal device.

In this embodiment, step 1107 and step 1108 are the same as step 906 and step 907. For details, refer to related descriptions of step 906 and step 907. Details are not described herein again.

In this embodiment, before the carrier change, both the terminal device and the source secondary network device use the key of the master node. In addition, after receiving the first indication information, the terminal device still uses the key of the master node. Therefore, a PDCP entity of the terminal device can decrypt the downlink data packet that is encrypted by the PDCP entity of the source secondary network device by using the key of the master node. In this case, the source secondary network device controls the PDCP entity of the source secondary network device to send the downlink data packet to a PDCP entity of the primary network device. Then, the primary network device controls the RLC entity of the primary network device to send the downlink data packet to the terminal device, that is, transmits the downlink data packet to the PDCP entity of the terminal device through MAC layers and physical layers. In this implementation, after the source secondary network device sends the secondary carrier change request and before the target secondary network device starts to transmit downlink data packets, the terminal device may receive a part of downlink data packets buffered in the source secondary network device. Therefore, a period within which transmission of the downlink data packet is interrupted can be shortened, a network delay can be shortened, and a probability of service interruption of the terminal device can be reduced.

Figure 12A:
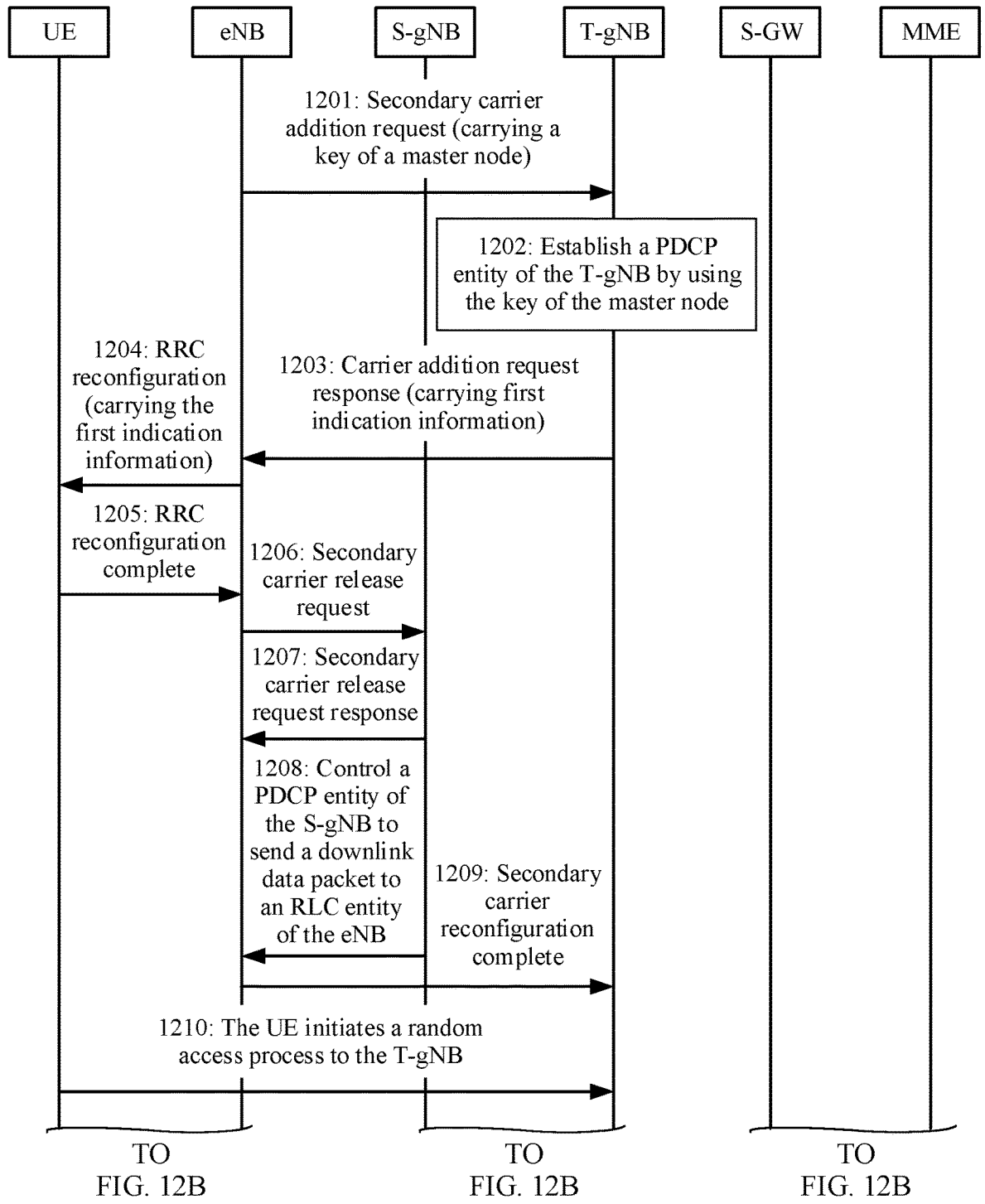
FIG. 12A to FIG. 12C are another flowchart of a data transmission method according to an embodiment of this application.
Figure 12B:
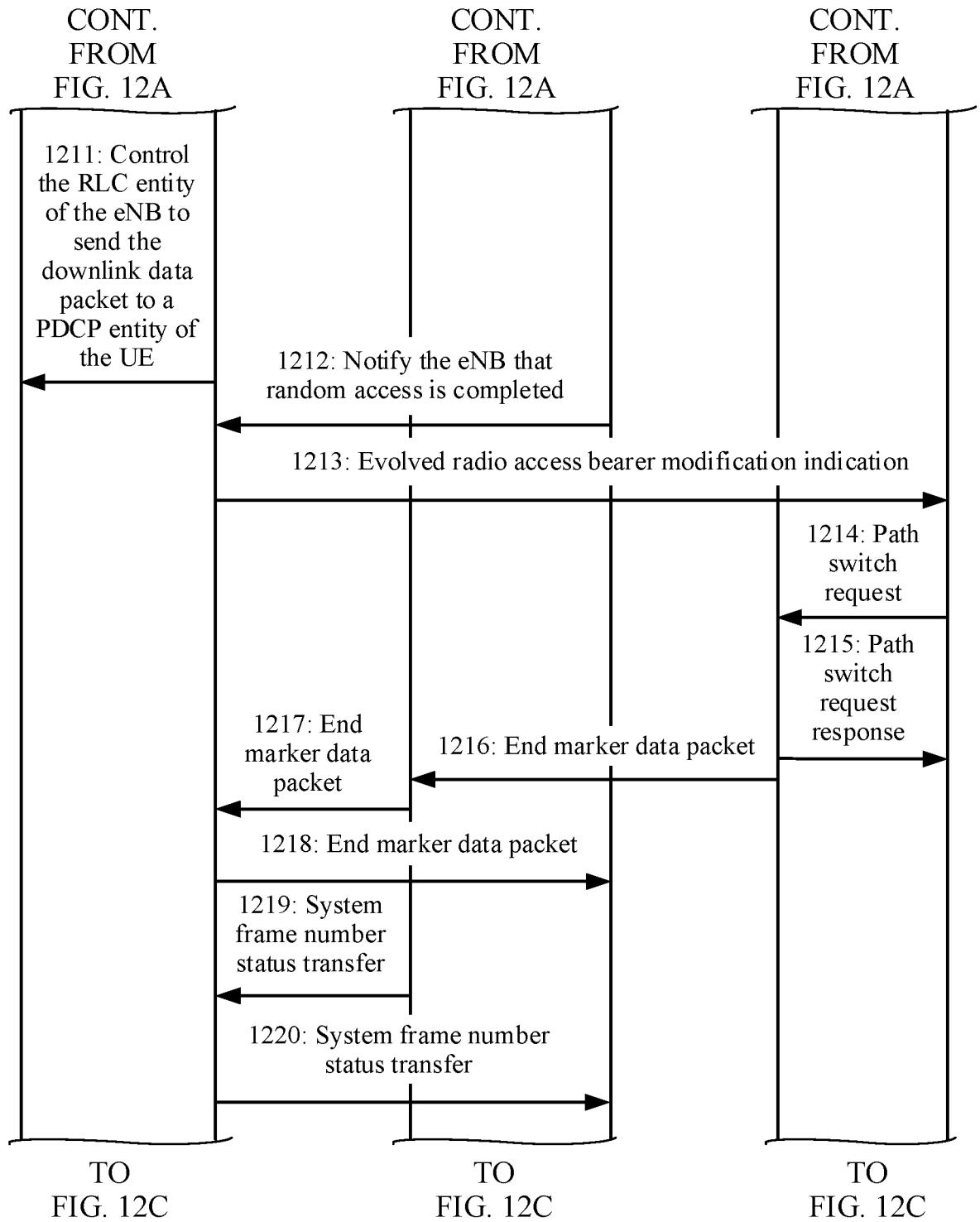
Figure 12C:
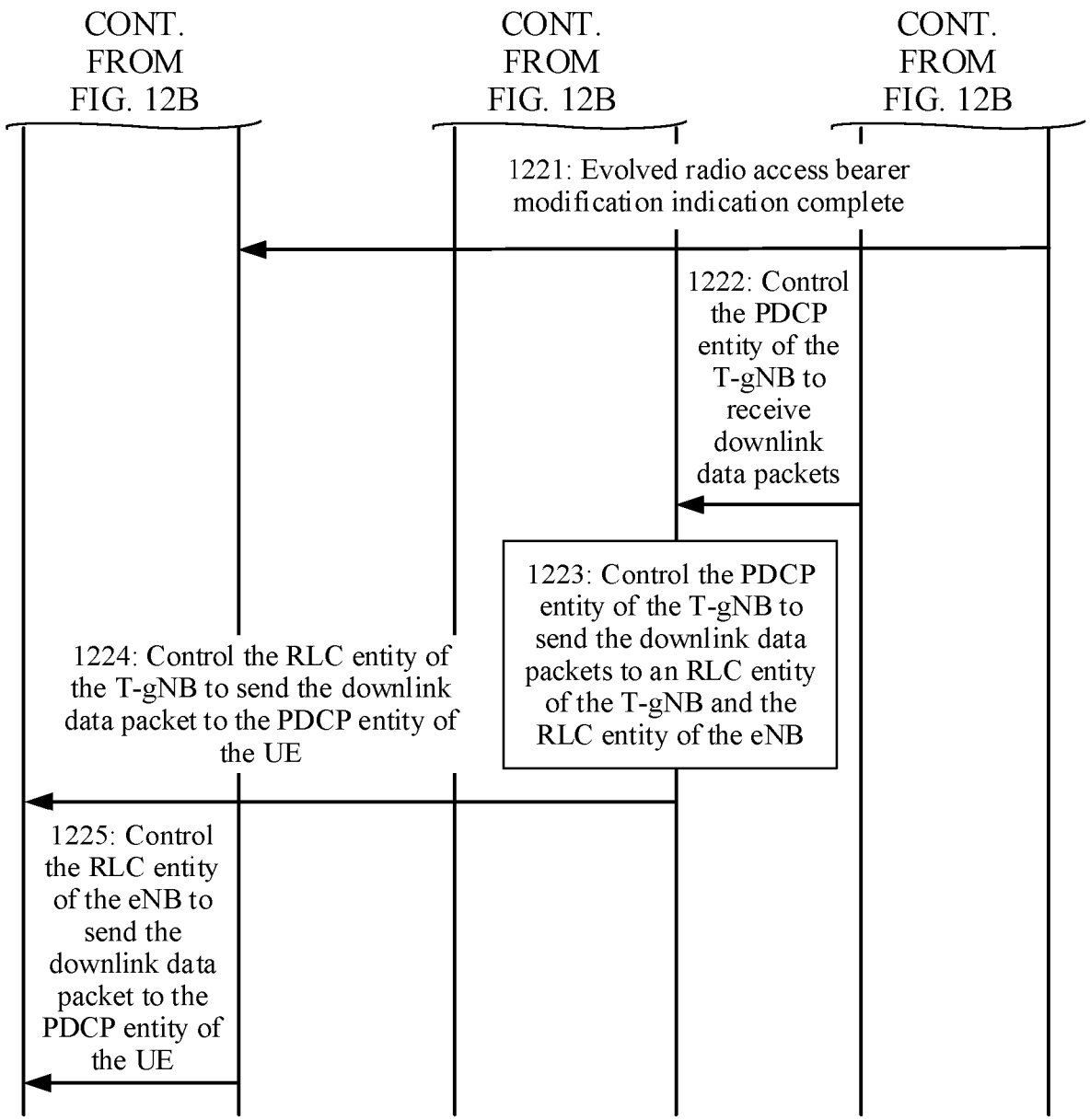

For ease of further understanding of the embodiment corresponding to FIG. 11, as shown in FIG. 12A to FIG. 12C, the following further provides descriptions by using an example in which a primary network device is an eNB, a source secondary network device is an S-gNB, a target secondary network device is a T-gNB, and a terminal device is UE.

1201: The eNB sends a secondary carrier addition request (SgNB addition request) to the T-gNB.

The secondary carrier addition request carries a key of a master node (namely, a key of the eNB), and the secondary carrier addition request notifies the T-gNB to establish a PDCP entity by using the key of the master node.

1202: The T-gNB establishes the PDCP entity of the T-gNB by using the key of the master node.

It should be understood that, in step 1202, although the T-gNB establishes the PDCP entity by using the key of the master node, the PDCP entity is not activated and cannot immediately participate in data transmission.

1203: The T-gNB sends a secondary carrier addition request response (SgNB addition request acknowledge) to the eNB.

The secondary carrier addition request response carries first indication information, and the first indication information indicates that the T-gNB acknowledges that the T-gNB is to establish the PDCP entity by using the key of the master node. The first indication information is indicated by an information element filled by the T-gNB in an SgNB to MeNB container. There is a key to use information element indicating a key in the SgNB to MeNB container. The T-gNB sets the key to use information element to master, to indicate that the T-gNB is to use the key of the master node.

It should be noted that there is no definite limitation on a time sequence between step 1202 and step 1203. In other words, the T-gNB may first perform step 1202 and then perform step 1203, may first perform step 1203 and then perform step 1202, or may simultaneously perform step 1202 and step 1203. This is not specifically limited herein.

1204: The eNB sends RRC reconfiguration (RRC connection reconfiguration) signaling to the UE.

After the eNB receives the carrier addition request response from the T-gNB, the eNB may determine that the T-gNB is to establish the PDCP entity by using the key of the master node. Therefore, the eNB sends the RRC reconfiguration signaling to the UE, where the RRC reconfiguration signaling carries the first indication information carried in the carrier addition request response.

When the UE identifies the first indication information in the RRC reconfiguration signaling, the UE may learn that the key of the master node is to be used. Because a PDCP entity of the UE previously uses the key of the master node, the UE may continue to use the PDCP entity that uses the key of the master node, and does not need to reestablish a PDCP entity that uses a new key. Therefore, in a subsequent step, when a downlink data packet that is encrypted by using the key of the master node is transmitted to the UE, the UE can use the PDCP entity to decrypt the downlink data packet, to obtain service data of the downlink data packet.

It should be understood that the RRC reconfiguration signaling may further carry another parameter used for reconfiguration. This is not specifically limited herein.

1205: The UE sends RRC reconfiguration complete (RRC connection reconfiguration complete) signaling to the eNB.

The RRC reconfiguration complete signaling notifies the eNB that the UE has received the first indication information and completed related reconfiguration.

In this embodiment, after the eNB receives the RRC reconfiguration complete signaling from the UE, the eNB initiates a secondary carrier release process to the S-gNB. The eNB performs step 1206.

1206: The eNB sends a secondary carrier release request (SgNB release request) to the S-gNB.

In this embodiment, after the S-gNB receives the secondary carrier release request from the eNB, the S-gNB performs step 1207 and step 1208. It should be understood that there is no definite limitation on a time sequence between step 1207 and step 1208. In other words, the S-gNB may first perform step 1207 and then perform step 1208, may first perform step 1208 and then perform step 1207, or may simultaneously perform step 1207 and step 1208. This is not specifically limited herein.

1207: The S-gNB sends a secondary carrier release request response (SgNB release request acknowledge) to the eNB.

1208: The S-gNB controls a PDCP entity of the S-gNB to send a downlink data packet to an RLC entity of the eNB.

The downlink data packet in step 1208 is from a serving gateway S-GW. The PDCP entity of the S-gNB encrypts the downlink data packet from the S-GW by using the key of the master node. Then, the S-gNB controls the PDCP entity of the S-gNB to transmit the downlink data packet to the RLC entity of the eNB.

1209: The eNB sends secondary carrier reconfiguration complete (SgNB reconfiguration complete) signaling to the T-gNB.

The secondary carrier reconfiguration complete signaling notifies the T-gNB that the UE has completed the reconfiguration, and the T-gNB may start to prepare for random access of the UE.

1210: The UE initiates a random access process to the T-gNB.

Specifically, a random access process between the UE and the T-gNB is similar to the random access process between the UE and the gNB in step 407. For details, refer to related descriptions of step 407. Details are not described herein again.

When the UE successfully accesses the T-gNB, it indicates that the UE may subsequently receive downlink data packets from the T-gNB. It may also be understood that the T-gNB may provide a service for the UE.

1211: The eNB controls the RLC entity of the eNB to send the downlink data packet to the PDCP entity of the UE.

In this embodiment, step 1211 and the foregoing step 1209 and step 1210 are independent of each other. However, the eNB immediately performs step 1211 after performing step 1208.

In this step, the eNB controls the RLC entity of the eNB to transmit, to the PDCP entity of the UE through MAC layers and physical layers, the downlink data packet that is encrypted by using the key of the master node. Because the PDCP entity of the UE also uses the key of the master node, the PDCP entity of the UE can decrypt the downlink data packet and obtain service data of the downlink data packet.

In this embodiment, before a carrier change, both the UE and the S-gNB use the key of the master node. In addition, after receiving the first indication information, the UE still uses the key of the master node. Therefore, the PDCP entity of the UE can decrypt the downlink data packet that is encrypted by the PDCP entity of the S-gNB by using the key of the master node. Therefore, the S-gNB controls the PDCP entity of the S-gNB to send the downlink data packet to a PDCP entity of the eNB, and then the eNB controls the RLC entity of the eNB to send the downlink data packet to the UE, that is, transmit the downlink data packet to the PDCP entity of the UE through MAC layers and physical layers. In this implementation, after the S-gNB sends the secondary carrier change request and before the T-gNB starts to transmit the downlink data packets, the UE may receive a part of downlink data packets buffered in the S-gNB. Therefore, a period within which transmission of the downlink data packet is interrupted can be shortened, a network delay can be shortened, and a probability of service interruption of the UE can be reduced.

1212: The T-gNB notifies the eNB that the random access is completed.

1213: The eNB sends an evolved radio access bearer modification indication (E-RAB modification indication) to an MME.

1214: The MME sends a path switch request (path switch request) to an S-GW.

1215: The S-GW sends a path switch request response (path switch request acknowledge) to the MME.

1216: The S-GW sends an end marker (end marker) data packet to the S-gNB.

1217: The S-gNB forwards the end marker data packet to the eNB.

1218: The eNB forwards the end marker data packet to the T-gNB.

1219: The S-gNB sends a system frame number status transfer (SN status transfer) message to the eNB.

1220: The eNB sends the system frame number status transfer message to the T-gNB.

1221: The MME sends an evolved radio access bearer modification indication complete (E-RAB modification indication complete) message to the eNB.

1222: The T-gNB controls the PDCP entity of the T-gNB to receive the downlink data packets from the S-GW.

1223: The T-gNB controls the PDCP entity of the T-gNB to send the downlink data packets to an RLC entity of the T-gNB and the RLC entity of the eNB.

1224: The T-gNB controls the RLC entity of the T-gNB to send the downlink data packet to the PDCP entity of the UE.

1225: The eNB controls the RLC entity of the eNB to send the downlink data packet to the PDCP entity of the UE.

In this embodiment, step 1213 to step 1225 are the same as step 1012 to step 1024. For details, refer to related descriptions of step 1012 to step 1024. Details are not described herein again.

Figure 13:
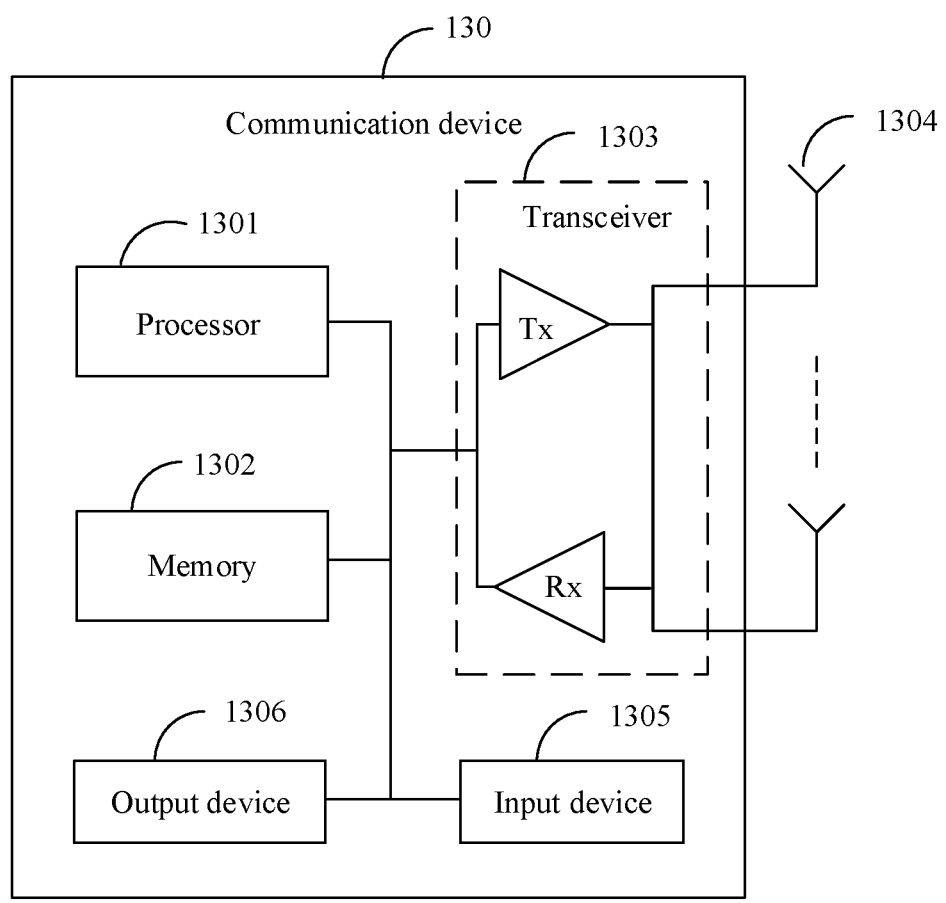
FIG. 13 is a schematic diagram of an embodiment of a communication device according to an embodiment of this application.

As shown in FIG. 13, an embodiment provides a schematic diagram of a structure of a communication device 130. It should be understood that the terminal device in the method embodiments corresponding to FIG. 2, FIG. 3A, FIG. 5A, FIG. 7, FIG. 9A, and FIG. 11 and the UE in the method embodiments corresponding to FIG. 4A and FIG. 4B, FIG. 6A and FIG. 6B, FIG. 8A and FIG. 8B, FIG. 10A to FIG. 10C, and FIG. 12A to FIG. 12C may be based on the structure of the communication device 130 shown in FIG. 13 in this embodiment.

The communication device 130 includes at least one processor 1301, at least one memory 1302, and at least one transceiver 1303. The processor 1301, the memory 1302, and the transceiver 1303 are connected. Optionally, the communication device 130 may further include an input device 1305, an output device 1306, and one or more antennas 1304. The antenna 1304 is connected to the transceiver 1303, and the input device 1305 and the output device 1306 are connected to the processor 1301.

In this embodiment, the memory 1302 is mainly configured to store a software program and data. The memory 1302 may exist independently, and is connected to the processor 1301. Optionally, the memory 1302 may be integrated with the processor 1301, for example, integrated into one or more chips. The memory 1302 can store program code for performing the technical solutions in embodiments of this application, and the processor 1301 controls execution of the program code. Various types of executed computer program code may also be considered as drivers of the processor 1301. It should be understood that FIG. 13 in this embodiment shows only one memory and one processor. However, during actual application, the communication device 130 may include a plurality of processors or a plurality of memories. This is not specifically limited herein. In addition, the memory 1302 may also be referred to as a storage medium, a storage device, or the like. The memory 1302 may be a storage element located in a same chip as the processor (namely, an on-chip storage element), or may be an independent storage element. This is not limited in this embodiment of this application.

In this embodiment, the transceiver 1303 may be configured to support receiving or sending of a radio frequency signal between the communication device 130 and an access network device, and the transceiver 1303 may be connected to the antenna 1304. The transceiver 1303 includes a transmitter Tx and a receiver Rx. Specifically, the one or more antennas 1304 may receive a radio frequency signal. The receiver Rx of the transceiver 1303 is configured to: receive the radio frequency signal from the antenna 1304, convert the radio frequency signal into a digital baseband signal or a digital intermediate frequency signal, and provide the digital baseband signal or the digital intermediate frequency signal for the processor 1301, so that the processor 1301 further processes the digital baseband signal or the digital intermediate frequency signal, for example, performs demodulation processing and decoding processing. In addition, the transmitter Tx of the transceiver 1303 is further configured to: receive a modulated digital baseband signal or digital intermediate frequency signal from the processor 1301, convert the modulated digital baseband signal or digital intermediate frequency signal into a radio frequency signal, and send the radio frequency signal through the one or more antennas 1304. Specifically, the receiver Rx may selectively perform one or more levels of frequency down-mixing processing and analog-to-digital conversion processing on the radio frequency signal to obtain a digital baseband signal or a digital intermediate frequency signal. A sequence of the frequency down-mixing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

It should be understood that the transceiver 1303 may alternatively be referred to as a transceiver unit, a transceiver apparatus, or the like. Optionally, a component that is in the transceiver unit and that is configured to implement a receiving function may be considered as a receiving unit. A component that is in the transceiver unit and that is configured to implement a sending function may be considered as a sending unit. That is, the transceiver unit includes the receiving unit and the sending unit. The receiving unit may also be referred to as a receiver, an input port, a receiver circuit, or the like. The sending unit may be referred to as a transmitter, a transmitter circuit, or the like.

The processor 1301 may be a baseband processor, or may be a central processing unit (central processing unit, CPU). The baseband processor and the CPU may be integrated together or separated from each other. The processor 1301 may be configured to implement various functions for the terminal device, for example, configured to process a communication protocol and communication data, or configured to: control the entire terminal device, execute a software program, and process data of the software program, or configured to assist in completing a computing processing task, for example, graphics and image processing or audio processing. Alternatively, the processor 1301 is configured to implement one or more of the foregoing functions.

In addition, the output device 1306 communicates with the processor 1301, and may display information in a plurality of manners. This is not specifically limited herein.

Specifically, in the communication device 130, the transceiver 1303 can receive a first message sent by a primary network device. Before a carrier change, the terminal device performs data encryption and decryption by using a key of the primary network device. The first message indicates the terminal device to perform, after the carrier change, data encryption and decryption by using the key that is of the primary network device and that is stored in the terminal device.

Specifically, in the communication device 130, the processor 1301 controls a PDCP entity of the terminal device to receive a downlink data packet from an RLC entity of the primary network device, where the downlink data packet is from a PDCP entity of the primary network device, and the PDCP entity of the terminal device encrypts and decrypts the downlink data packet by using the key of the primary network device.

Specifically, in the communication device 130, the processor 1301 controls a PDCP entity of the terminal device to receive a downlink data packet from an RLC entity of the primary network device, where the downlink data packet is from a PDCP entity of a secondary network device, the secondary network device is a to-be-released network device, and both the PDCP entity of the terminal device and the PDCP entity of the secondary network device encrypt and decrypt the downlink data packet by using the key of the primary network device.

For others, refer to the method of the terminal device or the UE in the foregoing embodiments. Details are not described herein again.

Figure 14:
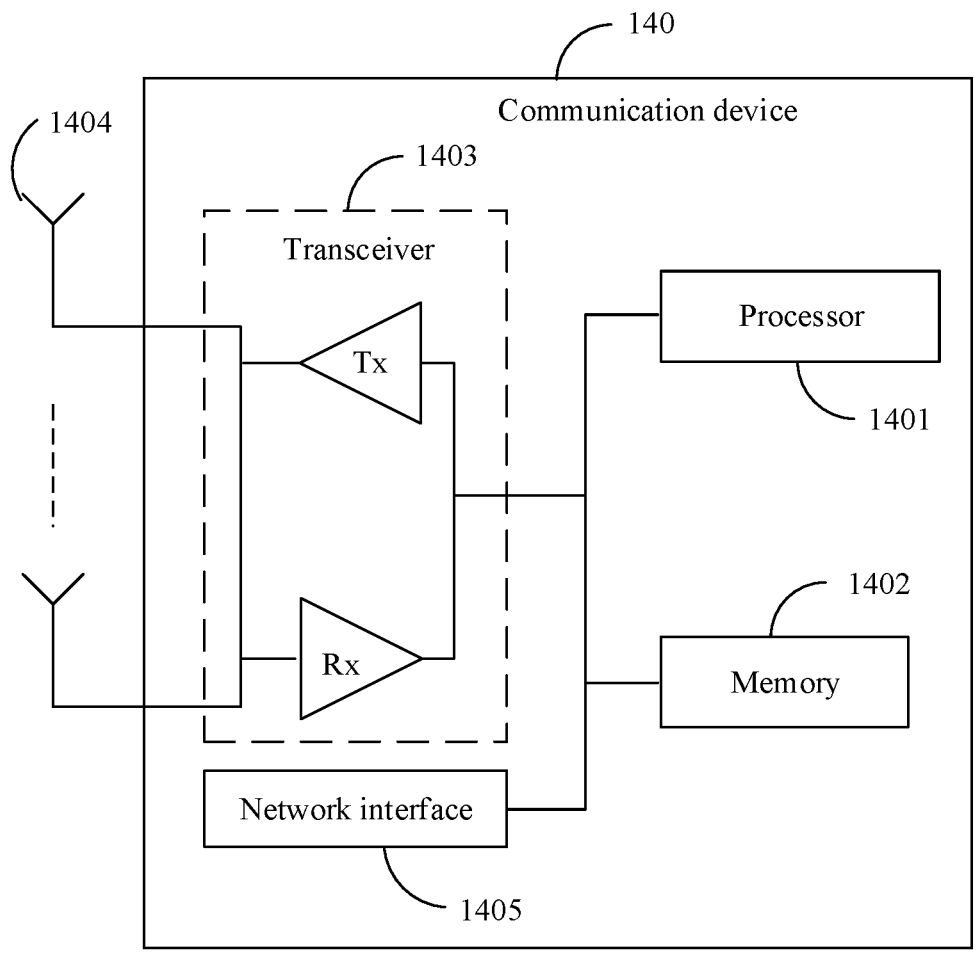
FIG. 14 is a schematic diagram of another embodiment of a communication device according to an embodiment of this application.

As shown in FIG. 14, an embodiment provides a schematic diagram of a structure of another communication device 140. It should be understood that the primary network device and the secondary network device in the method embodiments corresponding to FIG. 2, FIG. 3A, FIG. 5A, FIG. 7, FIG. 9A, and FIG. 11, and the eNB and the gNB in the method embodiments corresponding to FIG. 4A and FIG. 4B, FIG. 6A and FIG. 6B, FIG. 8A and FIG. 8B, FIG. 10A to FIG. 10C, and FIG. 12A to FIG. 12C may be based on the structure of the communication device 140 shown in FIG. 14 in this embodiment. It should be further understood that, when an access network device or a base station of a subsequently evolved standard performs the method in embodiments of this application, the access network or the base station of the subsequently evolved standard may also use the structure of the communication device 140 shown in FIG. 14 in this embodiment.

The communication device 140 includes at least one processor 1401, at least one memory 1402, at least one transceiver 1403, at least one network interface 1405, and one or more antennas 1404. The processor 1401, the memory 1402, the transceiver 1403, and the network interface 1405 are connected through a connection apparatus, and the antenna 1404 is connected to the transceiver 1403. The connection apparatus may include various types of interfaces, transmission cables, buses, or the like. This is not limited in this embodiment.

The network interface 1405 is configured to connect the communication device 140 to another communication device through a communication link. Specifically, the network interface 1405 may include a network interface such as an S1 interface between the communication device 140 and a core network element. The network interface 1405 may also include a network interface such as an X2 or Xn interface between the communication device 140 and another network device (for example, another access network device or another core network element).

For the transceiver 1403, the memory 1402, and the antenna 1404, refer to related descriptions of the transceiver 1303, the memory 1302, and the antenna 1304 in the embodiment corresponding to FIG. 13. Details are not described herein again.

In addition, the processor 1401 is mainly configured to process a communication protocol and communication data, control an entire network device, execute a software program, and process data of the software program, for example, configured to support the communication device 140 in performing an action described in the foregoing method embodiments. The communication device 140 may include a baseband processor and a central processing unit. The baseband processor is mainly configured to process a communication protocol and communication data, and the central processing unit is mainly configured to control the entire communication device 140, execute a software program, and process data of the software program. The processor 1401 in FIG. 14 may integrate functions of the baseband processor and the central processing unit. A person skilled in the art may understand that the baseband processor and the central processing unit may be separate processors, and are interconnected through a technology such as a bus. A person skilled in the art may understand that the communication device 140 may include a plurality of baseband processors to adapt to different network standards, and the communication device 140 may include a plurality of central processing units to enhance a processing capability of the communication device 140. Various components of the communication device 140 may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the memory in a form of a software program. The processor executes the software program to implement a baseband processing function.

Specifically, when the communication device 140 is the primary network device:

In the communication device 140, the transceiver 1403 can send a first message to a terminal device. The first message indicates the terminal device to perform, after a carrier change, data encryption and decryption by using a key that is of the primary network device (a key of a master node) and that is stored in the terminal device.

In the communication device 140, the transceiver 1403 can receive a second message sent by the secondary network device, where the second message indicates that the secondary network device acknowledges that the change is to occur, and the second message carries first indication information configured by the secondary network device.

In the communication device 140, the transceiver 1403 can send a third message to the secondary network device, where the third message carries the key of the primary network device, and the third message indicates the secondary network device to perform data encryption and decryption by using the key of the primary network device.

In addition, in the communication device 140, the processor 1401 can control a PDCP entity of the primary network device to send a downlink data packet to an RLC entity of the primary network device, and control the RLC entity of the primary network device to send the downlink data packet to a PDCP entity of the terminal device.

For another example, the processor 1401 can control an RLC entity of the primary network device to receive a downlink data packet from a PDCP entity of the secondary network device, where the PDCP entity of the secondary network device encrypts and decrypts the downlink data packet by using the key of the primary network device; and control the RLC entity of the primary network device to send the downlink data packet to a PDCP entity of the terminal device, where the PDCP entity of the terminal device encrypts and decrypts the downlink data packet by using the key of the primary network device.

For another example, the processor 1401 controls an RLC entity of the primary network device to receive a downlink data packet from a PDCP entity of a source secondary network device, where the PDCP entity of the source secondary network device encrypts and decrypts the downlink data packet by using the key of the primary network device; and controls, for the primary network device, the RLC entity of the primary network device to send the downlink data packet to a PDCP entity of the terminal device, where the PDCP entity of the terminal device encrypts and decrypts the downlink data packet by using the key of the primary network device.

In the communication device 140, the processor 1401 establishes the PDCP entity by using the key of the primary network device.

For others, refer to the method of the primary network device or the eNB in the foregoing embodiments. Details are not described herein again.

Specifically, when the communication device 140 is the secondary network device:

In the communication device 140, the transceiver 1403 can receive a third message sent by the primary network device, where the third message carries a key of the primary network device, and the third message indicates the secondary network device to perform data encryption and decryption by using the key of the primary network device.

In the communication device 140, the transceiver 1403 can send a second message to the primary network device, where the second message indicates that the secondary network device acknowledges that a change is to occur, the second message carries first indication information configured by the secondary network device, and the first indication information indicates to perform data encryption and decryption by using the key of the primary network device.

In the communication device 140, the processor 1401 establishes a PDCP entity by using the key of the primary network device.

For others, refer to the method of the secondary network device or the gNB in the foregoing embodiments. Details are not described herein again.

Figure 15:
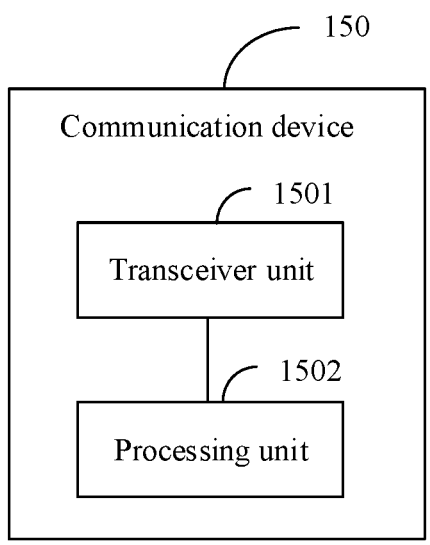
FIG. 15 is a schematic diagram of another embodiment of a communication device according to an embodiment of this application.

As shown in FIG. 15, this embodiment provides another communication device 150. The communication device 150 may be a terminal device or a chip in the terminal device. The communication device 150 includes a transceiver unit 1501 and a processing unit 1502.

Figure 16:
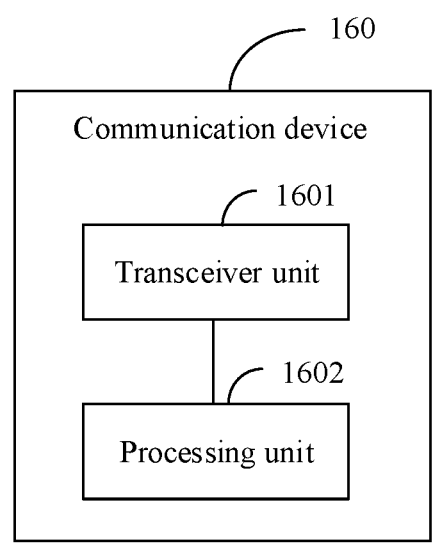
FIG. 16 is a schematic diagram of another embodiment of a communication device according to an embodiment of this application.

As shown in FIG. 16, an embodiment provides another communication device 160. The communication device 160 may be a primary network device or a chip in the primary network device, or a secondary network device or a chip in the secondary network device. The communication device 160 includes a transceiver unit 1601 and a processing unit 1602.

When the communication device 150 is the terminal device or UE, and when the communication device 160 is an access network device or a base station, the transceiver unit 1501 and the transceiver unit 1601 may each be a sending unit or a transmitter when sending information, and the transceiver unit 1501 and the transceiver unit 1601 may each be a receiving unit or a receiver when receiving information. The transceiver unit may be a transceiver, and the transceiver, the transmitter, or the receiver may be a radio frequency circuit. When the terminal device or the user equipment includes a storage unit, the storage unit is configured to store computer instructions. The processor is communicatively connected to the memory, and the processor executes the computer instructions stored in the memory, to enable the terminal device, the primary network device, and the secondary network device to perform the methods in the method embodiments corresponding to FIG. 2, FIG. 3A, FIG. 5A, FIG. 7, FIG. 9A, and FIG. 11, and enable the UE, an eNB, and a gNB to perform the methods in the embodiments corresponding to FIG. 4A and FIG. 4B, FIG. 6A and FIG. 6B, FIG. 8A and FIG. 8B, FIG. 10A to FIG. 10C, and FIG. 12A to FIG. 12C. In addition, the processing unit 1502 and the processing unit 1602 may each be a general-purpose central processing unit (CPU), a microprocessor, a digital signal processor (digital signal processor, DSP), or a microcontroller unit (microcontroller unit, MCU). The processor may be a separate semiconductor chip, or may be integrated with another circuit to constitute a semiconductor chip. For example, the processor and another circuit (for example, a codec circuit, a hardware acceleration circuit, or various buses and interface circuits) may constitute a system-on-a-chip (system-on-a-chip, SoC). Alternatively, the processor may be integrated into an application-specific integrated circuit (application-specific integrated circuit, ASIC) as a built-in processor of the ASIC.

When the communication device 150 is the chip in the terminal device, and when the communication device 160 is the chip in the primary network device or the chip in the secondary network device, the transceiver unit 1501 and the transceiver unit 1601 may each be an input and/or output interface, a pin, a circuit, or the like. In addition, the processing unit 1502 may be a processor of the chip in the terminal device, and the processing unit 1602 may be a processor of the chip in the access network device. The processor may execute computer-executable instructions stored in a storage unit, to enable the chip in the terminal device and the chip in the access network device to perform the methods in the embodiments corresponding to FIG. 2, FIG. 3A, FIG. 4A and FIG. 4B, FIG. 5A, FIG. 6A and FIG. 6B, FIG. 7, FIG. 8A and FIG. 8B, FIG. 9A, FIG. 10A to FIG. 10C, FIG. 11, and FIG. 12A to FIG. 12C. Optionally, the storage unit is a storage unit in the chip, for example, a register or a buffer, and the storage unit may alternatively be a storage unit that is in the terminal device and that is located outside the chip, for example, a read-only memory (read-only memory, ROM), another type of static storage device that can store static information and instructions, a random access memory (random access memory, RAM), or the like.

It should be understood that the terminal device may include functional units (means) corresponding to steps of the method or procedure of the terminal device, and the access network device may include functional units corresponding to steps of the method or procedure of the access network device. One or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedure.

According to the methods provided in embodiments of this application, an embodiment of this application further provides a communication system. The communication system includes a terminal device and an access network device. For a structure of the terminal device, refer to the communication device 130 in the embodiment corresponding to FIG. 13. For a structure of a primary network device or a secondary network device, refer to the communication device 140 in the embodiment corresponding to FIG. 14. In addition, when the terminal device is a chip, for the chip in the terminal device, refer to the communication device 150 in the embodiment corresponding to FIG. 15. When the primary network device or the secondary network device is a chip, for the chip in the primary network device or the secondary network device, refer to the communication device 160 in the embodiment corresponding to FIG. 16.

In an implementation process, steps in the foregoing methods can be implemented by using a hardware integrated logical circuit in the processor, or by using instructions in a form of software. The steps of the method disclosed with reference to embodiments of this application may be directly performed by using a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again. It should be further understood that, "first", "second", "third", "fourth", and various numbers in this specification are merely used for differentiation for ease of description, and are not intended to limit the scope of embodiments of this application.

It should be understood that the term "and/or" in this specification describes only an association relationship between associated objects and indicates that three relationships may exist. For example, A and/or B may indicate the following three cases: Only A exists, both A and B exist, and only B exists. In addition, the character "/" generally indicates an "or" relationship between the associated objects.

It should be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A data transmission method, comprising:
   initiating, by a primary network device, a process of a carrier change, wherein the carrier change is performed by the primary network device;
   in response to initiating the process of the carrier change, sending, by the primary network device, a first message to a terminal device, wherein the terminal device performs, before the carrier change, data encryption and decryption by using a key of the primary network device, and the first message indicates the terminal device to perform, after the carrier change, data encryption and decryption by using the key that is of the primary network device and that is stored in the terminal device;

controlling, by the primary network device, a packet data convergence protocol (PDCP) entity of the primary network device to send a downlink data packet to a radio link control (RLC) entity of the primary network device, wherein the downlink data packet is from the PDCP entity of the primary network device; and controlling the RLC entity of the primary network device to send the downlink data packet to the terminal device, wherein the PDCP entity of the terminal device encrypts and decrypts the downlink data packet by using the key of the primary network device.

2. The method according to claim 1, wherein the first message is a radio resource control (RRC) reconfiguration message, the RRC reconfiguration message carries first indication information, and the first indication information indicates to perform data encryption and decryption by using the key of the primary network device.

3. The method according to claim 2, wherein before sending, by the primary network device, the first message to the terminal device, the method further comprises:

receiving, by the primary network device, a second message sent by a secondary network device, wherein the second message indicates that the secondary network device acknowledges that the carrier change is to occur, and the second message carries the first indication information configured by the secondary network device.

4. The method according to claim 3, wherein before receiving, by the primary network device, the second message sent by the secondary network device, the method further comprises:

sending, by the primary network device, a third message to the secondary network device, wherein the third message carries the key of the primary network device, and the third message indicates the secondary network device to perform data encryption and decryption by using the key of the primary network device.

5. The method according to claim 4, wherein:

the third message is a secondary carrier addition request, and the secondary carrier addition request is for requesting to add the secondary network device as a secondary carrier; and the second message is a secondary carrier addition request response, and the secondary carrier addition request response indicates that the secondary network device acknowledges addition and that the secondary network device is to perform encryption and decryption by using the key of the primary network device.

6. The method according to claim 1, wherein before sending, by the primary network device, the first message to the terminal device, the method further comprises:

sending, by the primary network device, a secondary carrier release request to a secondary network device, wherein the secondary carrier release request notifies the secondary network device to perform a release; and receiving, by the primary network device, a secondary carrier release response sent by the secondary network device, wherein the secondary carrier release response indicates that the secondary network device acknowledges the release.

7. The method according to claim 1, wherein before sending, by the primary network device, the first message to the terminal device, the method further comprises:

receiving, by the primary network device, a secondary carrier release request sent by a secondary network device, wherein the secondary carrier release request is for requesting to release the secondary network device; and sending, by the primary network device, a secondary carrier release acknowledge message to the secondary network device, wherein the secondary carrier release acknowledge message indicates that the secondary network device is allowed to perform a release.

8. The method according to claim 1, wherein the process of the carrier change includes adding, deleting, or changing a secondary network device.

9. A primary network device, comprising:

at least one processor; and one or more memories including computer instructions that, when executed by the at least one processor, cause the primary network device to perform operations comprising:

initiating a process of a carrier change, wherein the carrier change is performed by the primary network device;

in response to initiating the process of the carrier change, sending a first message to a terminal device, wherein the terminal device performs, before the carrier change, data encryption and decryption by using a key of the primary network device, and the first message indicates the terminal device to perform, after the carrier change, data encryption and decryption by using the key that is of the primary network device and that is stored in the terminal device;

controlling a packet data convergence protocol (PDCP) entity of the primary network device to send a downlink data packet to a radio link control (RLC) entity of the primary network device, wherein the downlink data packet is from the PDCP entity of the primary network device; and controlling the RLC entity of the primary network device to send the downlink data packet to the terminal device, wherein the PDCP entity of the terminal device encrypts and decrypts the downlink data packet by using the key of the primary network device.

10. The primary network device according to claim 9, wherein the first message is a radio resource control (RRC) reconfiguration message, the RRC reconfiguration message carries first indication information, and the first indication information indicates to perform data encryption and decryption by using the key of the primary network device.

11. The primary network device according to claim 10, wherein the operations further comprise:

before the sending the first message to the terminal device, receiving a second message sent by a secondary network device, wherein the second message indicates that the secondary network device acknowledges that the carrier change is to occur, and the second message carries the first indication information configured by the secondary network device.

12. The primary network device according to claim 11, wherein the operations further comprise:

before the receiving the second message, sending a third message to the secondary network device, wherein the third message carries the key of the primary network device, and the third message indicates the secondary network device to perform data encryption and decryption by using the key of the primary network device.

13. The primary network device according to claim 12, wherein:
- the third message is a secondary carrier addition request, and the secondary carrier addition request is for requesting to add the secondary network device as a secondary carrier; and
- the second message is a secondary carrier addition request response, and the secondary carrier addition request response indicates that the secondary network device acknowledges addition and that the secondary network device is to perform encryption and decryption by using the key of the primary network device.

14. The primary network device according to claim 9, wherein the operations further comprise:
- before the sending the first message to the terminal device, sending a secondary carrier release request to a secondary network device, wherein the secondary carrier release request notifies the secondary network device to perform a release; and
- receiving a secondary carrier release response sent by the secondary network device, wherein the secondary carrier release response indicates that the secondary network device acknowledges the release.

15. The primary network device according to claim 9, wherein the operations further comprise:
- before the sending the first message to the terminal device, receiving a secondary carrier release request sent by a secondary network device, wherein the secondary carrier release request is for requesting to release the secondary network device; and
- sending a secondary carrier release acknowledge message to the secondary network device, wherein the secondary carrier release acknowledge message indicates that the secondary network device is allowed to perform a release.

16. A terminal device comprising:
- at least one processor; and
- one or more memories including computer instructions that, when executed by the at least one processor, cause the terminal device to perform operations comprising:
- receiving a first message sent by a primary network device when the primary network device initiates a process of a carrier change, wherein the carrier change is performed by the primary network device, the terminal device performs, before the carrier change, data encryption and decryption by using a key of the primary network device, and the first message indicates the terminal device to perform, after the carrier change, data encryption and decryption by using the key that is of the primary network device and that is stored in the terminal device;
- controlling a packet data convergence protocol (PDCP) entity of the terminal device to receive a downlink data packet from a radio link control (RLC) entity of the primary network device, wherein the downlink data packet is from the PDCP entity of the primary network device; and
- controlling the RLC entity of the primary network device to send the downlink data packet to the terminal device, wherein the PDCP entity of the terminal device encrypts and decrypts the downlink data packet by using the key of the primary network device.

17. The terminal device according to claim 16, wherein the first message is a radio resource control (RRC) reconfiguration message, the RRC reconfiguration message carries first indication information, and the first indication information indicates to perform data encryption and decryption by using the key of the primary network device.

* * * * *